United States Patent [19]
Yoshiura et al.

[11] Patent Number: 6,072,595
[45] Date of Patent: Jun. 6, 2000

[54] DIGITAL IMAGE FORMING SYSTEM

[75] Inventors: Syoichiro Yoshiura, Tenri; Yasuhiro Nakai, Soraku-gun; Kimihito Yamazaki, Tenri, all of Japan

[73] Assignee: Sharp Kabushiki Kaisha, Osaka, Japan

[21] Appl. No.: 08/914,903

[22] Filed: Aug. 18, 1997

[30] Foreign Application Priority Data

Aug. 23, 1996 [JP] Japan ................................. 8-222906

[51] Int. Cl.⁷ .................................................. H04N 1/00
[52] U.S. Cl. ...................................... 358/400; 379/100.02
[58] Field of Search .................................... 358/440, 404, 358/468, 405, 434–436, 442; 379/100.01, 100.02

[56] References Cited

U.S. PATENT DOCUMENTS

| | | | |
|---|---|---|---|
| 4,751,583 | 6/1988 | Levine | 358/256 |
| 5,208,681 | 5/1993 | Yoshida | 358/404 |

FOREIGN PATENT DOCUMENTS

| | | | |
|---|---|---|---|
| 01057868 | 3/1989 | Japan | H04N 1/00 |
| 03218163 | 9/1991 | Japan | H04N 1/00 |
| 4-94853 | 8/1992 | Japan | H04N 1/00 |

*Primary Examiner*—Jerome Grant, II
*Attorney, Agent, or Firm*—Dike, Bronstein, Roberts & Cushman, LLP; David G. Conlin

[57] ABSTRACT

A digital image forming system includes a digital copying machine and a portable telephone which can be carried independently of the digital copying machine and can communicate with the digital copying machine and other communication device. The digital copying machine includes a scanner section for converting document image as read into image data, image memory for storing the image data obtained from the scanner section and a main CPU for storing image data obtained from the scanner section into the image memory and reading the image data from the image memory to be transferred to the portable telephone. The portable telephone includes a memory for storing image data and a CPU for storing the image data as transmitted from the digital copying machine in the memory and transmitting the image data as read from the memory to other communication device.

21 Claims, 32 Drawing Sheets

DIGITAL IMAGE FORMING SYSTEM

FIELD OF THE INVENTION

The present invention relates to an image forming apparatus composed of, for example, a digital copying machine, and also relates a digital image forming system including a portable image communication device composed of, for example, a portable telephone.

BACKGROUND OF THE INVENTION

Conventionally, digital image forming apparatuses having a function of transmitting image data to other devices have been known, for example, as disclosed in Japanese Unexamined Patent Publication No. 57868/1989 (Tokukaisho 64-57868). Such digital image forming apparatuses are known as a composite digital copying machine provided with not only a normal copy mode in which document image data as read by a scanner is printed by a recording section, but also a fax mode in which the image data is transmitted to other devices by means of a communication device and a communication line, etc.

The digital image forming apparatus disclosed in the described Gazette permits an automatic switching between the copy mode and the fax mode, and such arrangement permits an improved efficiency in copying or sending via facsimile the document image data, and also permits the image data as received in the fax mode to be output from the recording section.

The image data can be transmitted to a specific receiving end in the described fax mode of the digital image forming apparatus or by a generally used facsimile machine. However, in this case, the transmission of the image data is permitted only when the receiving end is fixed and can be identified. Namely, in the described method, emergency image data cannot be transmitted promptly if the receiving end cannot be identified, for example, when transmitting to a businessman who is always moving from one place to another to visit many clients.

On the other hand, when using the portable telephone that is widely used as a portable communication terminal, necessary information can be transmitted by communications even when the position of the person who possesses the portable telephone cannot be defined. However, such communication method does not permit image data to be transmitted.

In the opposite way of transmission where the businessman obtains a document to be transmitted to a predetermined receiving end immediately when he is at his destination, there is no way for him to transmit the document immediately unless he carries a portable facsimile machine. In practice; however, it is not convenient to carry such facsimile machine for its weight and size. Besides, when transmitting the document by the facsimile machine from his destination, it is troublesome to calculate a communication fee as it varies depending on distance, time, time range, service company, etc. Therefore, it is not easy to transmit the document by the described method.

SUMMARY OF THE INVENTION

In view of the foregoing, it is an object of the present invention to provide a digital image forming system which permits transmission/receiving of image data and visualization of the image data to be carried at high speed with ease even when a transmitter or a receiver of the image data is at his destination.

In order to achieve the above object, the digital image forming system in accordance with the present invention which adopts a generally used digital image forming apparatus, such as a digital copying machine, etc., and a generally used portable image communication device such as a portable telephone, etc., has the following arrangement:

Namely, the first digital image forming system of the present invention is arranged so as to have a digital image forming apparatus such as a digital copying machine; and a portable image communication device such a portable telephone, which can be carried independently of the digital image forming apparatus and can communicate with the digital image forming apparatus and other communication device, wherein the digital image forming apparatus includes image data forming means for reading a document image and converting the document image as read into image data, first memory means for storing therein the image data, and first control means for controlling the image data obtained from the image data generation mean to be stored in the first memory means and the image data as read from the first memory means to be transferred to the portable image communication device, and the portable image communication includes second memory means for storing therein the image data, and second control means for controlling the image data as transmitted from the digital image forming apparatus to be stored in the second memory means and the image data as read from the second memory means to be transferred to the other communication device.

According to the described arrangement of the first digital image forming system, in the digital image forming apparatus, the image data obtained from the image data forming means is stored in the first memory means by the first control means. Further, the image data stored in the first memory means is read by the first control means to be transmitted to the portable image communication device. In the portable image communication device, the image data as transmitted from the digital image forming apparatus is stored in the second memory means by the second control means. Further, the image data stored in the second memory means is read by the second control means to be transmitted to other communication device.

Therefore, for example, at one's destination, by carrying the portable image communication device such a portable telephone, which constitutes a digital image forming system together with the digital image forming apparatus installed therein, the document image can be easily read in the portable image communication device as image data by using the digital image forming apparatus at his destination without bringing a scanner along to the destination even when the digital image forming apparatus is not provided with a fax mode. Furthermore, the image data as read in the portable image communication device can be transmitted to the receiving end from a place as desired.

Additionally, by installing the digital image forming apparatus in a place where many people can use the apparatus, such as convenience stores which offer copy service or other shops, etc., by using a portable telephone which has been widely used as the portable image communication device, many people can appreciate the described convenient function of the digital image forming system. This function is appreciated especially when transmitting an emergency document to a specific receiving end from one's destination.

When using the described digital image forming system at one's destination, the cost required for transmitting the image data is charged for the portable image communication device which has a contract with, for example, a communication company or a telephone company, i.e., for example, the owner of the portable telephone, and complicated calculation and billing incurred when using the digital copying machine are not needed.

In one preferred form of the described first digital image forming system, the digital image forming apparatus further includes image transmission means for permitting the image data to be transmitted to the other communication device via a communication line, when the image transmission means is not permitted to transmit the image data to the other communication device, and a communication is permitted between the digital image forming apparatus and the portable image communication device, the first control means reads out the image data from the first memory means and transmits the image data as read to the portable image communication device.

According to the described arrangement, in a state where a transmission of the image data is not permitted from the image transmission means of the digital image forming apparatus to other communication device, and a communication is permitted between the digital image forming apparatus and the portable image communication device, the image data as stored in the first memory means of the digital image forming apparatus can be transmitted to the portable image communication device to be stored in the second memory means.

Therefore, the operator can transmit the image data to the receiving end at a time and from a place as desired using the portable image communication device without waiting there even when a communication with a specific receiving end is not permitted using the image transmission means of the digital image forming apparatus. Therefore, an operator in a hurry such as a businessman needs not care a time required from the setting to the completion of the transmission, thereby permitting an effective use of the operator's time at his destination.

In order to achieve the above object, the second digital image forming system of the present invention is arranged so as to have a digital image forming apparatus; and a portable image communication device which can be carried independently of the digital image forming apparatus and can communicate with the digital image forming apparatus and other communication device, wherein the digital image forming apparatus includes: image data forming means for reading a document image and converting the document image as read into image data, first memory means for storing therein the image data, first control means for controlling the image data obtained from the image data generation mean to be stored in the first memory means and the image data as read from first memory means to be transferred to the portable image communication device, and visualizing means for visualizing the image data stored in the first memory means, and the portable image communication device includes: second control means for transmitting the image data as transmitted from the digital image forming apparatus to said other communication device.

According to the described arrangement of the second digital image forming system, in the digital image forming apparatus, the image data obtained from the image information generation means is stored in the first memory means by the first control means. Additionally, the image data stored in the first memory means is read by the first control means, and the image data as read is transmitted to the portable image communication device. In the portable image communication device, the image data as transmitted from the digital image forming apparatus is transmitted to other communication device by the second control means.

Therefore, for example, at one's destination, by carrying along the portable image communication device such a portable telephone, which constitutes a digital image forming system together with the digital image forming apparatus installed therein, the document image data can be easily transmitted to other communication device using the digital image forming apparatus at one's destination without bringing a scanner along to the destination even when the digital image forming apparatus is not provided with a fax mode.

Additionally, by installing the digital image forming apparatus in a place where many people can use the apparatus, such as convenience stores which offer copy service or other shops, etc., by using a portable telephone which has been widely used as the portable image communication device, many people can appreciate the described convenient function of the digital image forming system. This function is appreciated especially when transmitting an emergency document to a specific receiving end at one's destination.

When using the described digital image forming system at one's destination, the cost required for transmitting the image data is charged for the portable image communication device which has a contract with a communication company such as a telephone company, i.e., for example, the owner of the portable telephone, and complicated calculation and billing incurred when using the digital copying machine are not needed.

In one preferred form of the second digital image forming system, the portable image communication device is arranged so as to further include second memory means for storing therein the image data, and that the first control means sequentially reads out the image data from the first memory means and transmits the image data as read to the portable image communication device at least when a communication is permitted between the digital image forming apparatus and the portable image communication device, and the second control means sequentially transmits the image data as transmitted from the digital image forming apparatus to the other communication device when a communication is permitted between the digital image forming apparatus and the portable image communication device and between the portable image communication device and the other communication device, and stores the image data as transmitted from the digital image forming apparatus in the second memory means when a communication is permitted between the digital image forming apparatus and the portable image communication device, and a communication is not permitted between the portable image communication device and the other communication device.

According to the described arrangement, in a state where a communication is permitted between the digital image forming apparatus and the portable image communication device, and a communication is permitted also between the portable image communication device and other communication device, the image data stored in the first memory means is sequentially read out, and the image data as read is transmitted to the portable image communication device. Then, the image data are transmitted sequentially to other communication device.

On the other hand, in a state where a communication is permitted between the digital image forming apparatus and the portable image communication device, and a communication is not permitted between the portable image communication device and other communication device, the image data stored in the first memory means is sequentially read out, and the image data as read is transmitted to the portable image communication device. Then, the image data is stored in the second memory means.

Therefore, when an attempt is made to transmit the image data obtained from the digital image forming apparatus installed in his destination to other communication device via the portable image communication device in the operator's possession, if a communication is not permitted between the portable image communication device and other communication device, the image data stored in the first memory means of the digital image forming apparatus is sequentially read out, and the image data as read is stored in the second memory means of the portable image communication device.

Therefore, the operator can transmit the image data at a time and from a place as desired using the portable image communication device even when a communication with a specific communication device is not permitted using the image transmission means of the digital image forming apparatus without waiting there. This permits an operator in a hurry such as a businessman to effectively use his time at his destination.

In another preferred form of the second digital image forming system, the digital image forming apparatus further includes display means for displaying information and input means for allowing an operator to perform an input operation, the second control means transfers information indicative of a telephone number of a receiving end that has been registered in the portable image communication device to the digital image forming apparatus, the first control means displays in the display means the information indicative of the telephone number as transferred from the portable image communication device and transmits specifying information for specifying the information indicative of the telephone number as specified by operating the input means to the portable image communication device, and the second control means transmits the image data as transferred from the digital image forming apparatus to the receiving end as specified by the specifying information.

According to the described arrangement, the operator can transmit the image data to the transmitting end which has been registered in the portable image communication device beforehand, only by specifying the telephone number information by the input means of the digital image forming apparatus. Therefore, a load of the operator can be reduced when transmitting the image data.

In still another preferred form, the second digital image forming system having the described arrangement is further arranged such that the first control means erases information regarding the image data as transmitted via the portable image communication device from the first memory means after a communication permitting state between the digital image forming apparatus and the portable image communication device has been cancelled.

According to the described arrangement, after a communication permitting state between the digital image forming apparatus and the portable image communication device has been cancelled, the information regarding the image data as transmitted via the portable image communication device, stored in the first memory means is erased. This eliminates such problem that information such as personal information of the operator, etc., remains in the digital image forming apparatus, i.e., external equipment, etc., which may be used for bad purposes.

Yet still another preferred from, the second digital image forming system is arranged such that the portable image communication device further includes second memory means, and the first control means transfers information regarding the image data as transmitted via the portable image communication device to the portable image communication device, and the second control means stores information regarding the image data as transferred from the digital image forming apparatus in the second memory means.

According to the described arrangement, the information regarding the image data as transmitted through the portable image communication device is stored in the second memory means of the portable image communication device, the operator can confirm the transmission state regarding the image data with ease by displaying the data, for example, on the display device of the portable image communication device. This permits the transmission of the image data to be controlled with ease.

In order to achieve the above object, the third digital image forming system is arranged so as to include a digital image forming apparatus; and a portable image communication device which can be carried independently of the digital image forming apparatus and can communicate with the digital image forming apparatus and other communication device, wherein the portable image communication device includes: memory means for storing image data, and control means for controlling the image data as transmitted from the other communication device to be stored in the memory means and the image data as read from the memory means to the digital image forming apparatus, and the digital image forming apparatus includes: visualizing means for visualizing the image data; and control means for sending the image data as transmitted from the portable image communication device to the visualizing means.

According to the described arrangement of the third digital image forming system, when the image data is transmitted from other communication device to the portable image communication device, the image data is stored in the memory means of the portable image communication device. Then, when the portable image communication device is permitted to communicate with the digital image forming apparatus, the portable image communication device reads the image data from the memory means and transmits the image data as read to the digital image forming apparatus. The image data as transmitted to the digital image forming apparatus is sent to the visualizing means to be visualized.

In the described arrangement of the digital image forming system, as the above-explained operation is permitted, the operator of the portable image communication device can surely send the image data as long as the person of the receiving end possesses the portable image communication device even when the operator of the portable image communication device, i.e., the person of the receiving end of the image data is at his destination and not in a specific place. Furthermore, the image data can be visualized and confirmed at his destination only by setting the portable image communication device in a communication permitting state with the nearest digital image forming apparatus which constitutes the digital image forming system. Therefore, the described digital image forming system permits emergency information which cannot be sent sufficiently by telephone to be sent for sure.

In one preferred from of the third digital image forming system, the portable image communication device includes informing means for informing that the image data has been stored in the memory means.

According to this arrangement, the person who possesses the portable image communication device can be informed that the image data has been transmitted promptly with ease without using, for example, a portable telephone. As a result, the operator of the portable image communication device can confirm the image data as transmitted promptly.

In order to achieve the above object, the fourth digital image forming system of the present invention is arranged so as to include a digital image forming apparatus, a transit device which serves as a transit for communication, and a portable image communication device which can be carried independently of the digital image forming apparatus, can communicate with the digital image forming apparatus and other communication device via the transit device, wherein the transit means includes: memory means for storing therein the image data as transmitted to the portable image communication device from the other communication device, and control means for transmitting informing information indicating that the image data has been stored in the memory means upon storing the image data in the memory means, and reading the image data from the memory means and transferring the image data as read to the portable image communication device upon receiving a request for transferring the image data from the portable image communication device, the portable image communication device includes: informing means for informing a receipt of the informing information upon receiving the informing information from the transit device, input means for inputting a request for transferring the image data, and control means for giving the transit device based on an input from the input means a request for transferring the image data to the portable image communication device and transferring the image data as transferred from the transit device to the digital image forming apparatus, and the digital image forming apparatus includes: visualizing means for visualizing the image data, and control means for sending the image data as transferred from the portable image communication device to the visualizing means.

According to the described arrangement of the fourth digital image forming system, the image data as transmitted from other communication device to the portable image communication device is stored in the memory means of the transit device. Here, the informing information indicative of this state is transmitted to the portable image communication device, and based on this informing information, the informing means performs an informing operation in the portable image communication device. As a result, the operator of the portable image communication device can see if the image data exists in the transit device. The operator can give a request for transferring the image data by an input through the input means. Based on the input, a request for transferring the image data is given from the portable image communication device to the transit device, and the image data is transferred from the transit device to the portable image communication device. The image data as transferred to the portable image communication device is further transferred to the digital image communication device. In the digital image forming apparatus, the image data is visualized by the visualizing means.

As described, in the digital image forming system, the image data as transmitted from other communication device is stored in the transit device, and in the portable image communication device, a request for transferring the image data is given when necessary. Therefore, it is not required to always ensure a large memory capacity for storing the image data in the portable image communication device, and the memory capacity of the portable image communication device can be effectively used for other purpose.

In order to achieve the above object, the fifth digital image forming system of the present invention includes a digital image forming apparatus, a transit device which serves as a transit for communication, and a portable image communication device which can be carried independently of the digital image forming apparatus, and can communicate with the digital image forming apparatus and other communication device via the transit device, wherein the transit means includes: memory means for storing the image data as transmitted to the portable image communication device from the other communication device, and control means for transmitting information indicating that the image data has been stored in the memory means upon storing the image data in the memory means, and reading the image data from the memory means and transferring the image data as read to the portable image communication device upon receiving a request for transferring the image data from the portable image communication device, the portable image communication device includes: the second memory means for storing the image data, informing means for informing a receipt of the informing information upon receiving the informing information from the transit means, and input means for inputting a request for transferring the image data, and the digital image forming apparatus includes: visualizing means for visualizing the image data, and control means for sending the image data as transferred from the portable image communication device to the visualizing means.

According to the arrangement of the fifth digital image forming system, the image data as transmitted from other communication device to the portable image communication device is stored in the memory means of the transit device. Here, the informing information indicative of this state is transmitted to the portable image communication device, and based on this informing information, the informing means performs an informing operation in the portable image communication device. As a result, the operator of the portable image communication device can see if the image data exists in the transit device. The operator can give a request for transferring the image data by an input through the input means. Based on the input, a request for transferring the image data is given to the transit device from the portable image communication device, and from the transit device, the image data is transferred to the portable image communication device. The image data transferred to the portable image communication device is stored in the second memory means of the portable image communication device. Thereafter, a communication becomes permitted between the portable image communication device and the digital image forming apparatus, and when transferring the image data from the portable image communication device to the digital image forming apparatus, the image data is visualized by the visualizing means in the digital image forming apparatus.

As described, in the described fifth image forming system, the image data as transmitted from other communication device is stored in the transit device, and the portable image communication device can give a request for transferring the image data when necessary. Therefore, it is not required to always ensure a large memory capacity for storing the image data in the portable image communication device, and the memory capacity of the portable image communication device can be effectively used for other purpose.

The image data as transferred to the portable image communication device from the transit device is temporarily stored in the second memory means of the portable image communication device from the transit device. Therefore, the operator can set the portable image communication device and the digital image forming device in a communication permitting state in an appropriate time, thereby visualizing the image data into an image.

For a fuller understanding of the nature and advantages of the invention, reference should be made to the ensuing detailed description taken in conjunction with the accompanying drawings.

DESCRIPTION OF THE PREFERRED EMBODIMENTS

FIRST EMBODIMENT

The following descriptions will explain the present invention in reference to FIG. 1 through FIG. 11.

Figure 2:
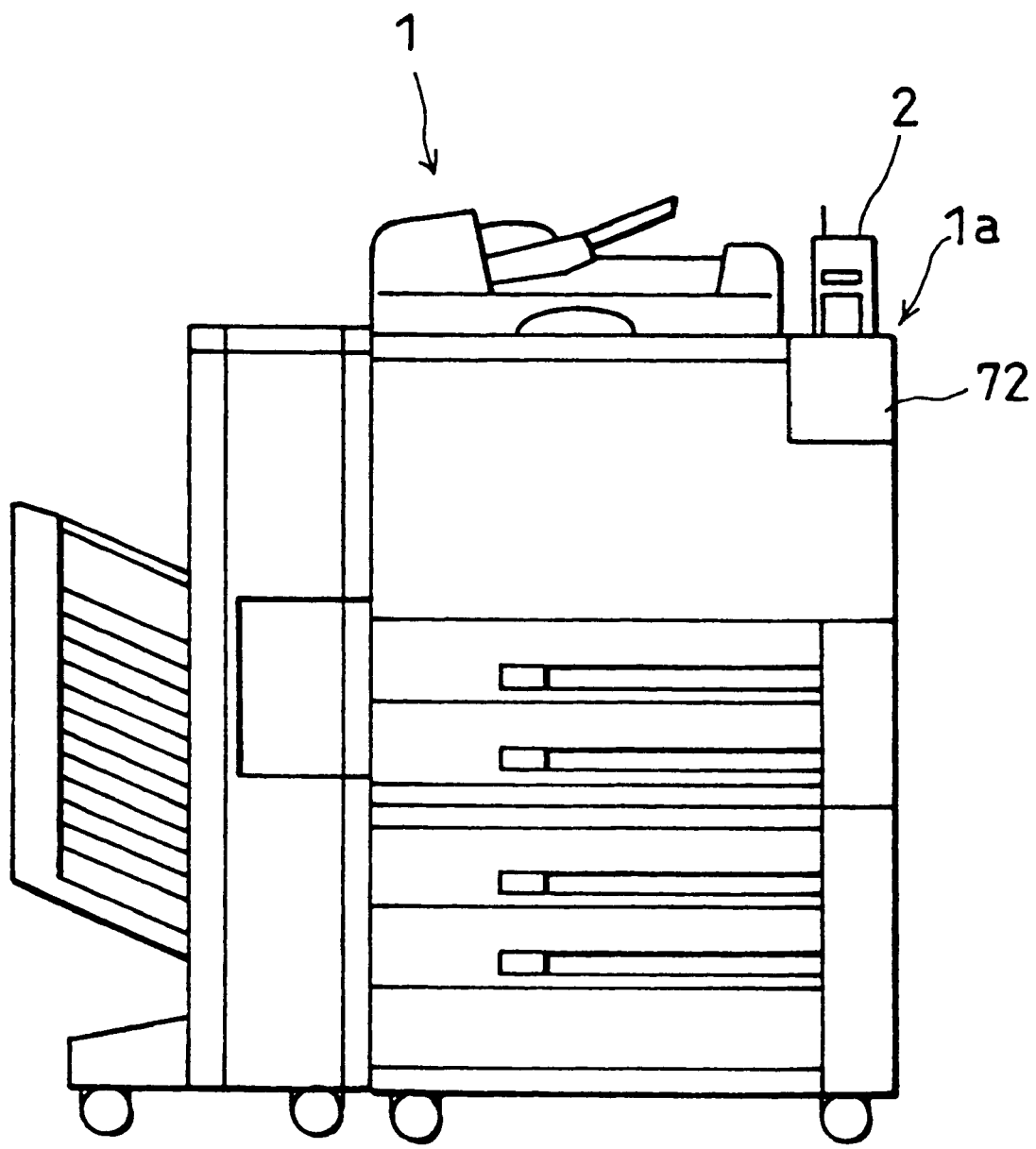
FIG. 2 is a front view showing a digital copying machine and a portable telephone which constitute the digital image forming system of FIG. 1 in a state where the portable telephone is installed in the digital copying machine.

As shown in FIG. 2, a digital image forming system of the present embodiment includes a digital copying machine 1 as a digital image forming apparatus and a portable telephone 2 as a portable image communication device. The portable telephone 2 permits communications with other communication device by means of a telephone communication network and is detachably installed in the digital copying machine 1.

Figure 3:
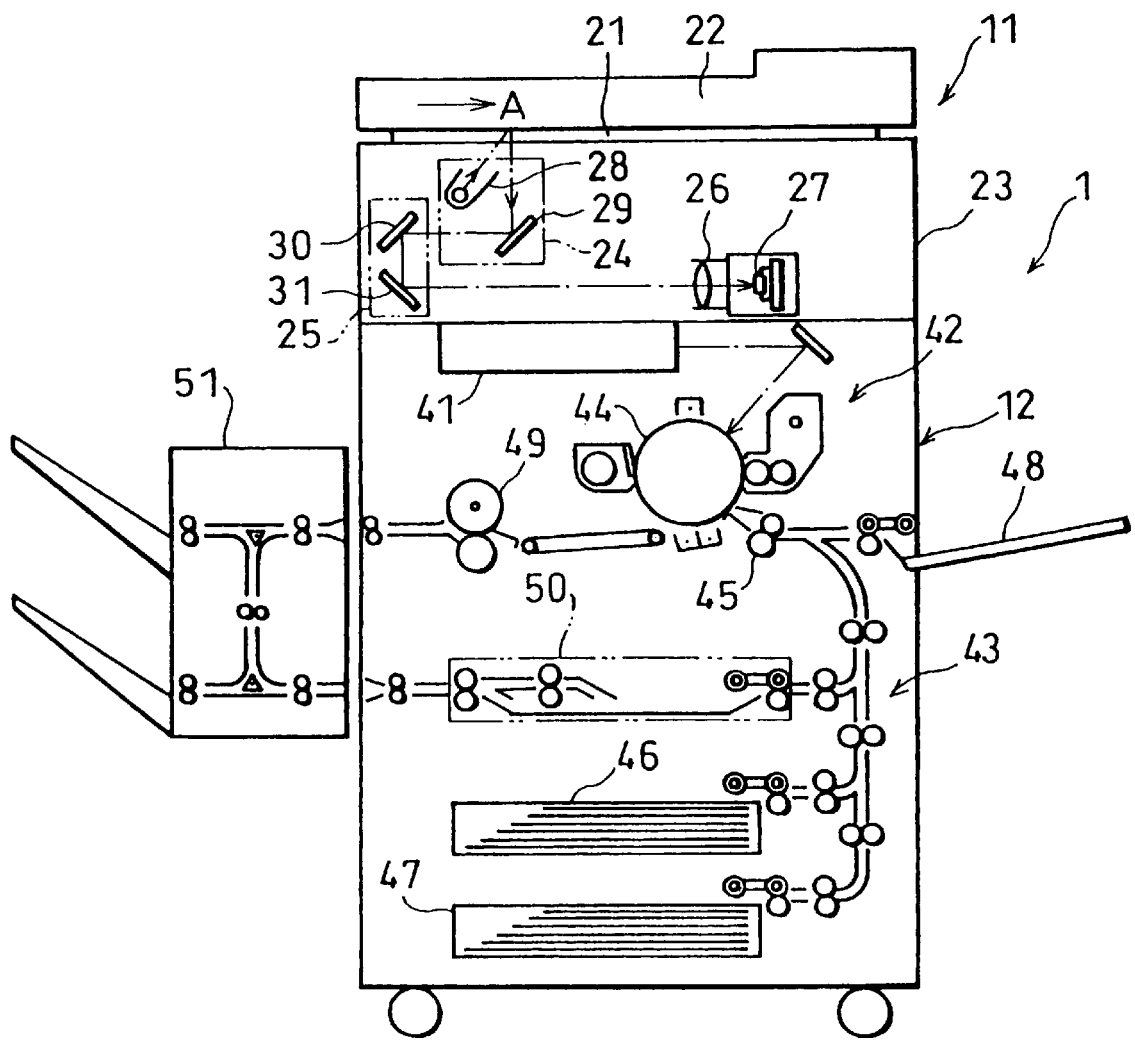
FIG. 3 is a longitudinal cross-sectional view showing a schematic inner structure of the digital copying machine shown in FIG. 2.

As shown in FIG. 3, the digital copying machine 1 is composed of a scanner section 11 and a laser printer section 12. The scanner section 11 includes a document platen 21 made of transparent glass, a recirculating automatic document feeder 22 (hereinafter referred to as RADF) for automatically feeding a document onto the document platen 21, and a scanner unit 23 for reading the image on the document placed on the document platen 21 by scanning.

The RADF 22 is a device for automatically feeding to the document platen 21, the document set on a document tray (not shown) at a time sheet by sheet. The RADF 22 includes a transport path for single-sided documents, a transport path for double-sided documents, a transport-path switching mechanism, a sensor group for recognizing and controlling a state of the document being passed through each section and a control section, etc., which are not shown so that one side or both sides of documents is/are read by the scanner unit 23 according to a selection made by an operator. This RADF 22 is known in the art.

The scanner unit 23 includes a first scanning unit 24, a second scanning unit 25, an optical lens 26 and a CCD (Charge Coupled Device) 27. The first scanning unit 24 includes a lamp reflector assembly 28 for exposing the surface of the document, and a first reflecting mirror 29 placed thereon for reflecting light reflected from the document for guiding the reflected image from the document. The second scanning unit 25 has a second reflecting mirror 30 and a third reflecting mirror 31 for guiding the reflected image from the first reflecting mirror 29 to the CCD 27. The optical lens 26 is provided for forming a reflected light image from the document on the CCD 27. The CCD 27 is provided for converting the reflected light image from the document into an electric image signal.

The scanner section 11 successively places documents on the document platen 21 by operations incorporating the RADF 22 and the scanner unit 23, and moves the scanner unit 23 along the bottom surface of the document platen 21 so as to read the image on the document sequentially placed on the document platen 21. Especially, the first scanning unit 24 scans at a constant velocity V in a direction of an arrow A shown in FIG. 3 along the document platen 21, and the second scanning unit 25 controls so as to scan in the same and parallel direction at a velocity of V/2. As a result, the document image is read by sequentially forming an image on the document placed on the document platen 21 on the CCD 27 line by line.

Figure 4:
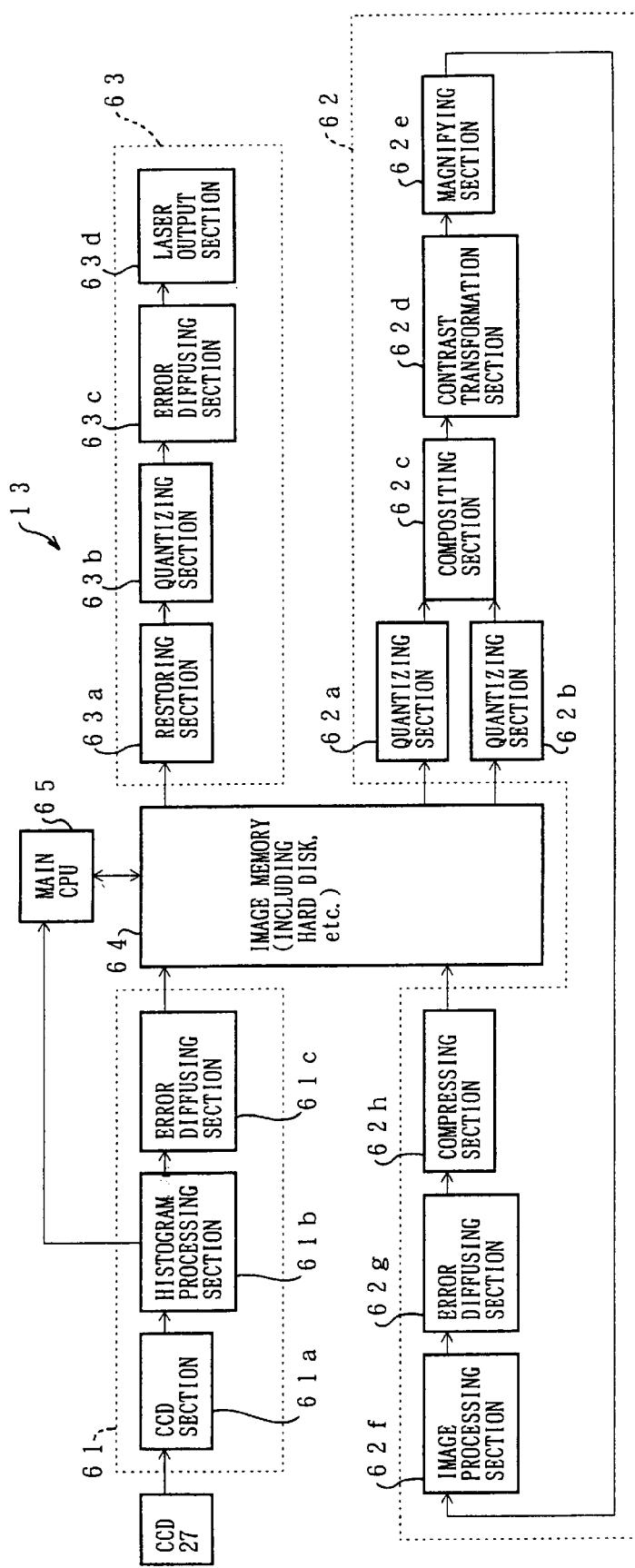
FIG. 4 is a block diagram of an image processing section provided in the digital copying machine shown in FIG. 2.

The image data obtained by reading an image on the document by the scanner unit 23 is sent to an image processing section 13, shown in FIG. 4, to be temporarily stored in an image memory 64 of the image processing section 13 after various processing have been applied. Then, the image data is read out from the image memory 64 according to an output instruction, and then transferred to the laser printer section 12, to form an image on a printing sheet.

The laser printer section 12 includes a laser writing unit 41, an electrophotographic processing unit 42 for forming an image and a sheet transport system 43 for transporting a recording sheet on which an image is to be formed.

The laser writing unit 41 includes a semiconductor laser source (not shown), a polygon mirror for deflecting the laser light at a constant angular velocity, and an f·θ lens for correcting the laser light deflected at a constant velocity by the polygon mirror to be deflected at a constant velocity on a photoreceptor drum 44. The semiconductor laser source is provided for emitting laser beam according to the image data transferred from the external device.

The electrophotographic processing section 42 includes the photoreceptor drum 44. The electrophotographic processing section 42 further includes a charger, a developing unit, a transfer unit, a separating unit, a cleaning unit, and a charge removing unit which are placed along the outer surface of the photoreceptor drum 44 in a known manner.

On the other hand, the sheet transport system 43 includes a transport section 45, cassette feeders 46 and 47, a manual feeder 48, a fuser 49, and a retransport path 50. The transport path 45 is provided for transporting a printing sheet to the electrophotographic processing section 42, particularly to the portion where the transfer unit is placed. The cassette feeders 46 and 47 are provided for feeding the printing sheet to the transport section 45. The manual feeder 48 is provided for feeding a printing sheet of a size as desired. The fuser 49 is provided for making a toner image to be permanently affixed onto the printing sheet. The retransport path 50 is provided for feeding the printing sheet having gone through the fuser 49 again to the transfer position for forming an image on the back surface of the printing sheet.

Further, a sheet post-processing apparatus 51 is provided on the downstream side of the fuser 49. The sheet post-processing apparatus 51 is provided for applying a predetermined post process such as a stapling process, etc., on the printing sheet having an image printed thereon.

In the laser printer section 12, the image data read from the image memory 64 is output as a laser beam by the laser writing unit 41. By scanning the surface of the photoreceptor drum 44 with the laser beam, an electrostatic latent image is formed on the surface of the photoreceptor drum 44. The electrostatic latent image is developed by a toner supplied from the developer to be formed into a toner image. The toner image is transferred onto one surface of the printing sheet being fed from either one of the feeding cassette 46 or 47 or the manual feeder 48 by the transfer unit, and the toner image is made permanent onto the printing sheet by the fuser 49. Thereafter, the printing sheet is processed by the post processing device 51, if necessary, to be discharged to the outside.

Additionally, as shown in FIG. 4, the digital copying machine 1 includes an image processing section 13 for performing various image processing with respect to the image data on the document read by the scanner section 11. Next, the structure and the function of the image processing section 13 will be explained.

The image processing section 13 includes an image data input section 61, an image data processing section 62, an image data output section 63, an image memory 64 composed of a RAM (random access memory) and a hard disk, etc., and a central processing unit (CPU) 65.

The image data input section 61 includes a CCD section 61a, a histogram processing section 61b and an error diffusing section 61c. The image data input section 61 converts the document image data obtained from the CCD 27 into binary data, and processes the image data by an error diffusing method while making a histogram as binary digital quantity. The processed image data is then temporarily stored in the image memory 64.

In the CCD section 61a, analog electric signals representing the densities of pixels of the image data are converted into digital signals by the A/D conversion. Thereafter, digital signals are corrected by the MTF (modulation transfer function) correction, the black-and-white level correction, or the gamma correction. Then, (8-bit) digital signals representing 256 tones are transmitted to the histogram processing section 61b.

In the histogram processing section 61b, the digital signal output from the CCD section 61a is added according to the pixel densities of 256 tones so as to obtain density information (histogram data). The histogram data is sent as pixel data to the error diffusing section 61c, and to the CPU 65 if necessary.

In the error diffusing section 61c, the 8-bit/pixel digital signal output from the CCD section 61a is converted into 1-bit (binary) digital signal, and a re-allocation is performed for faithfully reproducing the densities of local portions of the document according to the error diffusing method. The error diffusing method is a type of pseudo-halftone processing, wherein an error caused by the conversion to one bit is reflected when converting adjacent pixel into one bit.

The image data processing section 62 includes quantizing sections 62a and 62b, a compositing section 62c, a contrast transformation section 62d, a magnifying section 62e, an image processing section 62f, an error diffusing section 62g and a compressing section 62h. The image data processing section 62 converts the input image data into image data of a form as desired by the operator. The image data processing section 62 processes the image data until all the image data have been converted into a final form as desired by the operator and stored in the image memory 64. The described sections in the image data processing section 62 do not always perform their functions but perform their functions as the need arises.

The image data converted into a one-bit form by the error diffusing section 61c is reconverted into 256 tones by the quantizing sections 62a and 62b. In the compositing section 62c, a logical operation, i.e., logical OR, AND, or exclusive-OR operation is selectively carried out for each pixel. The data subjected to this operation is the image data stored in the image memory 64 and bit data from a pattern generator (PG: not shown). In the contrast transformation section 62d, the relationship between the output density and input density is freely determined based on a predetermined gradation transformation table with respect to the data representing 256 tones.

In the magnifying section 62e, interpolation is performed based on the known data input according to a selected magnification ratio so as to obtain pixel data (a density level) of target pixels after being magnified. Here, a magnification process is performed in a main scanning direction after executing a magnification process in a sub-scanning direction. In the image processing section 62f, the input pixel data undergoes various image processing, and information is collected, for example, to extract features from data string. The error diffusing section 62g performs a function similar to that of the error diffusing section 61c of the image data input section 61.

In the compressing section 62h, the one-bit data is compressed by run length encoding. If the image data has a final form of output image data, the compression of the image data is performed in the final processing loop.

The image data output section 63 includes a restoring section 63a, a quantizing section 63b, an error diffusing section 63c and a laser output section 63d. The image data output section 63 restores the compressed image data stored in the image memory 64, reconverts the data into data representing 256 tones, and converts the resulting data into two-bit data which give a smoother halftone image than one-bit data.

In the restoring section 63a, the image data compressed by the compressing section 62h is restored. The quantizing section 63b performs processing in the same manner as in the quantizing sections 62a and 62b of the image data processing section 62. The error diffusing section 63c performs processing in the same manner as in the error diffusing section 61c of the image data input section 61.

The laser output section 63d converts the digital image data into a laser ON/OFF signal according to the control signal from a sequence controller, not shown. The emission of the laser beam from the semiconductor laser in the laser writing unit 41 is controlled based on the ON/OFF signal, and an electrostatic latent image is formed on the photoreceptor drum 44.

The image data processed in the image data input section 61 and the image data output section 63 are basically stored in the form of one-bit data in the image memory 64 in order to save the memory capacity thereof. However, considering the degradation of the image data, the data may be stored in the form of two-bit data.

Figure 5:
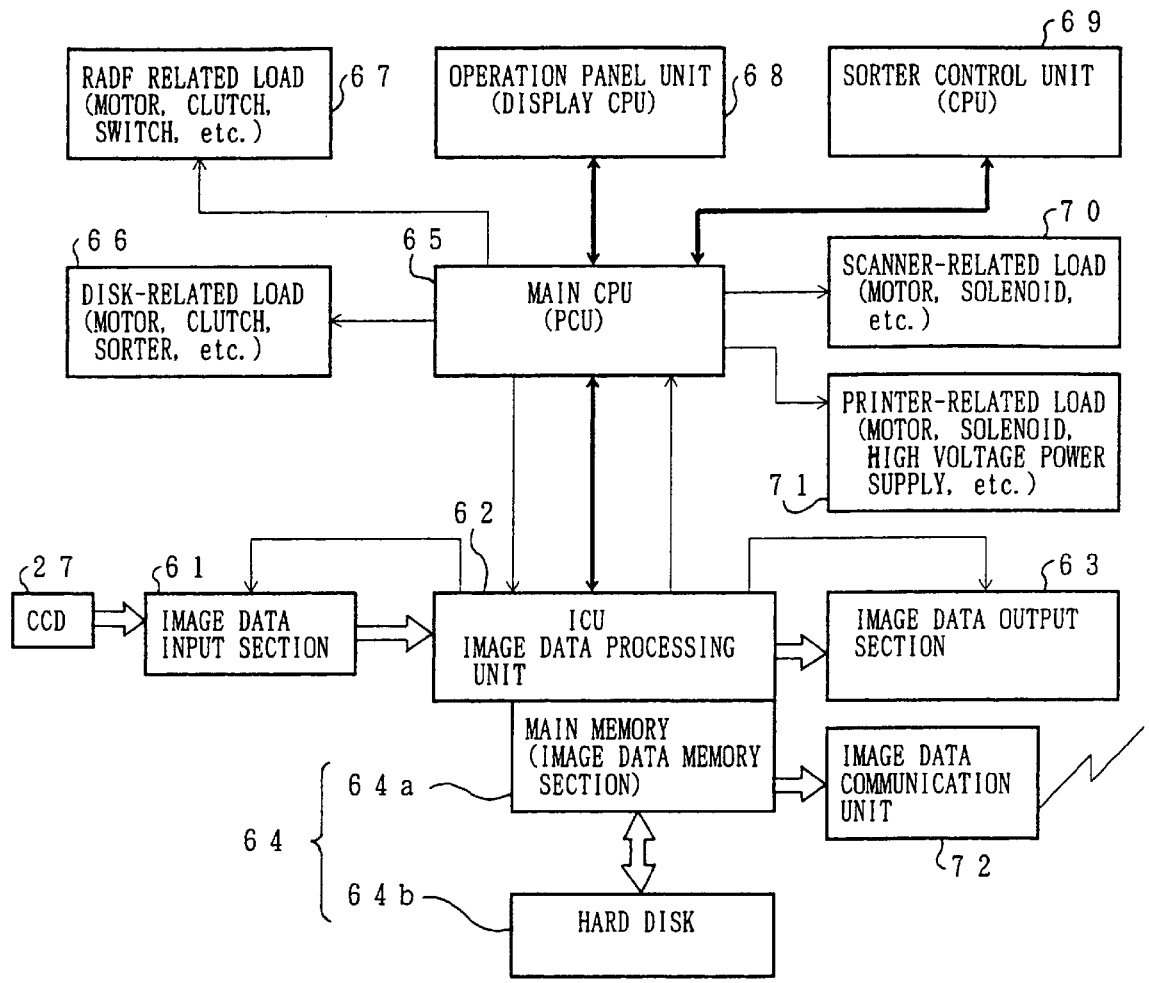
FIG. 5 is a block diagram showing a structure of a control system of the digital copying machine shown in FIG. 2.

Operations of the digital copying machine 1 are controlled by the CPU 65. The structure of the control system by the main CPU 65 is as shown in FIG. 5.

As shown in the figure, to the main CPU 65, connected are a disk-related load 66, a RADF related load 67, an operation panel unit 68, a sorter control unit 69, a scanner-related load 70, a printer-related load 71, and the image data processing unit 62.

The main CPU 65 controls respective sections by a sequence control, and outputs a control signal to each section when controlling. The disk-related load 66 indicates a load such as a motor, crutch, etc., in the cassette feeder 46, 47, or the manual feeder 48, or a load such as a motor, a clutch, etc., in the sorter of the post-processing device 51. The RADF related load 67 is a load such as a motor, clutch, and a switch, etc., in the RADF 22. The scanner-related load 70 is a load such as a motor, a solenoid, etc., in the scanner unit 23. The printer-related load 71 is a load such as a motor, solenoid, and a high voltage source, etc., in the electrophotographic processing section 42.

The sorter control unit 69 has a CPU, and an operation of the sorter is controlled based on a control signal from the main CPU 65.

The operation panel unit 68 which has a CPU serves as an input section for inputting various settings and instructions such as a copy mode, etc., by an operator with respect to the digital copying machine 1. The operation panel unit 68 transfers a control signal according to, for example, a copy mode selected by an input made by an operator to the main CPU 65. Then, based on the control signal, the digital copying machine 1 is operated in the selected mode. On the other hand, the main CPU 65 transfers a control signal indicative of an operation state of the digital copying machine 1 to the operation panel unit 68. The operation panel unit 68 displays the state to the display section to show the current operation state of the digital copying machine 1 based on the control signal.

Additionally, the image memory 64 connected to the image data processing section 62 is composed of a main memory 64a composed of, for example, a semiconductor memory, and a hard disk 64b. To the main memory 64a, an image data communication unit 72 is connected. This image data communication unit 72 enables communications of information such as image data, an image control signal, etc. with other digital information apparatus.

Figure 6:
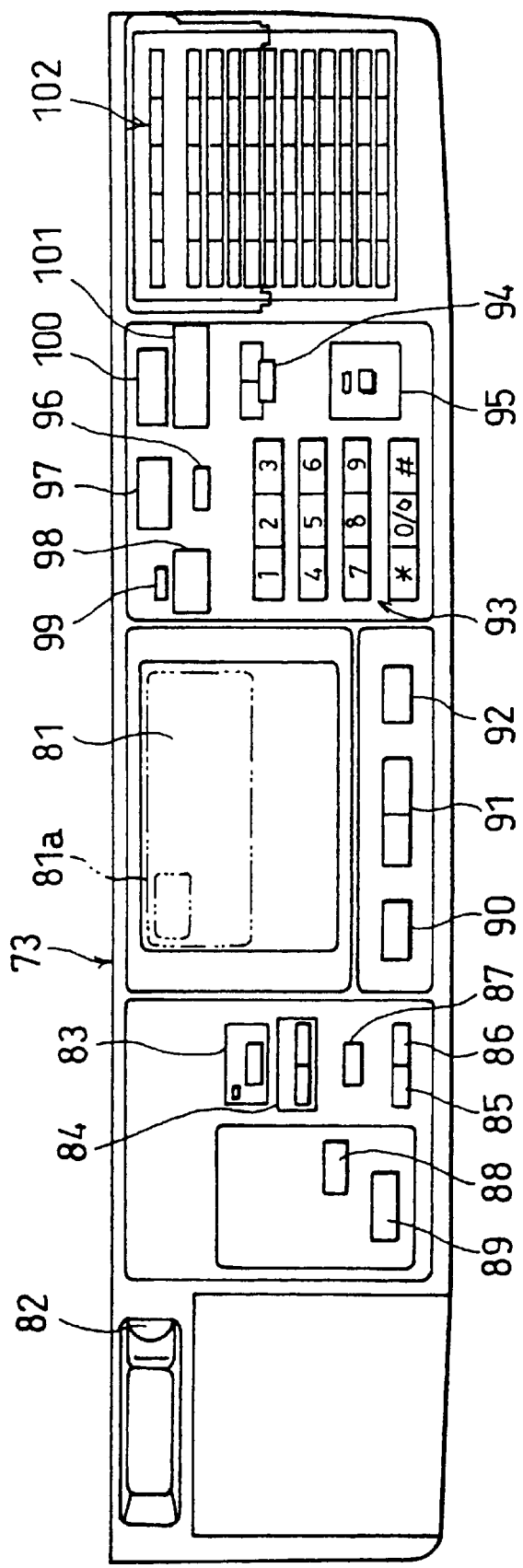
FIG. 6 is a front view of an operation panel provided in the digital copying machine shown in FIG. 2.

The operation panel unit 68 includes the operation panel 73 shown in FIG. 6. The operation panel unit 68 outputs information such as settings of the copy mode input from the operation through the operation panel 73 to the main CPU 65. Based on this information, the main CPU 65 operates the digital copying machine 1.

The operation panel 73 has a touch panel liquid crystal display device 81 formed at the central portion, and a group of various mode setting keys is formed so as to surround it. On a part of the screen of the touch panel liquid crystal display device 81, a screen switch instruction area 81a for switching a screen for selecting the image editing function is formed. Upon directly depressing the area 81a with a finger, a list of image editing functions is displayed on the screen of the liquid crystal display device 81 to allow the operator to select image editing functions. Then, an editing function is selected among various editing functions as desired by touching the area in which the function desired by the operator is displayed.

A group of various setting keys placed on the operation panel 73 will be briefly explained. A brightness adjusting dial 82 for adjusting the brightness of the screen of the liquid crystal display device 81 is formed at the left end in FIG. 6. Between this dial 82 and the liquid crystal display device 81, formed are an automatic magnification ratio selecting key 83, a zoom key 84, fixed magnification ratio keys 85 and 86, a 100% magnification ratio key 87, a screen mode setting key 88 and a post-processing mode setting key 89.

The automatic magnification ratio selecting key 83 is provided for automatically selecting the magnification. The zoom key 84 is provided for enabling the magnification ratio of copying to be set in percentage. The fixed magnification ratio keys 85 and 86 are provided for selecting a fixed magnification ratio. The 100% magnification ratio key 87 is provided for permitting the magnification to be set back to a normal magnification ratio (100%). The both-sided mode setting key 88 is provided for setting the both-sided mode, and the post-processing mode setting key 89 is provided for setting a predetermined post-processing mode.

In a vicinity of the liquid crystal display device 81, provided are a density switch key 90, a density adjustment key 91 and the tray selection key 92. The density switch key 90 is provided for switching a copy density adjustment from the automatic mode to the manual mode or the photograph mode in copying. The density adjustment key 91 is provided for permitting a fine adjustment of a density level in the manual mode or the photographic mode. The tray selection key 92 is provided for selecting a feeding device, i.e., a printing sheet of a size as desired among the cassette feeders 46, 47 and the manual feeder 48.

On the right hand side of the liquid crystal display device 81, provided are a number selecting key 93, clear key 94, a print switch 95, a reset key 96, an interruption key 97, an operation guide key 98, a message forwarding key 99, a memory transmission mode key 100, a mode switch key 101, and an one-touch dial key 102.

The number selecting key 93 is provided for selecting the number of copies to be produced. The clear key 94 is provided for clearing a selected number of copies, or interrupting successive copying operations before being completed. The print switch 95 is provided for instructing the start of copying. The reset key 96 is provided for cancelling all the modes currently set and restoring the normal mode. The interruption key 97 is pressed if a copy of another document needs to be produced during successive copying operations. The operation guide key 98 is pressed when the operator does not know how to operate the digital copying machine 1. Upon operating the operation guide key 98, how to operate the digital copying machine 1 is displayed on the liquid crystal display device 81. The message forward key 99 is pressed to change the massage displayed upon pressing the operation guide key 98 while forwarding the displayed message.

A memory transmission mode key 100, a mode switching key 101, a one touch dial key 102 are fax mode related keys. Specifically, a memory transmission mode key 100 is provided for transmitting a document that is once stored in memory. The mode switching key 101 is provided for selecting and switching a mode among copy, printer, fax, and portable telephone transmission modes which are the operation modes of the digital copying machine 1. The one-touch dial key 102 is provided for starting the transmission of a telephone call by an one-touch operation to an addressee whose telephone number has been stored in the digital copying machine 1 in advance.

The above-mentioned structure of the control panel 73, relating to the types and locations of the various keys, is merely an example. Therefore, the structure of the control panel 73 may vary depending on various functions provided in the digital copying machine 1.

Figure 7:
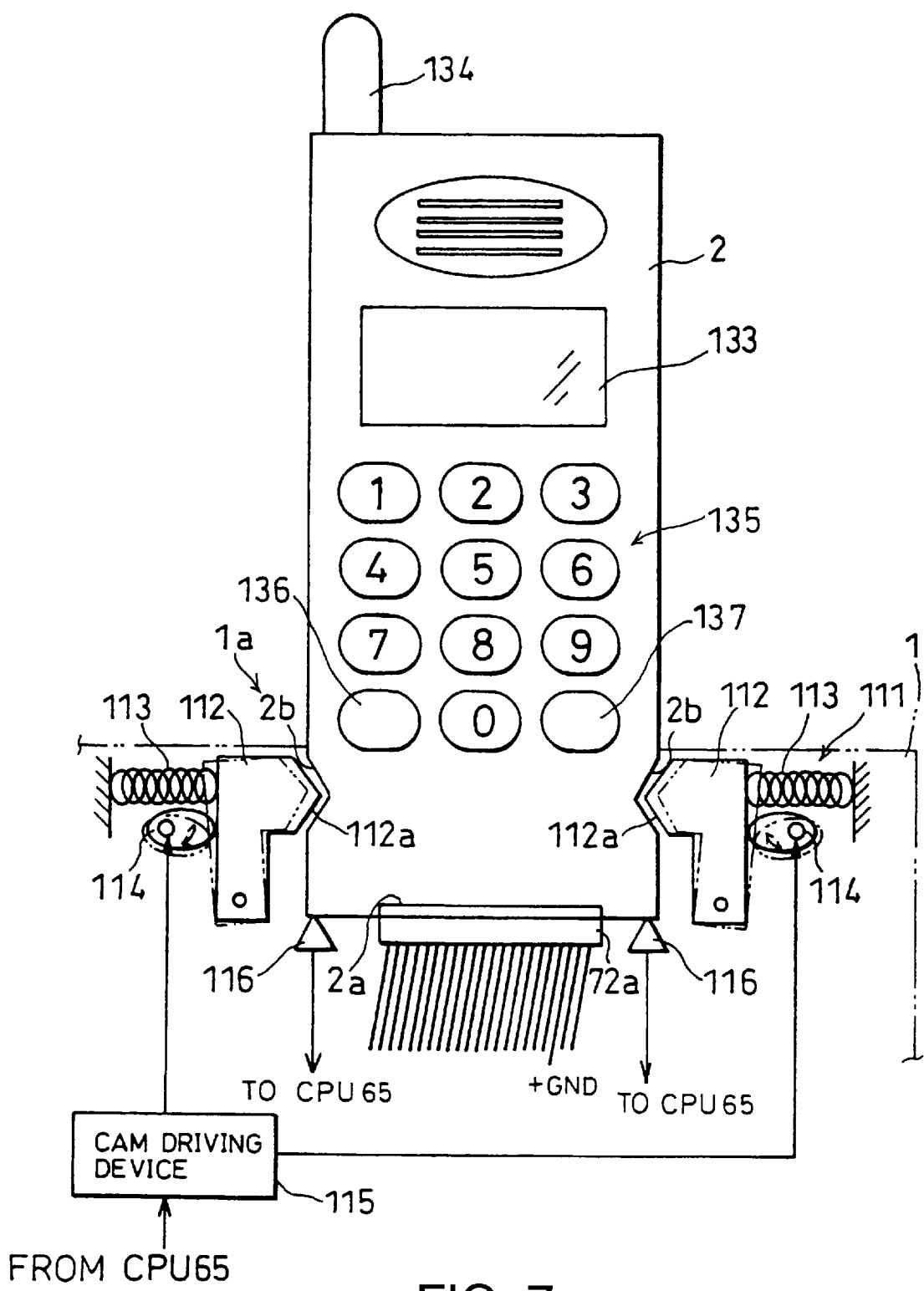
FIG. 7 is a front view schematically showing the portable telephone shown in FIG. 2 and the lock mechanism provided in the digital copying machine.

As shown in FIG. 2, the digital copying machine 1 has the portable telephone 2 installed in a detachable manner. In an installing section 1a, the image data communication unit 72 is provided. This image data communication unit 72 is a modem device used, for example, in a normal facsimile communication, etc. Image data modulated in the image data communication unit 72 is input to the portable telephone 2 and is transmitted to other communication device through the portable telephone 2. For this purpose, the image data communication unit 72 and the portable telephone 2 respectively have a connector 72s and a connector 2a as shown in FIG. 7. The portable telephone 2 also includes a display section 133, an antenna 134, dial keys 135 (0–9), a redial key 136, an input key 137 which allows predetermined instructions to be input, etc. As provided in the normal telephones, the redial key 136 is provided for calling the lastly called number again to simplify the recalling operation.

The image data is sent to the image data communication unit 72, for example, in the following manner. Namely, the document to be transmitted is set in the RADF 22, and upon pressing the print switch 95, the scanner section 11 starts reading a document image. Then, after having gone through a process as desired by the image processing section 13, the resulting image data is sequentially taken in the image memory 64. On the other hand, the receiving end input in the operation panel 73 is called by the portable telephone 2, and a connection to the receiving end is completed. Thereafter, the image data stored in the image memory 64 is supplied to the image data communication unit 72, thereby transmitting the described image data.

The image processing section 13 does not always simply send the image data to the portable telephone 2 via the image data communication unit 72, and may transmit the image data after converting it in a form suited for the communication device of the receiving end.

Figure 1:
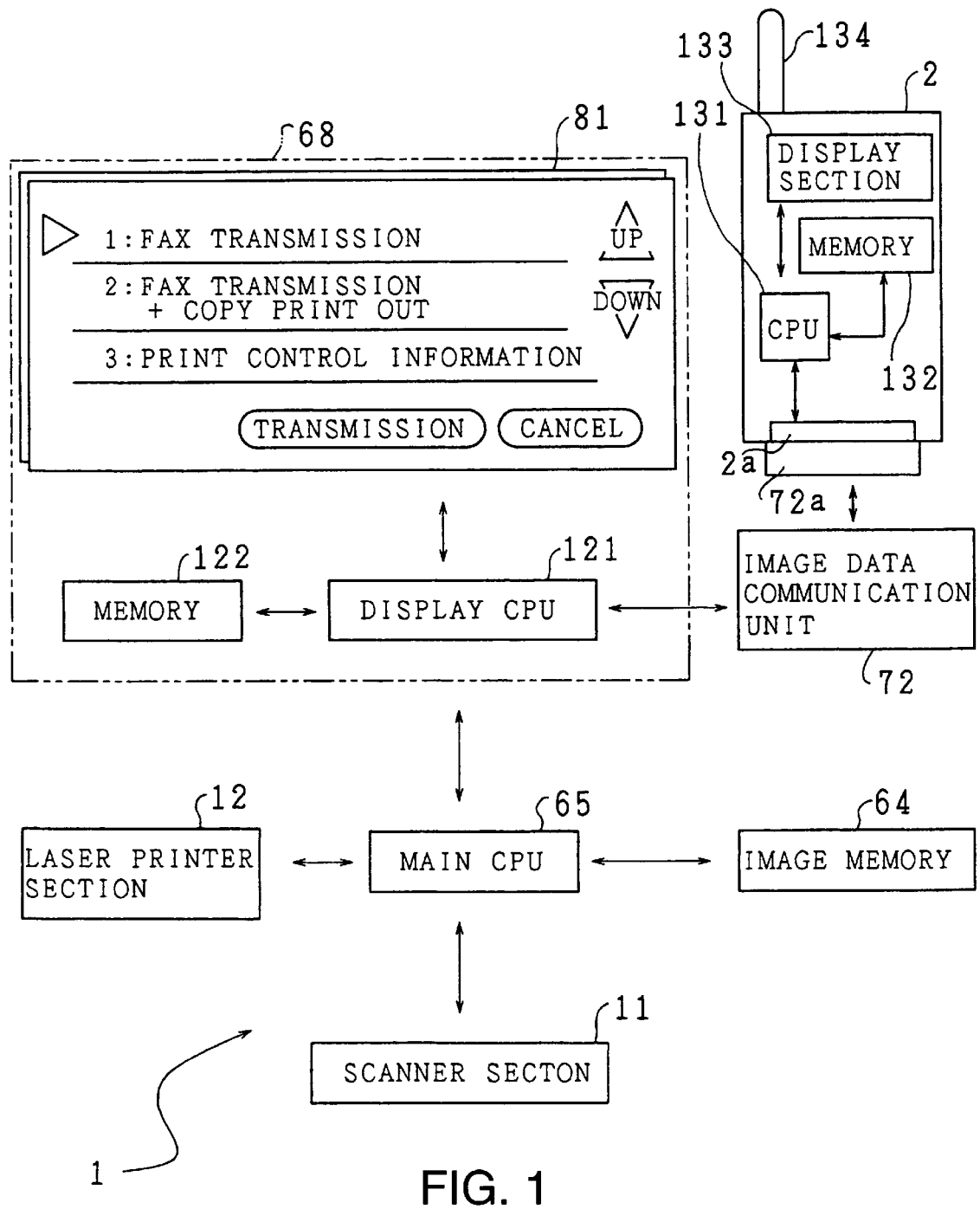
FIG. 1 is a block diagram schematically showing a structure of a digital image forming system in accordance with one embodiment of the present invention.

To enable the described operation, the control circuit shown in FIG. 1 is constituted by the digital copying machine 1 and the portable telephone 2. The digital copying machine 1 includes the main CPU 65 for controlling an entire digital copying machine and a display CPU 121 for controlling the operation panel unit 68, wherein the display CPU 121 is connected to the display memory 122. As described, the main CPU 65 controls respective operations of members including the scanner section 11, the laser printer section 12, the image processing section 13 including the image memory 64, etc. The main CPU 65 is allowed to communicate with the display CPU 121, and sets various mode based on instructions from the operator to be input through the operation panel 73 of the operation panel unit 68 to control operations of the digital copying machine 1.

The digital copying machine 1 includes a fax function part as image transmission means constituted by the scanner section 11, the main CPU 65, the image memory 64, the image data communication unit 72 and the operation panel 73, etc. Here, the fax function part includes the image data communication unit 72. In this case, the image data communication unit 72 is also connected to the telephone line.

On the other hand, the portable telephone 2 includes a CPU 131, a memory 132, a display section 133 and an antenna 134, etc. Here, the CPU 131 contained the memory 132 and the display section 133 and controls an entire operation of a portable telephone 2. The image data transferred from the digital copying machine 1 through the image data communication unit 72 is stored in the memory 132.

The installing section 1a has a lock mechanism 111 for preventing the portable telephone 2 from being detached from the installing section 1a undesirably. This lock mechanism 111 is constituted by a pair of lock claws 112, a pair of springs (elastic member) 113 and a pair of eccentric cams 114 as well as a cam drive unit 115 for driving the eccentric cams 114 and a pair of portable telephone installing sensors 116.

The pair of lock claws 112 is provided so as to face the respective side faces of the portable telephone 2 installed in the installing section 1a. The lower part of the lock claw 112 is installed in the installing section 1a so as to freely rotate, and the claw sections 112a formed in the upper portion are formed so as to face each other. Corresponding to the described pair of claws 112a, the portable telephone 2 includes recessed parts 2b to mate with the claws 112a. The pair of springs 113 pull the upper part of the lock claws 112 in a direction of being apart from the portable telephone 2.

The eccentric cams 114 are respectively in contact with the lock claws 112 and rotate the lock claws 112 towards the portable telephone 2 is the tensile force of the springs 113. Upon pressing by cams 114 are cancelled when a request for locking the digital copying machine is not given. The described arrangement prevents the portable telephone 2 from being removed from the digital copying machine 1 by mistake in the locked state as requested.

In the present embodiment, the requested locked state suggests the state where communications of image data, etc., are being carried out between the digital copying machine 1 and the portable telephone 2.

Instead of having the described locking mechanism 111, it may be also arranged such that the portable telephone 2 is covered when installing it in the installing section 1a, and this opening/closing mechanism of this cover is locked in the locked state.

In the described arrangement, the digital image forming system of the present embodiment will be explained below in detail.

In the digital image forming system of the present application, the image data held by the digital copying machine 1 is transferred to the the eccentric cams 114, the claws 112a of the lock claws 112 are fitted in the recessed parts 2b of the portable telephone 2 installed in the installing section 1a to prohibit the portable telephone 2 from being detached from the installing section 1a. The described state indicates the locked state of the lock mechanism 111. On the other hand, when the pressing operation by the eccentric cam 114 is cancelled, the lock claws 112 are pulled by the strings 113 to be separated from the portable telephone 2. As a result, the portable telephone 2 can be detached from the installing section 1a. The described state indicates the lock cancellation state of the lock mechanism 111.

Portable telephone installing sensors 116 are provided for detecting a state of the portable telephone 2 being installed in or detached from the installing section 1a. A detection signal of the portable telephone installing sensors 116 are input to the main CPU 65. The main CPU 65 detects the installed state by the portable telephone installing sensors 116, and controls the cam drive units 115 such that the pressing operation by the eccentric portable telephone 2, to allow the image data to be transmitted to other communication device through the portable telephone 2. The described operations are to be performed in the image transmission mode. In the image transmission mode, in the state where the portable telephone 2 is installed in the digital copying machine 1, the image data is transferred to the portable telephone 2 from the digital copying machine 1. Thereafter, the portable telephone 2 is detached from the digital copying machine 1, and the image data can be transferred to other communication device through the portable telephone 2.

Figure 8:
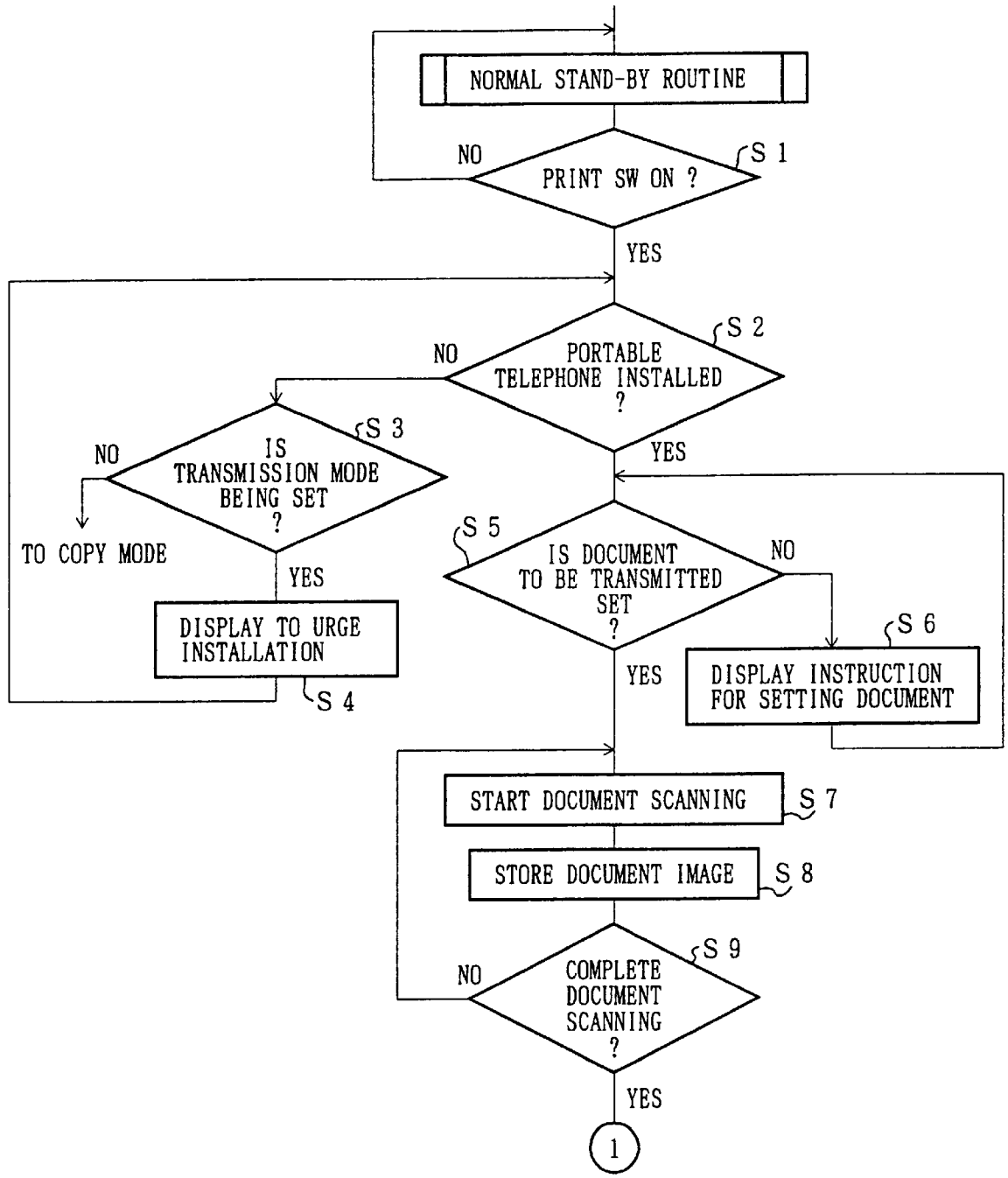
FIG. 8 is a flowchart showing an operation of the digital copying machine shown in FIG. 1.
Figure 9:
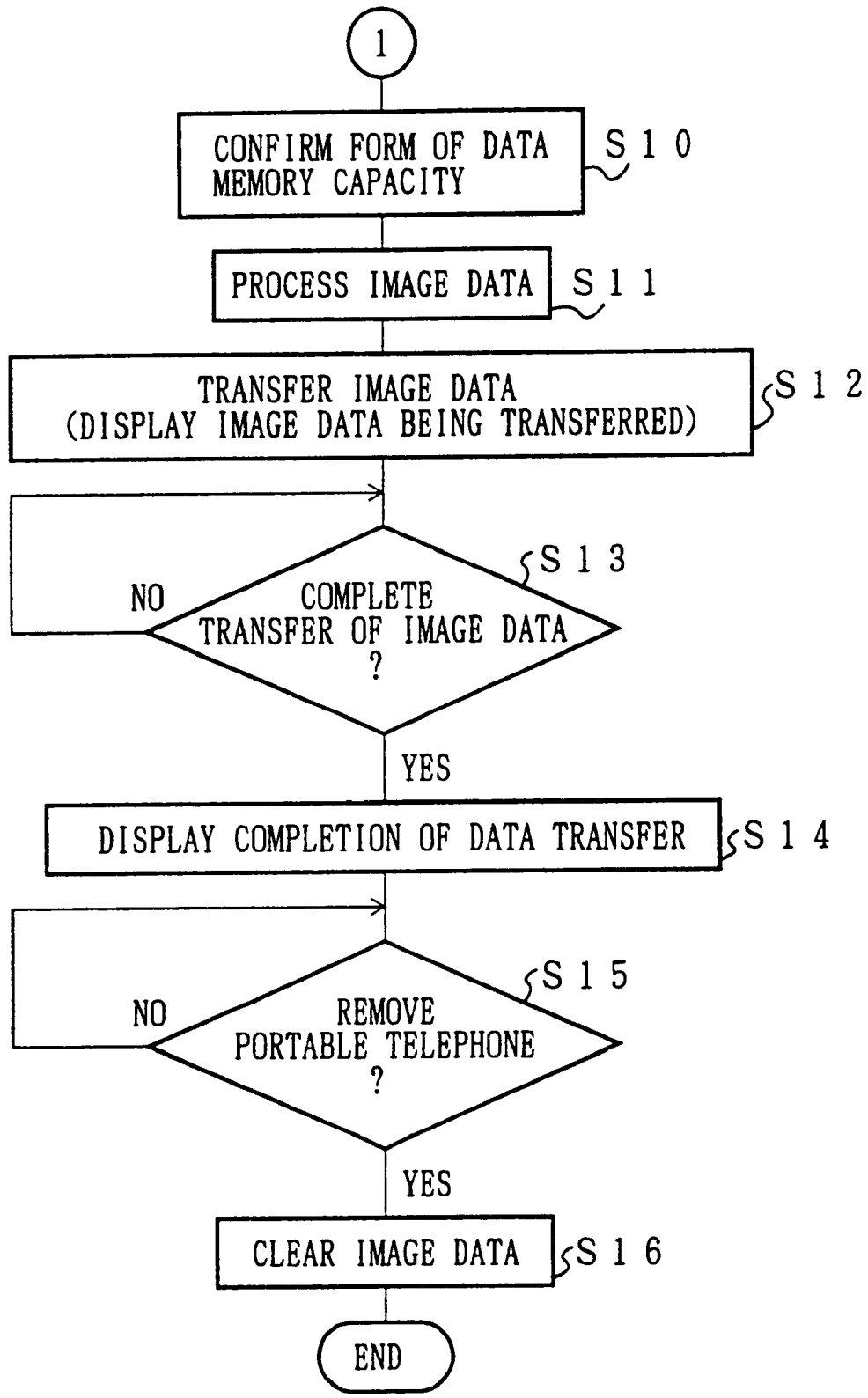
FIG. 9 is a flowchart explaining an operation subsequent to the operation shown in FIG. 8.

First, in the portable telephone transmission mode, the image data of the document read by the scanner section 11 is transferred to the portable telephone 2 following the processes shown in the flowcharts of FIG. 8 and FIG. 9.

In the described operation, various inputs are made beforehand through the operation panel 73 by the operator such as an input for instructing the document image to be sent to other communication device using the portable telephone 2, an input for instructing the portable telephone transmission mode, and an input for specifying the receiving end. Thereafter, the document is set, for example, in the RADF 22, and upon switching ON the print switch 95 (S1), the main CPU 65 confirms if the portable telephone 2 is installed in the installing section 1a of the digital copying machine 2 (S2) based on the detection signal of the portable telephone installing sensors 116 (S2).

Here, if the portable telephone 2 is not installed in the installing section 1a, it is detected if the image transmission mode is set (S3). As a result, if it is confirmed that the image transmission mode is set, a display is made by the liquid crystal display device 81 to urge the operator to install the portable telephone 2 (S4). Then, the digital copying machine 1 is set in a wait state until an installation of the portable telephone 2 is completed. The described display is performed in such a manner that the display CPU 121 controls the liquid crystal display device 81 based on an instruction from the main CPU 65. On the other hand, in S3, if the image transmission mode is not selected, it is determined that a copy mode for copying the document is selected, and operations in the mode as selected is performed.

In S2, if it is determined that the portable telephone 2 is installed in the installing section 1a, it is determined if the document is set, for example, in the RADF 22 (S5). As a result, if it is determined that the document is not set, a display is made by the liquid crystal display device 81 for urging the document to be set (S6). In S2, if it is determined that the portable telephone 2 is installed in the installing section 1a, the lock mechanism 111 is set in the locked state with respect to the portable telephone 2.

Additionally, in S5, if the document is not set in the RADF 22, a scanning of the document is started (S7). As a result, the image on the document is sequentially read, and the resulting image data as read is stored in the image memory 64 of the image processing section 13 (S8).

In the described manner, when all the image date on the document have been stored in the image memory 64 (S9), the main CPU 65 confirms the type of the image data that can be processed in the portable telephone 2 and the memory capacity of the memory 132 of the portable telephone 2 by communicating with the CPU 131 of the portable telephone 2 (S10). As a result, if the memory 132 has a sufficient memory capacity for storing the image data to be transferred from the digital copying machine 1, the main CPU 65 converts the image data stored in the image memory 64 into the form that can be processed in the portable telephone 2 (S11), and is transferred to the portable telephone 2 (S12). Here, a message "the image data is being transmitted" is displayed by the liquid crystal display device 81. On the other hand, if the memory 132 does not have a sufficient memory 132 for storing all the image data, a message "not enough memory" is displayed (S14). Here, the lock mechanism 111 is set in the lock cancellation state with respect to the portable telephone 2.

Thereafter, based on the message, when the portable telephone 2 is detached from the digital copying machine 1 (S15) by the operator, the image data stored in the image memory 64 is removed (S16).

When the operator removes the portable telephone 2 from the digital copying machine 1, by using various processing functions provided in the portable telephone 2, further processes are applied to the image data stored in the CPU 131, or stored without being removed, or transmitted to other communication device (image transmission mode).

Figure 10:
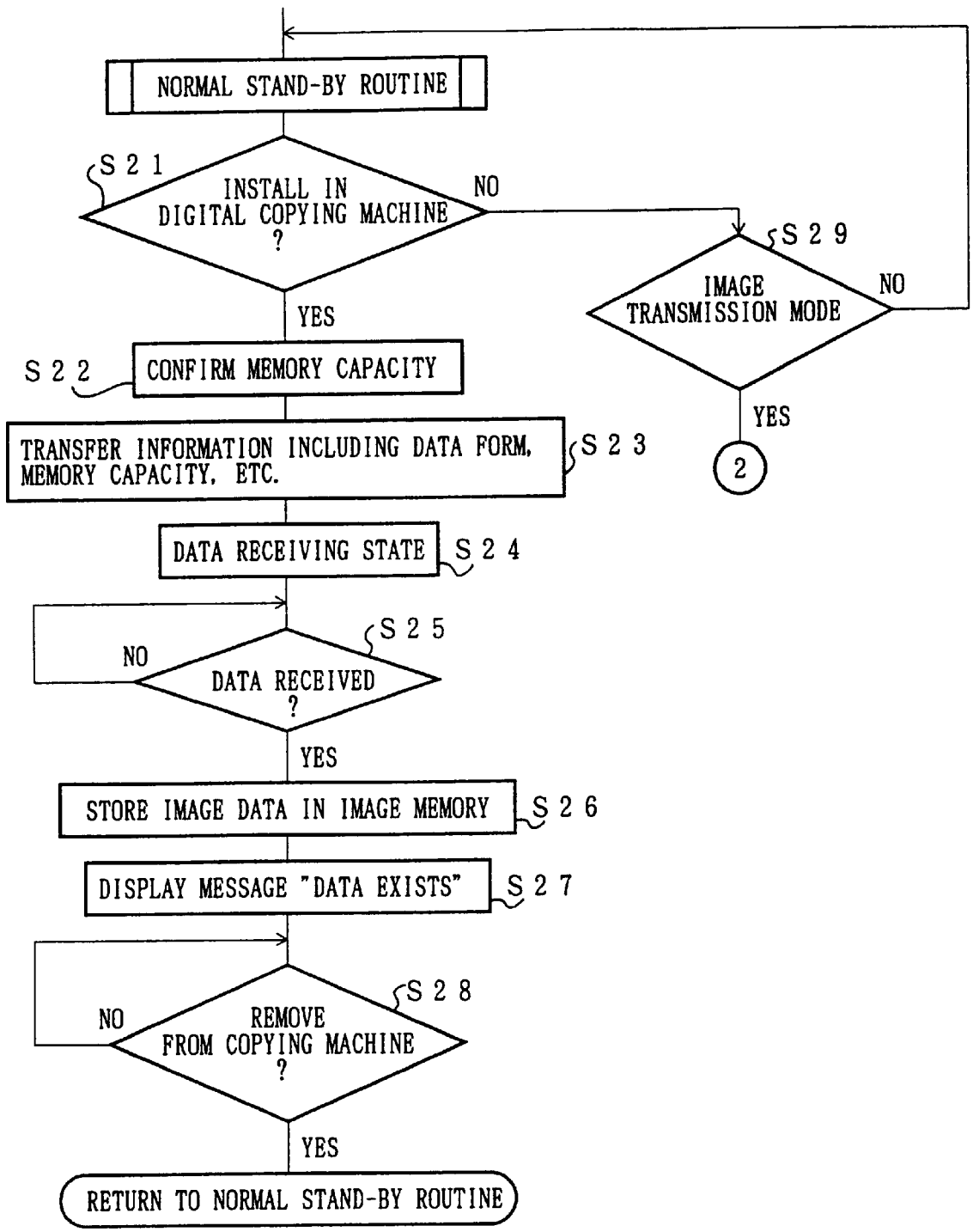
FIG. 10 is a flowchart showing an operation of the portable telephone shown in FIG. 1 corresponding to the operations shown in FIG. 8 and FIG. 9 of the digital copying machine.
Figure 11:
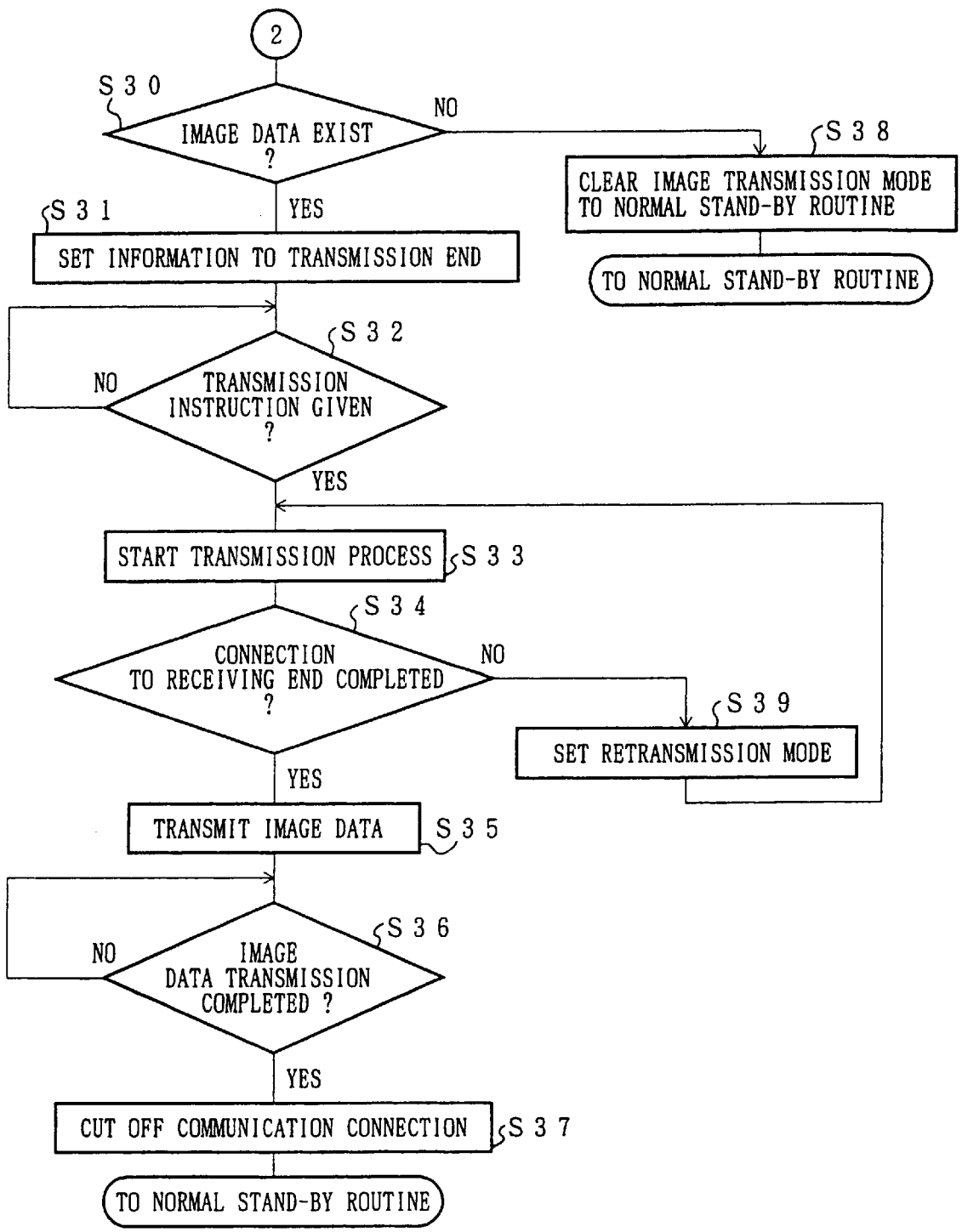
FIG. 11 is a flowchart explaining an operation subsequent to the operation shown in FIG. 10.

In the portable telephone transmission mode, the portable telephone 2 performs operations following the processes shown in the flowcharts of FIG. 10 and FIG. 11. In S21 through S28 in FIG. 10 are the processes of receiving image data transferred from the digital copying machine 1 when the digital copying machine 1 is installed. S29 through S39 are the processes in the case where the portable telephone 2 is detached from the digital copying machine 1 after the image data has been received, and the image data is transmitted to other communication device alone.

In FIG. 10 and FIG. 11, the CPU 131 of the portable telephone 2, first, it is determined if the portable telephone 2 is installed in the digital copying machine 1 (S21). This determination is made based on if, for example, the CPU 131 can communicate with the main CPU 65 of the digital copying machine 1.

When the portable telephone 2 is installed in the digital copying machine 1, the CPU 131 confirms the content of the memory 132 (S22), and information with regard to the capacity of the memory 132, and the form of the image data that can be processed by the portable telephone 2 is transmitted to the main CPU 65 of the digital copying machine 1 (S23). Thereafter, the portable telephone 2 is set in the state of receiving the data from the digital copying machine 1, and is set in the stand-by state (S24).

Next, upon receiving the image data from the digital copying machine 1 (S25), the image data is stored in the memory 132 (S26). Here, the CPU 131 displays a message indicating that additional image data is stored in the memory 132 by the display section 133 (S27).

Thereafter, when the portable telephone 2 is detached from the digital copying machine 1 by the operator (S28), the receiving of the image data from the digital copying machine 1 is completed, and a sequence goes to the stand-by state routine in the normal processing mode.

If it is determined in S21 that the portable telephone 2 is not installed in the digital copying machine 1, and the image transmission mode is selected (S29), it is confirmed if the image data transmitted from the digital copying machine 1 exists in the memory 132 (S30). As a result, if the image data is stored in the memory 132, the CPU 131 sets information indicative of the receiving end of the image data (S31).

Thereafter, by the operation by the operator, upon inputting a transmitting instruction in the portable telephone 2 (S32), a process of transmitting the image data is started (S33).

Next, when the portable telephone 2 has been connected to the transmitting end (S34), the CPU 131 starts a transmission of the image data stored in the memory 132 (S35). Here, the transmission of the image data is performed by a modulating circuit (not shown), a communication device (not shown), an antenna 134, etc., provided in the portable telephone 2.

Thereafter, upon completing the transmission of the image data (S36), the CPU 131 cuts off the communications with the transmitting end (S37), and a sequence goes to the stand-by state routine in the normal processing mode. On the other hand, if the portable telephone 2 cannot be connected to the receiving end in S34, a retransmission mode is set again (S39), and the described transmitting procedures are continued until the connection is completed.

On the other hand, in S30, if the image data to be transmitted is not stored in the memory 132 (S38), operations are terminated, and a sequence goes to the stand-by state routine in the normal processing mode.

In the described operation, if the person has the portable telephone 2 which constitutes the digital image forming system as well as the digital copying machine 1 at his destination, without carrying along the scanner device to his destination, an image on the document can be taken in the portable telephone 2 by using the digital copying machine 1 installed in his destination. Additionally, the image data taken in the portable telephone 2 can be transmitted to the receiving end from a position at a time as desired from the portable telephone 2. Namely, the image data can be transmitted to the receiving end without being tight up by the position where the digital copying machine 1 is located or time available in the digital copying machine 1.

When transmitting the image data to the portable telephone 2 from the digital copying machine 1, the image data is transferred to the portable telephone 2 after being converted on the side of the digital copying machine 1 that can be processed by the portable telephone 2. Therefore, the portable telephone 2, for which a reduction in size is demanded, the structure for converting the image data can be eliminated, thereby simplifying the structure, and suppressing an amount of use of the memory 132 for storing the image data to the minimum. As a result, a miniaturization of the portable telephone 2 is not hindered.

In the case of transferring the image data to the portable telephone 2 from the digital copying machine 1, it is confirmed to see if there is a sufficient memory capacity for storing the image data to be transferred from the digital copying machine 1. When the memory 132 has a sufficient memory capacity for storing the image data, the image data is transferred to the portable telephone 2 from the digital copying machine 1. On the other hand, when the digital copying machine does not have a sufficient memory capacity, the transfer of the image data is stopped. Therefore, the transfer of the image data in vain from the digital copying machine 1 to the portable telephone 2 as well as reading of the image data into the memory 132 in vain can be prevented. Additionally, an operation of the digital image forming system by the overflown data from the memory 132 can be prevented. Additionally, a trouble such as a stoppage of the operation of the digital image forming system due to the data in excess of the capacity of the memory 132, etc., can be prevented beforehand.

The above explanations have been given through the case of adopting the arrangement where the portable telephone 2 is detachable from the digital copying machine 1. However, it may be arranged such that the portable telephone 2 communicates with the digital copying machine 1 by a radio ray communication, etc. Additionally, it is not necessarily arranged such that the digital copying machine 1 is detachable from the digital copying machine 1. The portable telephone 2 may face the digital copying machine 1 when it is permitted with the digital copying machine 1 including the case of communicating using the infrared rays.

SECOND EMBODIMENT

Figure 12:
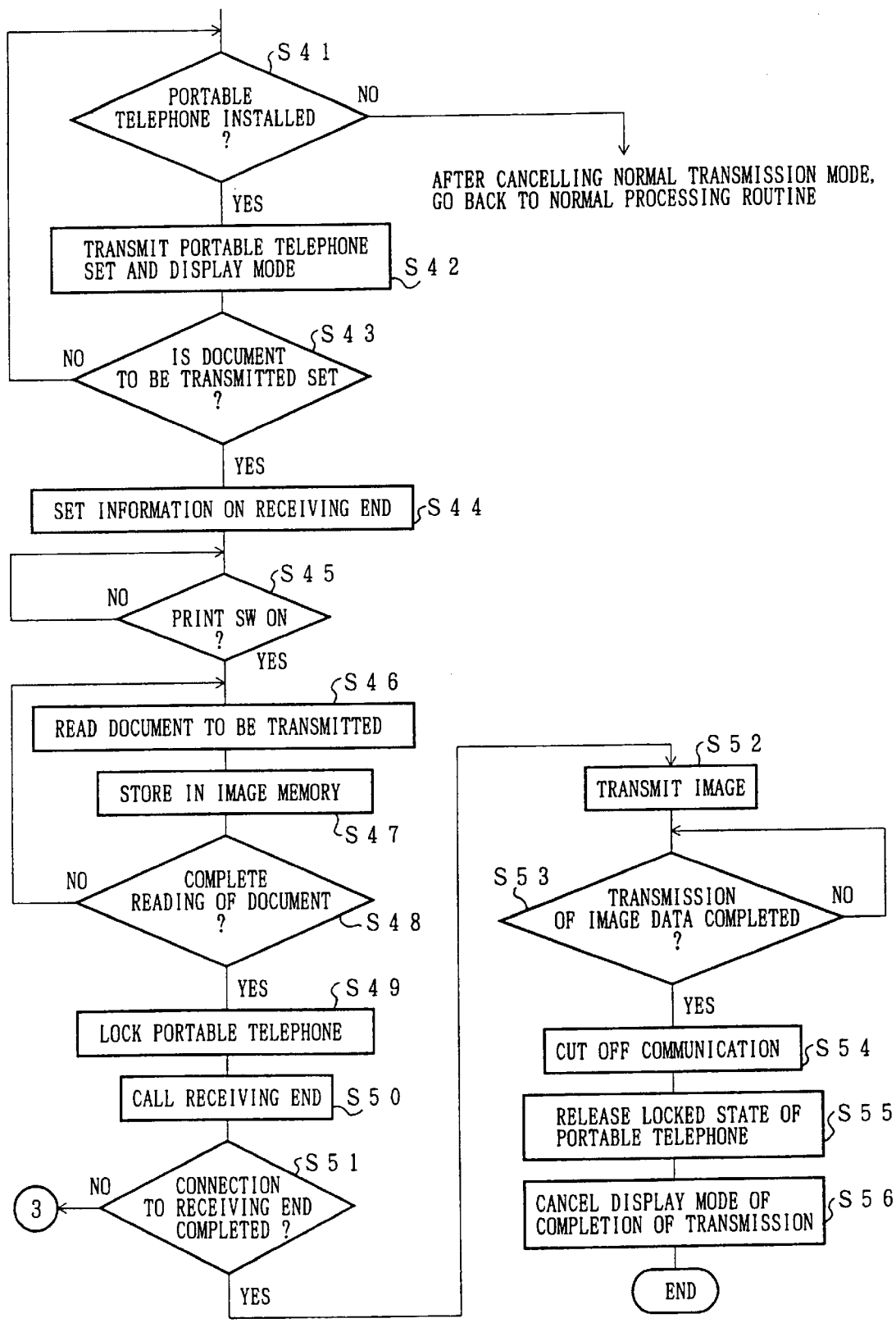
FIG. 12 is a flowchart showing respective operations of a digital copying machine and a portable telephone of a digital image forming system in accordance with another embodiment of the present invention.
Figure 13:
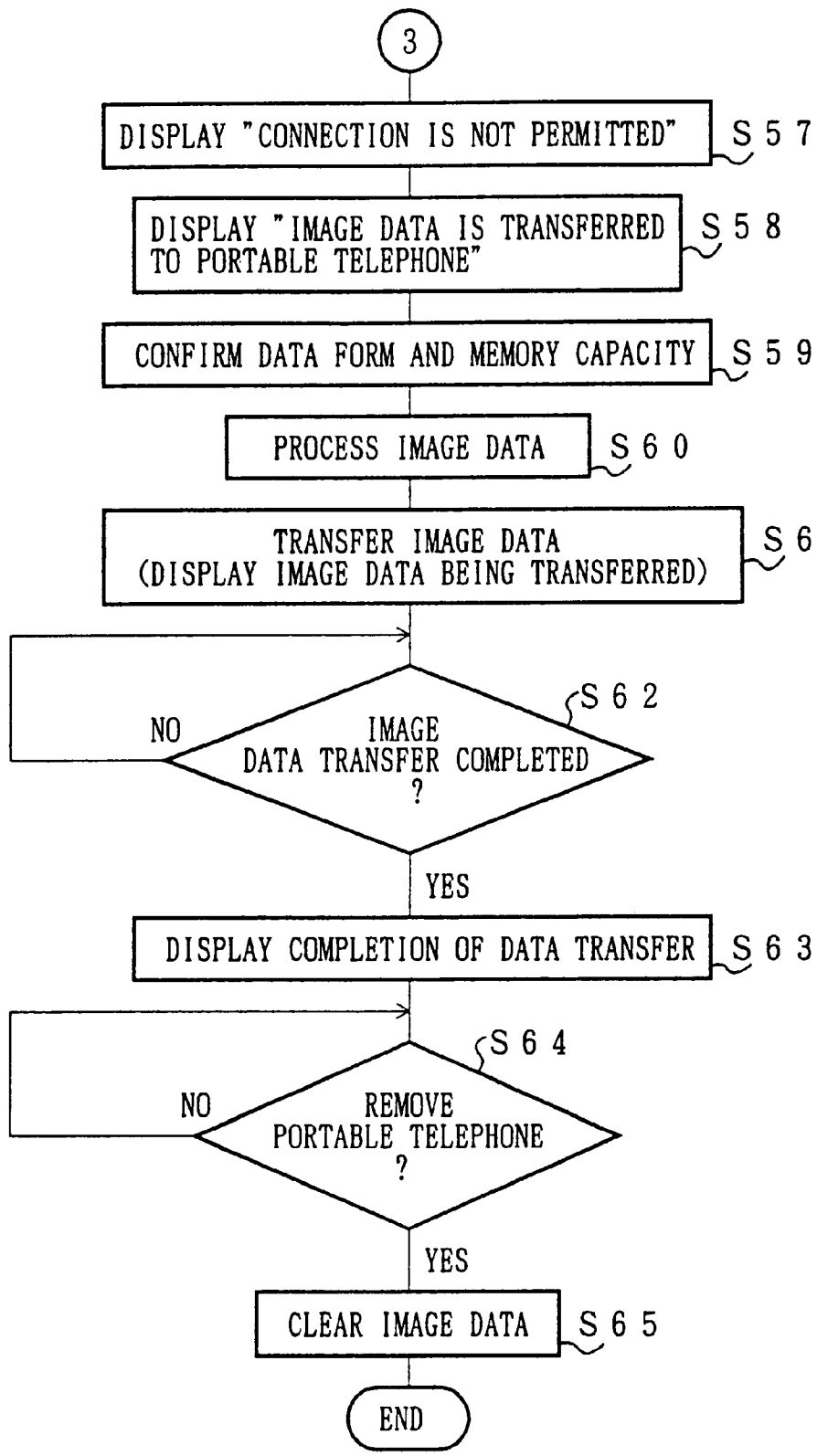
FIG. 13 is a flowchart explaining an operation subsequent to the operation shown in FIG. 12.

The following descriptions will explain another embodiment in reference to FIG. 12 and FIG. 13.

A digital image forming system of the present invention has the same arrangement as the digital image forming system adopted in the previous embodiment except for the following. That is, instead of having the image transmission mode, the digital image forming system of the present embodiment has a portable telephone transmission mode shown in FIG. 12 and FIG. 13.

In the portable telephone transmission mode, first, in the state where the portable telephone 2 is installed in the digital copying machine 1, a transmission of the image data of the document as read by the scanner section 11 of the digital copying machine 1 is performed with respect to a specific receiving end through the portable telephone 2. Here, if the portable telephone 2 cannot be connected to other communication device of the receiving end for transmission of the data, the image data stored in the image memory 64 of the digital copying machine 1 is transferred to the portable telephone 2 to be stored in the memory 132 of the portable telephone 2. As a result, it is permitted to transmit the image data to a specific receiving end through the portable telephone 2.

Next, operations in the portable telephone transmission mode will be explained in reference to the flowcharts shown in FIG. 12 and FIG. 13.

For example, in the wait state in the normal processing mode, when installing the portable telephone 2 in the digital copying machine 1 by the operator (S41), the portable telephone transmission mode is set in the digital image forming system, and this state is displayed in the liquid crystal display device 81 (S42).

Thereafter, the transmission-use document is set, for example, in the RADF 22 (S43), and the information indicative of the receiving end is input by the one-touch dial key 102 of the operation panel 73 (S44). Upon pressing the print switch 95 (S45), the document image is read by the scanner section 11 (S46). The resulting image data is stored in the image memory 64 (S47). Thereafter, upon completing the reading of the document (S48), the lock mechanism 111 locks the portable telephone 2 (S49).

Thereafter, the receiving end is called from the portable telephone 2 to be connected thereto (S50). When the portable telephone 2 has been connected to the receiving end (S51), the image data stored in the image memory 64 is sequentially transmitted to the receiving end through the portable telephone 2 (S52).

Next, upon completing the transmission of the image data (S53), the connection between the portable telephone 2 to the receiving end is cut off (S54), and the lock mechanism 111 is set in the lock cancellation state with respect to the portable telephone 2 (S55). Thereafter, a message indicative of the completion of the image data transmission is displayed, and the portable telephone transmission mode is cancelled (S56).

In S51, if the portable telephone 2 cannot be connected to the receiving end, the main CPU 65 of the digital copying machine 1 displays a message indicating that the connection cannot be made by the liquid crystal display device 81 (S57). The main CPU 65 displays a message indicative of transferring the image data from the image memory 64 on said liquid crystal display device 81. Additionally, the main CPU 65 confirms the form of the data which the portable telephone 2 accepts, and also confirms the memory capacity of the memory 132 by communicating with the CPU 131 of the portable telephone 2 (S59). Additionally, if the memory 132 does not have a sufficient memory capacity for storing the image data, an operation is stopped. On the other hand, if the memory 132 has a sufficient memory capacity for storing the image data, an operation is continued.

Thereafter, the main CPU 65 converts a form of the image data stored in the image memory 64 which the portable telephone 2 accepts (S60), and is transferred to the portable telephone 2 (S61). Here, the image data as well as the information indicative of the receiving end are transferred. Additionally, a message "the image data is being transferred" is displayed by the liquid crystal display device 81. The information indicative of the receiving end is stored in the memory 132 of the portable telephone 2, and is read out by operating the redial key 136 of the portable telephone 2. Therefore, when transmitting the image data through the portable telephone 2, the operator needs not operate the dial key 135.

As described, upon completing the transfer of the image data to the portable telephone 2 from the digital copying machine 1 (S62), a message indicative of the completion of the data transfer is displayed by the liquid crystal display device 81 (S63). Here, the lock mechanism 111 is set in a lock cancellation state.

Thereafter, based on the described message, when the portable telephone 2 is deleted from the digital copying machine 1 by the operator (S64), the image data stored in the image memory 64 is erased (S65).

Then, after the portable telephone 2 is removed from the digital copying machine 1, by using various processing functions provided in the portable telephone 2, the operator is allowed to perform various processes to the image data stored in the CPU 131 such as applying a further process, storing the image data without erasing or transmitting the image data to other communication device (image transmission mode), etc.

According to the described operation, when the image data cannot be transmitted to a specific receiving end from the digital copying machine 1, by using the portable telephone 2, the image data can be transmitted to the receiving end at a time from a place as desired. Therefore, it is no longer necessary for the operator to wait for the transmission of the image data to be completed. This permits an operator in a hurry such as a businessman to effectively use his time at the place where the digital copying machine 1 is installed for example, at his destination.

According to the described operation, only by operating the redial key 136, the image data can be transmitted to a specific receiving end from the portable telephone 2, and it is not necessary to operate the dial key 135 for facsimile numbers, thereby permitting the image data to be transmitted from the portable telephone 2 to a specific removing end in a simple manner.

When the portable telephone 2 cannot be connected to a specific receiving end, the digital copying machine 1 transmits the message to the operator by the liquid crystal display device 81, and then transfers the image data stored in the digital copying machine 1 to the portable telephone 2. This permits an operator to confirm the process of the image data, thereby permitting disturbances on operation by the operator, and inconveniences such as transmission error or unable transmission of the image data of important documents to be surely prevented.

Additionally, when transferring the image data from the digital copying machine 1 to the portable telephone 2, information indicative of the receiving end is transmitted simultaneously, and the portable telephone 2 permits the receiving end to be called by operating the redial key 136. Therefore, when transmitting the image data from the portable telephone 2, an operation of the dial key 135 by the operator is not needed, thereby permitting a simple operation of calling the receiving end.

THIRD EMBODIMENT

Figure 14:
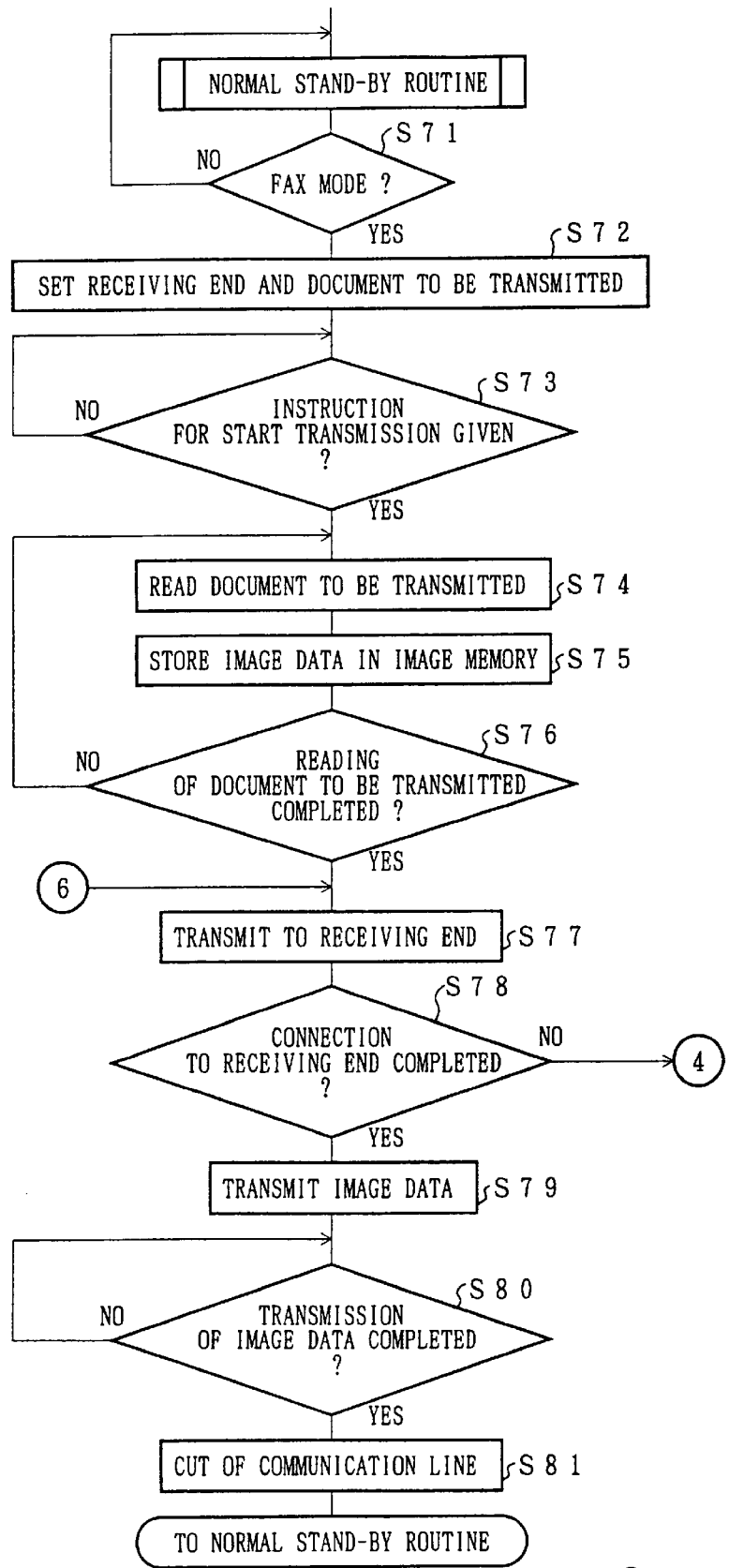
FIG. 14 is a flowchart showing respective operations of a digital copying machine and a portable telephone of a digital image forming system in accordance with still another embodiment of the present invention.
Figure 15:
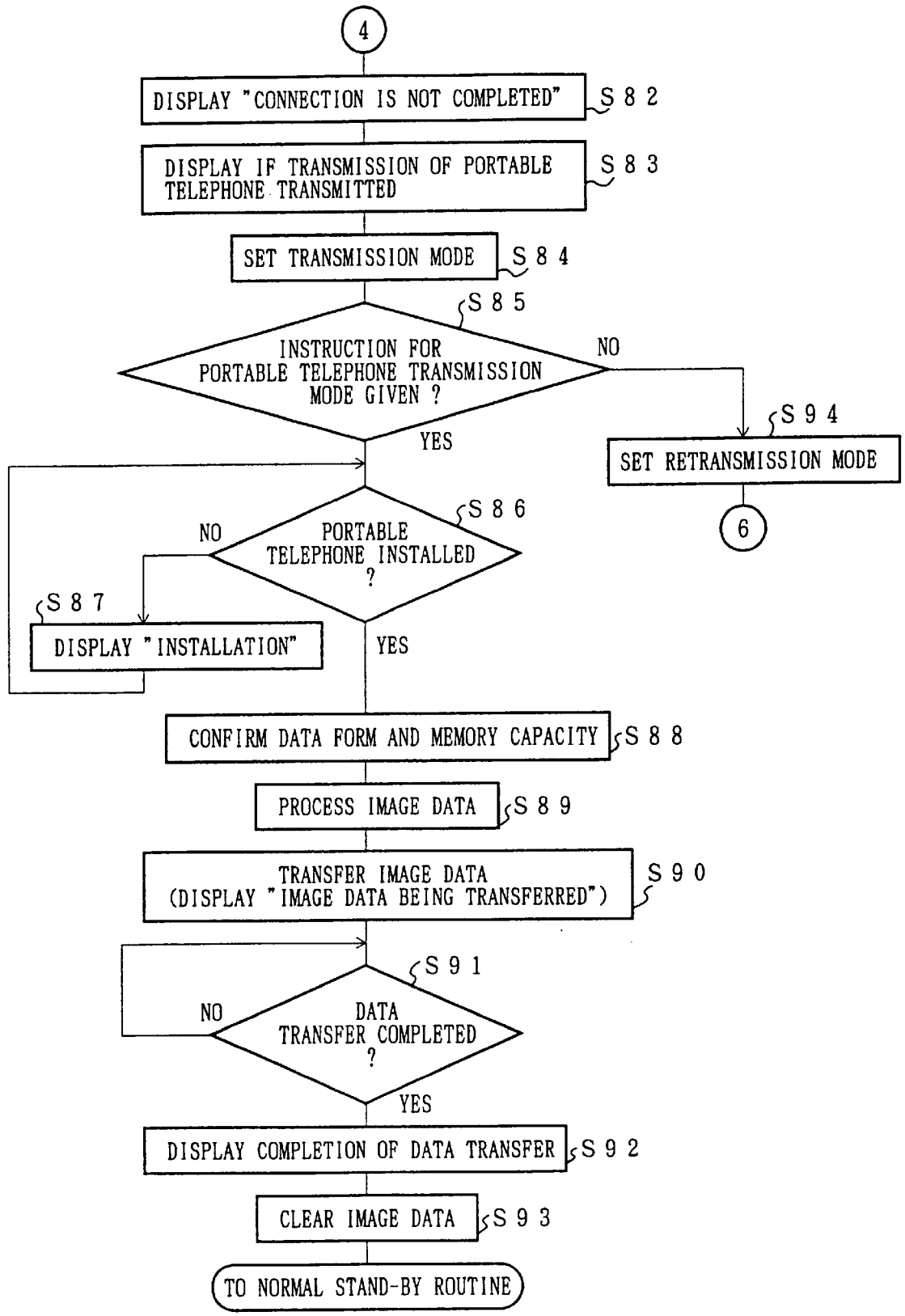
FIG. 15 is a flowchart explaining an operation subsequent to the operation shown in FIG. 14.

The following descriptions will explain still another embodiment of the present invention in reference to FIG. 14 and FIG. 15.

In the digital image forming system of the present embodiment, an operation by the portable telephone transmission mode shown in FIG. 14 and FIG. 15 is permitted. Other arrangements are the same as the digital image forming system.

In the digital image forming system of the present embodiment, the digital copying machine 1 has a fax mode processing section. This fax mode processing section is generally known, and transmits the image data from the image memory 64 of the digital copying machine 1 to other communication device.

In the operation by the portable telephone transmission mode, the image data of the document read by the scanner section 11 of the digital copying machine 1 is transmitted to a specific receiving end by a facsimile function section provided with the digital copying machine 1. Here, if the facsimile function processing section cannot be connected to other communication device of the receiving end to allow the communication between them, the image data stored in the image memory 64 of the digital copying machine 1 is transferred to the portable telephone 2 to be stored in the memory 132 of the portable telephone 2. As a result, the transmission of the image data to a specific receiving end is permitted from the portable telephone 2.

Next, operations in this portable telephone transmission mode will be explained following the steps shown in the flowcharts of FIG. 14 and FIG. 15.

In this operation, for example, in the wait state in the normal processing mode, first, an instruction of transmitting the document by facsimile, i.e., an instruction of the fax mode is input to the operation panel 73 of the digital copying machine 1 by the operator by the mode switch key 101 (S71) . Furthermore, the receiving end is input by the one-touch dial key 102 by the operator, and the document to be transmitted is set, for example, in the RADF 22 (S72).

Next, to instruct the start of the transmitting operation, the print switch 95 is set ON (S73), and the reading of the transmitting-use document is started by the scanner section 11 (S74). Then, the image data as read is stored in the image memory 64 (S75).

Upon completing the reading of all the documents (S76), a transmission is performed with resect to the receiving end to connect therewith (S77). Then, upon completing the connection with the receiving end (S78), a transmission of the image data stored in the image memory 64 starts (S79). Thereafter, upon completing the transmission of the image data (S80), the digital copying machine 1 cuts off the communication line (S81), and a sequence goes to the stand-by state routine in the normal processing mode.

Additionally, in S78, if the digital copying machine cannot be connected to the receiving end in S78, a message indicative of unable connection is displayed by the liquid crystal display device 81 (S82), and a display is made to see if the transmission by the portable telephone 2 is permitted (S83).

When the mode switch key 101 is operated based on this display (S84), and the fax transmission mode is set (S85) , it is set in the retransmission mode by the fax mode processing section (S94), and a sequence goes to S77 to repeat the following operations.

On the other hand, in S85, if the portable telephone transmission mode is set, it is confirmed if the portable telephone 2 is installed in the digital copying machine 1 (S86). If the portable telephone 2 is not installed, a message for urging the installation of the portable telephone 2 is made by the liquid crystal display device 81 (S87).

When the portable telephone 2 is installed in the digital copying machine 1, the lock mechanism 111 is set in the locked state. Additionally, the main CPU 65 of the digital copying machine 1 confirms the form of the data which can be processed in the portable telephone 2 by communicating with the CPU 131 of the portable telephone 2 and the capacity of the memory 132 (S88). As described earlier, if a memory shortage occurs in the memory 132, the process is terminated. On the other hand, if there exists a sufficient memory capacity, the operation is continued.

Thereafter, the main CPU 65 converts the image data stored in the image memory 64 into a form accepted by the portable telephone 2 (S89) , and is transferred to the portable telephone 2 (S90). Here, the information indicative of the receiving end is transferred as well as the image data. Additionally, a message "the image data is being transferred" is displayed by the liquid crystal display device 81. The information indicative of the receiving end that has been sent to the portable telephone 2 is stored in the memory 132 of the portable telephone 2. This information indicative of the receiving end is called by operating the redial key 136 of the portable telephone 2.

As described, upon completing the transfer of the image data from the digital copying machine 1 to the portable telephone 2 (S91), a message indicative of the completion of the transmission is displayed by the liquid crystal display device 81 (S92). Thereafter, the image data stored in the image memory 64 is erased (S93). Additionally, the lock mechanism 111 is set in the lock cancellation state. Then, the operator is allowed to remove the portable telephone 2 from the digital copying machine 1 to be ready for the transmission of the image data to the receiving end.

According to the described arrangement, even when the image data cannot be transmitted to a specific receiving end by using the fax mode processing section of the digital copying machine 1 at a position where the digital copying machine 1 is installed, the image data can be transmitted to the receiving end at a time from a place as desired by using the portable telephone 2. Therefore, the operator needs not wait at the place from the start till the completion of the transmission of the image data. This permits an operator in a hurry such as a businessman to effectively use his time at the place where the digital copying machine 1 is installed, for example, at his destination.

According to the described operation, only by operating the redial key 136, the image data can be transmitted to a specific receiving end from the portable telephone 2, and it is not necessary to operate the dial key 135 for facsimile numbers, thereby permitting the image data to be transmitted from the portable telephone 2 to a specific receiving end in a simple manner.

When the fax mode processing section of the digital copying machine 1 cannot be connected to a specific receiving end, the message indicative of the unable connection is informed to the operator by the liquid crystal display device 81. In this case, the operation has a selection between the two operations (1) the image data is transferred from the digital copying machine 1 to the portable telephone 2, and (2) the image data is held in the digital copying machine 1, and the image data is transmitted from the digital copying machine 1 by retransmission. This permits an operator to confirm the process of the image data, thereby eliminating the need of troublesome operations by the operator, and inconveniences such as transmission error or unable transmission of the image data of important documents can be surely prevented. The described arrangement also permits the image data to be transmitted to the receiving end by selecting a suitable method according to the available time of the operator, the position where the operator uses the digital image forming system such as his office or at his destination, etc.

On the other hand, in the case where the fax mode processing section of the digital copying machine 1 cannot be connected to the transmission end, the operator is informed of a message indicative of an unable connection to allow the operator to select one of the following operations (1) an attempt is made again to connect them in the retransmission mode of the fax mode processing section, or (2) the image data is transmitted by using the portable telephone 2. As a result, disturbances on operation by the operator is prevented, inconveniences such as transmission error or unable transmission of the image data on an important document can be surely prevented. Additionally, the operator is allowed to select a transmission of the data through an appropriate path each time.

FOURTH EMBODIMENT

Figure 16:
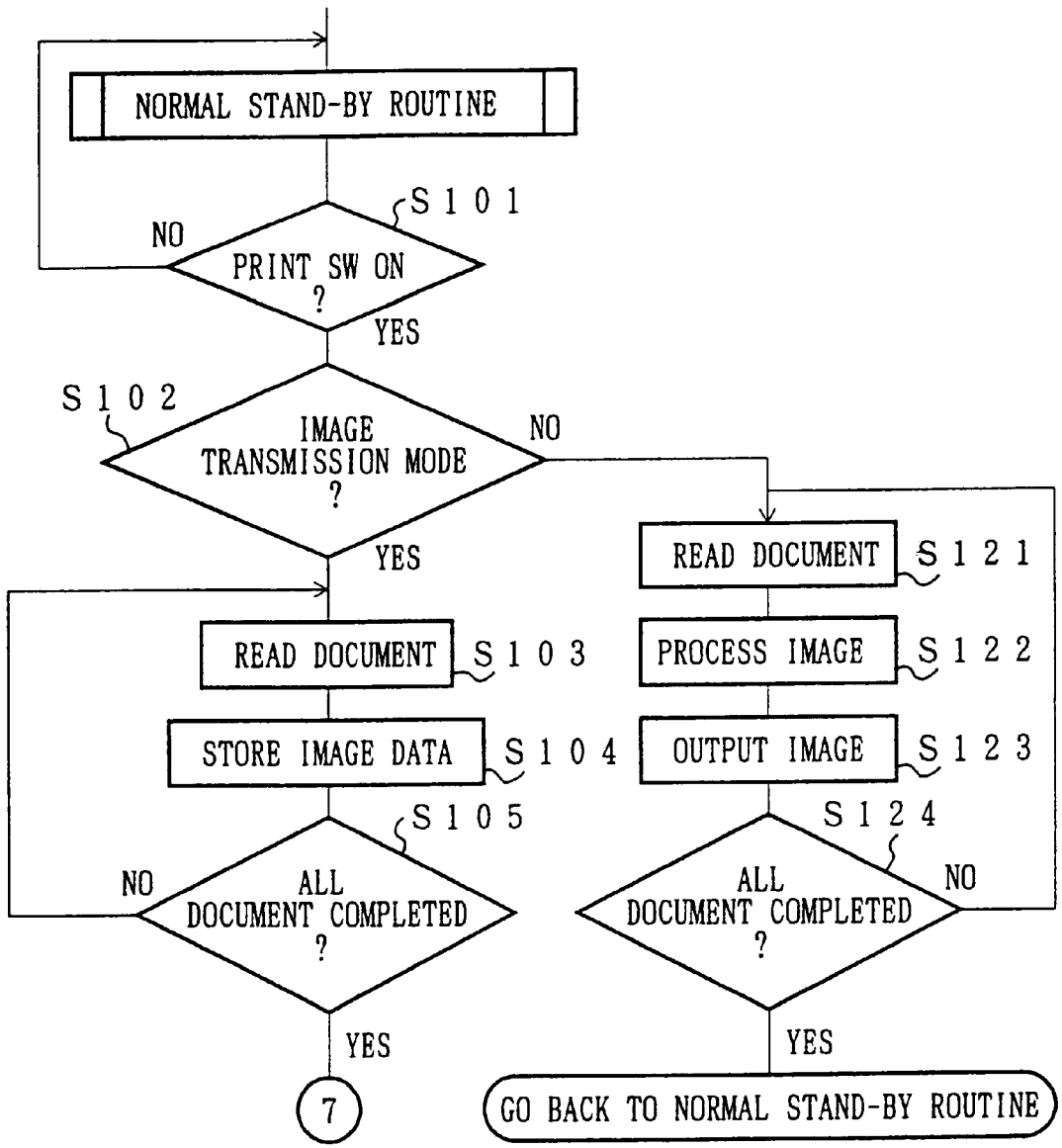
FIG. 16 is a flowchart showing respective operations of a digital copying machine and a portable telephone of a digital image forming system in accordance with yet still another embodiment of the present invention.
Figure 17:
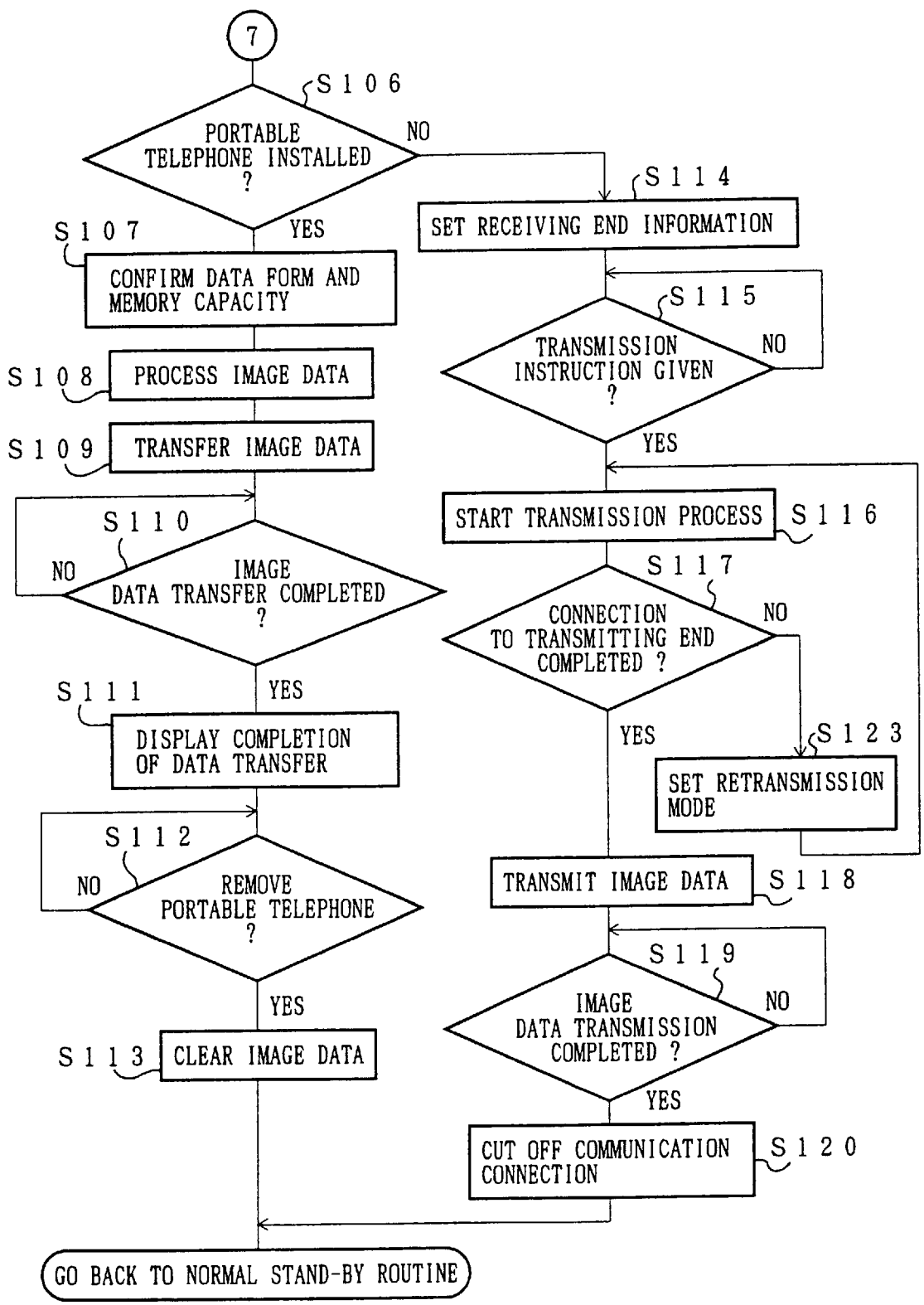
FIG. 17 is a flowchart explaining an operation subsequent to the operation shown in FIG. 16.

The following descriptions will explain yet still another embodiment of the present invention in reference to FIG. 16 and FIG. 17.

In the image forming system of the present invention, operations in the image transmission mode following the steps shown in respective flowcharts in FIG. 16 and FIG. 17 are permitted. Other arrangements are the same as the described digital image forming system.

In the digital image forming system of the present embodiment, the digital copying machine 1 has the same fax mode processing section as that explained in the previous embodiment.

According to the operations in the image transmission mode, in the case of transmitting the image data of the document read by the scanner section 11 of the digital copying machine 1 to a specific receiving end, the operator is allowed to automatically select between the following two operations (1) the image data is transmitted to the portable telephone 2, and (2) the image data is transmitted by the fax mode processing section depending on whether or not the portable telephone 2 is installed in the digital copying machine 1.

Operations in this image transmission mode will be explained in reference to the flowcharts shown in FIG. 16 and FIG. 17.

In this operation, for example, in the wait state in the normal processing mode, first, when the print switch 95 is switched ON by the operator (S101), it is confirmed if the digital copying machine 1 set in the image transmission mode (S102). This setting of the image transmission mode is performed by operating the mode switch key 101.

In S102, if it is confirmed that the image transmission mode is selected, a transmission-use document is read (S103), and the resulting image data is stored in the image memory 64 (S104). Thereafter, upon completing the reading of all the documents (S105), it is confirmed if the portable telephone 2 is installed in the digital copying machine 1 (106).

As a result, if it is confirmed that the portable telephone 2 is installed in the digital copying machine 1, the lock mechanism 111 is set in the locked state. Additionally, the main CPU 65 of the digital copying machine 1 confirms the form of the data that can be processed in the portable telephone 2 and the capacity of the memory 132 by communicating with the CPU 131 of the portable telephone 2 (S107). As described earlier, if the memory 132 does not have a sufficient capacity, the operation is stopped. On the other hand, if the memory 132 has a sufficient capacity, the operation is continued.

Thereafter, the main CPU 65 converts a form of the image data stored in the image memory 64 which the portable telephone 2 accepts (S108), and is transferred to the portable telephone 2 (S109). Here, when setting the image transmission mode in S102, if the information indicative of the receiving end of the image data has been input, the image data as well as the information indicative of the receiving end are transferred. Additionally, a message "the image data is being transferred" is displayed by the liquid crystal display device 81. The information indicative of the receiving end that has been sent to the portable telephone 2 is stored in the memory 132 of the portable telephone 2. The information indicative of the receiving end is read out by operating the redial key 136 of the portable telephone 2.

As described, upon completing the transfer of the image data from the digital copying machine 1 to the portable telephone 2 (S110), a message indicative of the completion of the image transfer is displayed by the liquid crystal display device 81 (S111). Thereafter, the lock mechanism 111 is set in the lock cancellation state.

As a result, the operator is allowed to remove the portable telephone 2 from the digital copying machine 1, and when the portable telephone 2 has been removed from the digital copying machine 1 (S112), the image data stored in the image memory 64 is erased (S113). In this state, the operator is allowed to transmit the image data as desired from the portable telephone 2 to the receiving end. Additionally, in the case where the information indicative of the receiving end is input beforehand in the portable telephone 2 when transmitting the image data, a transmission is permitted by operating the redial key 136. On the other hand, when the information indicative of the receiving end has not been input in the portable telephone 2, a transmission is performed by operating the dial key 135.

In S106, if the portable telephone 2 is not installed, if an instruction for input (S114) or transmission (S115) of the information indicative of the receiving end is given by the operator using the one-touch dial key 102, the digital copying machine 1 starts the process of transmitting the image data (S116) using its function. Here, if the connection with the receiving end is not permitted (S117), it is set in a re-transmission mode (S123), and a sequence goes back to S116, and the operations in and after S116 are repeated.

Additionally, in S117, if the fax mode processing section of the digital copying machine 1 can be connected to the receiving end, a transmission of the image data is performed (S118). Then, upon completing the transmission of the image data (S119), the digital copying machine cuts off a transmission with the digital copying machine 1 (S120).

On the other hand, in S102, if the digital copying machine 1 is not set in the image transmission mode, a reading of the document by the scanner section 11 is performed (S121), and a predetermined image processing is permitted by the image processing section 13 with respect to the resulting image data, and the resulting image data is stored in the image memory 64 (S112). Then, in the digital copying machine 1, the image data stored in the image memory 64 is read, and the image is output onto the sheet by the laser printer section 12 (S123). Then, upon completing the process for all the documents (S124), the digital copying machine 1 completes the operation.

According to the described operation, depending on whether or not the portable telephone 2 is installed in the digital copying machine 1, an automatic selection is made between the transmission of the image data using the portable telephone 2 and the transmission of the image data using the fax mode processing section of the digital copying machine 1. Therefore, a load of the operator can be reduced, and a mode setting error by the operator can be prevented beforehand.

On the other hand, when transmitting the image data using the portable telephone 2, as described, the image data can be transmitted from the portable telephone 2 at a time from a place as desired.

FIFTH EMBODIMENT

Figure 18:
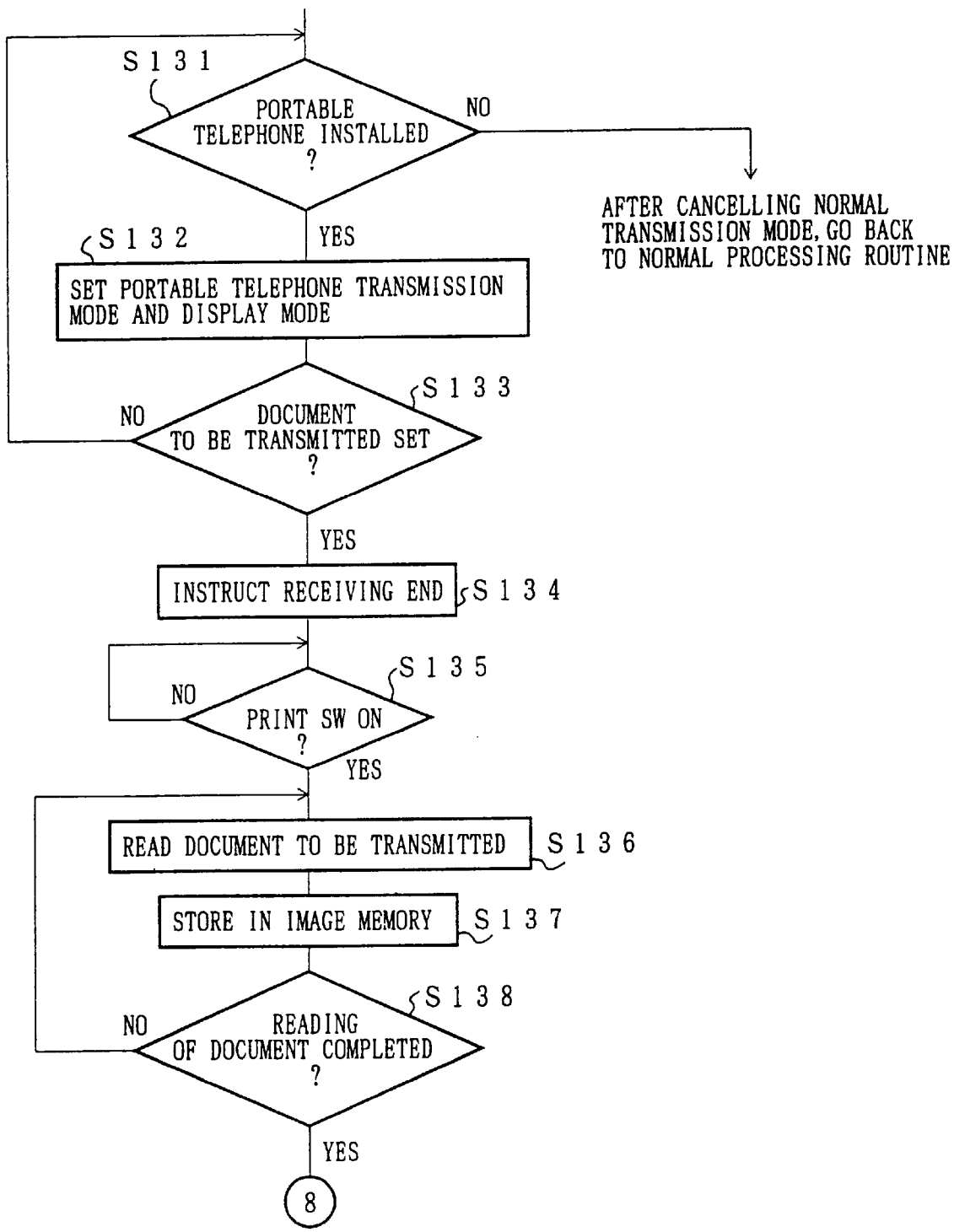
FIG. 18 is a flowchart showing an operation of the digital image forming system in accordance with yet still another embodiment of the present invention.
Figure 19:
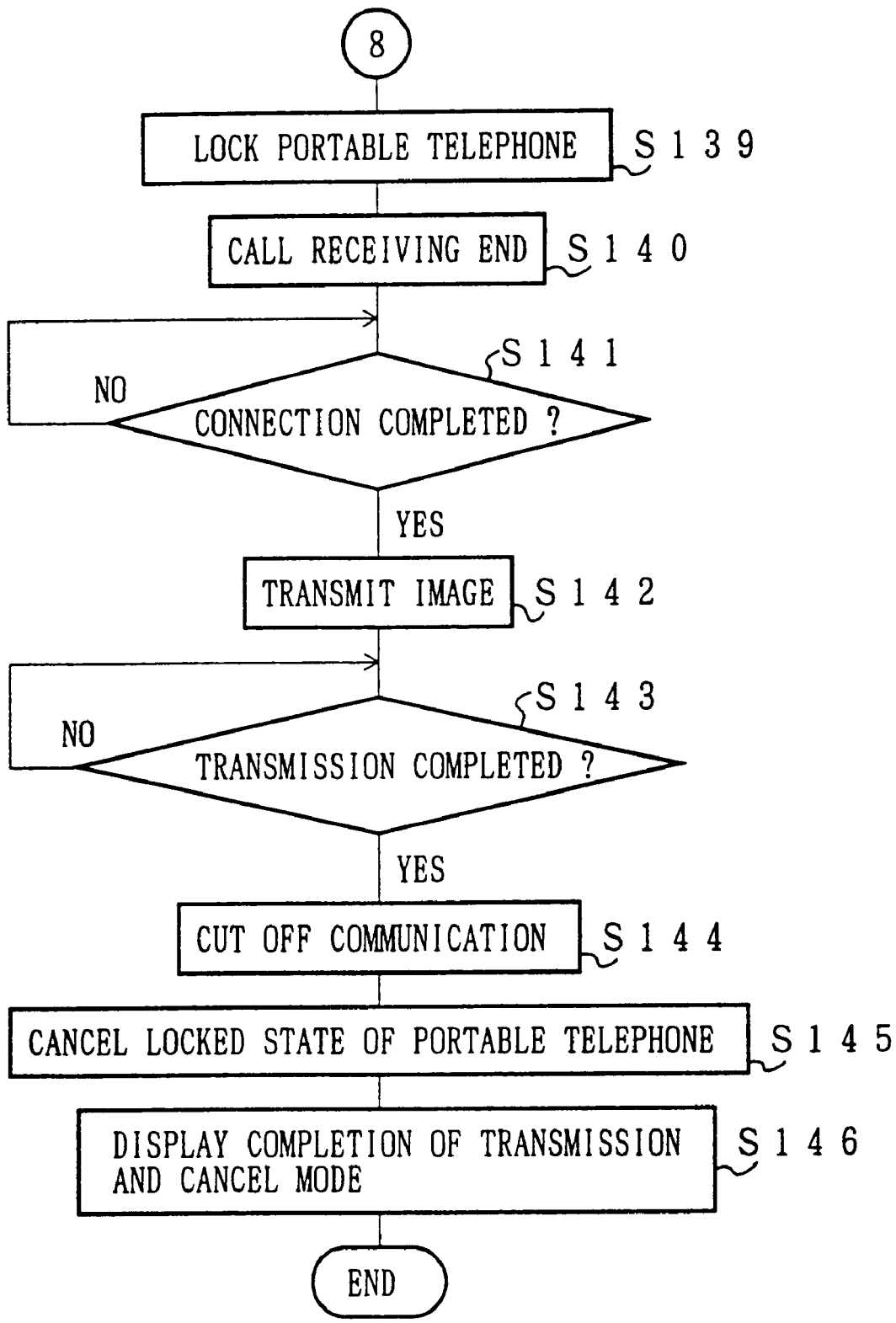
FIG. 19 is a flowchart showing an operation subsequent to the operation shown in FIG. 18.
Figure 20:
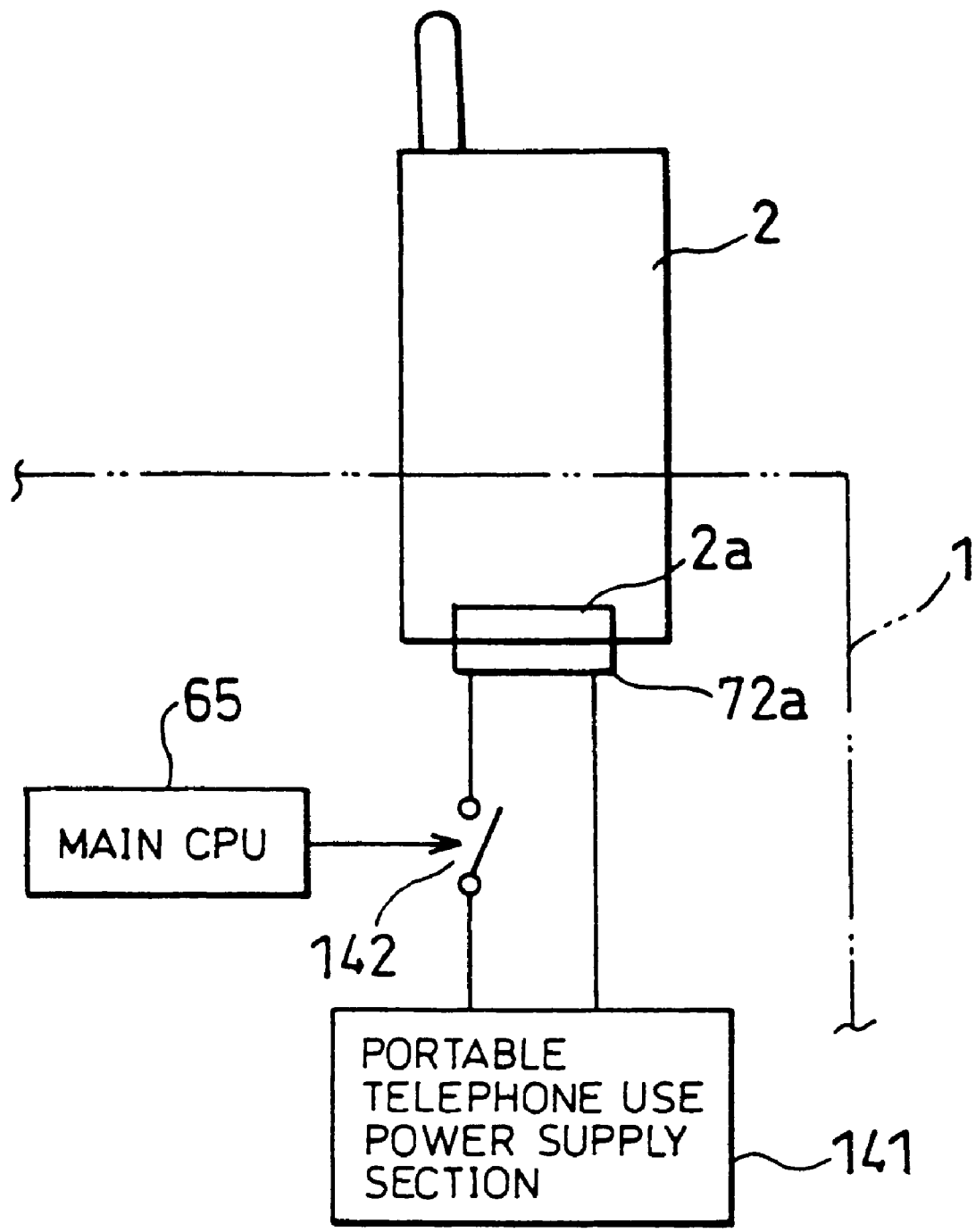
FIG. 20 is a block diagram showing a structure for connecting a power supply to a portable telephone in a digital image forming system in accordance with yet still another embodiment of the present invention.

The following descriptions will explain yet still another embodiment of the present invention in reference to FIG. 18 through FIG. 20.

As in the aforementioned arrangement, in a digital image forming system of the present embodiment, a digital copying machine 1 has a fax mode processing section. According to the digital image forming system of the present embodiment, when transferring image data as read by a scanner section 11 of the digital copying machine 1 to other communication device, if the portable telephone 2 is installed in the digital copying machine 1, the transmission by the portable telephone 2 is automatically selected without using the fax mode processing section. The described operations are shown in the flowcharts of FIG. 18 and FIG. 19.

For example, in the stand-by state in the normal processing mode, when the portable telephone 2 is installed in the installing section 1a of the digital copying machine 1 by the operator (S131), the portable telephone transmission mode is set in the digital image forming system, and the state where the portable telephone transmission mode is set is displayed in the liquid crystal display device 81 (S132). Here, in the liquid crystal display device 81, a message indicating that the fax mode by the portable telephone 2 is available, and a message for urging the operator to set the document in the RADF22 are displayed. As described earlier, the installation of the portable telephone 2 is detected by the portable telephone installing sensors 116.

Thereafter, the transmission-use document is set, for example, in the RADF 22 (S133), and the information indicative of the receiving end is input from the one-touch dial key 102 of the operation panel 73 (S134). Upon switching ON the print switch 95 (S135), the reading out of the document is performed by the scanner section 11 (S136). The resulting image data is stored in the image memory 64 (S137). Thereafter, upon completing the reading of all the documents (S138), the lock mechanism 111 is set in the locked state by the portable telephone 2 (S139).

Thereafter, the receiving end is called from the portable telephone 2 to be connected thereto (S140), and if it is permitted to connect the portable telephone 2 with the receiving end (S141), the image data stored in the image memory 64 is modulated by the image data communication unit 72, and subsequently transferred to the portable telephone 2. The portable telephone 2 transmits the image data transferred from the digital copying machine 1 sequentially to the receiving end (S142).

Next, upon completing a transmission of the image data (S143), the portable telephone 2 cuts off a connection with the receiving end (S144), and the lock mechanism 111 is set in the lock cancellation state with respect to the portable telephone 2 (S145). Thereafter, in the liquid crystal display device 81, a message indicative of a completion of transmission is displayed, and a portable telephone transmission mode is cancelled (S146). Based on the described display, the operator is allowed to remove the portable telephone 2 from the digital copying machine 1.

According to the described operation, it is switched between a transmission operation of the image data using the fax mode processing section of the digital copying machine 1 and a transmission of the image data using the portable telephone 2 based on the operation required for transmitting the image data by the portable telephone 2, i.e., an installation operation of the portable telephone 2 to the digital copying machine 1. Therefore, a switching operation by the operator is simplified.

Additionally, in an operation of transmitting the image data held by the digital copying machine 1 to a specific receiving end through the portable telephone 2, the image data sequentially read as from the image memory 64 of the digital copying machine 1 is transferred to the portable telephone 2, and is transmitted to the sequential receiving end without once being stored in the memory 132, thereby permitting a high speed transmission. Additionally, in this operation, the memory 132 required for storing the image data in the portable telephone 2 can be eliminated.

According to the described arrangement, by installing the digital copying machine 1 in a place where many people can use it, for example, a convenience store which offers a copy service, or other shops, etc., many people can appreciate the described convenient function of the digital image forming system by using the generally used portable telephone 2. This function is appreciated especially when transmitting an emergency document to a specific receiving end from one's destination.

In the case of utilizing the digital image forming system of the present invention, the cost required for transmitting the image data is charged to the user of the portable telephone 2, and complicated calculation and billing incurred when using the digital copying machine 1 are not needed. Therefore, when transmitting the image data, the operator can feel free to use the digital copying machine 1 at his destination.

In the state where the portable telephone 2 is installed in the digital copying machine 1, it is desirable that communications between the portable telephone 2 and other communication device are performed always in a stable waveform state. For this reason, as shown in FIG. 2 and FIG. 7, the portable telephone 2 is supported in such a manner that the antenna 134 is perpendicularly placed in the state where the portable telephone 2 is installed in the installing section 1a of the digital copying machine 1. This is because the waveform to be transmitted from the portable telephone 2 has an amplitude in a perpendicular direction. Namely, in the digital image forming system of the present invention, the portable telephone 2 is installed in the digital copying machine 1 so as to allow a waveform to be transmitted from its antenna 134 to be desirably transferred to other communication device of the receiving end.

Additionally, as shown in FIG. 20, in the state where the portable telephone 2 is installed in the digital copying machine 1, the portable telephone 2 is connected to the portable telephone power supply section 114 of the digital copying machine 1 via the connector 2a and the connector 72a. This is to prevent an occurrence of a communication error due to a buttery shortage of the portable telephone 2 when transmitting the image data to other communication device from the digital copying machine 1 through the portable telephone 2. In an event of a communication error, a complicated process is required for the recovery, and large burden would be incurred for the operator at his destination in a term of time. Here, the power supply of the digital copying machine 1 may be connected to the portable telephone 2 during the time when the portable telephone 2 is installed in the digital copying machine 1, or only during the transmission of the image data by the portable telephone 2. In the latter case, as shown in the figure, for example, a switch 142 composed of a transistor, etc., is provided, for example, in a feeding path between the portable telephone-use power supply section 141 and the connector 72a, and ON/OFF of this switch 142 is controlled by the main CPU 65.

For the connection between the digital copying machine 1 and the portable telephone 2, in order to transmit a desirable image data from the portable telephone 2, it is desirable to connect them under appropriate environment for the portable telephone 2. Here, a standard for communication environment is set according to, for example, the performance of the portable telephone 2 at a communication speed (2400 bps, 9600 bps, etc.,), etc., data format, communication protocol, power source voltage, communication company, manufacturer of terminals, etc. Namely, other than the portable telephone 2, various systems are available for the portable image communication device such as a digital system, analog system, PHS, an optical communication system (IR) etc., various radio communication devices such as a communication device of a specific lower power system, a terminal device in which the communication device is stored, etc. Therefore, the digital copying machine 1 is arranged so as to recognize the communication environment with the portable telephone and sets the communication environment as recognized. In order to recognize the communication environment, for example, an arrangement where a plurality of switches are formed in parallel in the installing section 1a of the digital copying machine 1, and upon installing the portable telephone 2 in the installing section 1a, various information with regard to the communication environment of the portable telephone 2 are recognized by a combination of a plurality of switches which is to be controlled ON/OFF by an installation of the portable telephone 2. In this case, for example, at a bottom of the portable telephone 2, a projected block is formed for depressing the switch, and the switch to be operated by the installation position of the block is selected. For other method, by the transmission and receiving of the information between the main CPU 65 of the digital copying machine 1 with the CPU 121 of the portable telephone 2, information indicative of the communication environment may be transferred from the portable telephone 2 to the digital copying machine 1 as code information.

SIXTH EMBODIMENT

Figure 21:
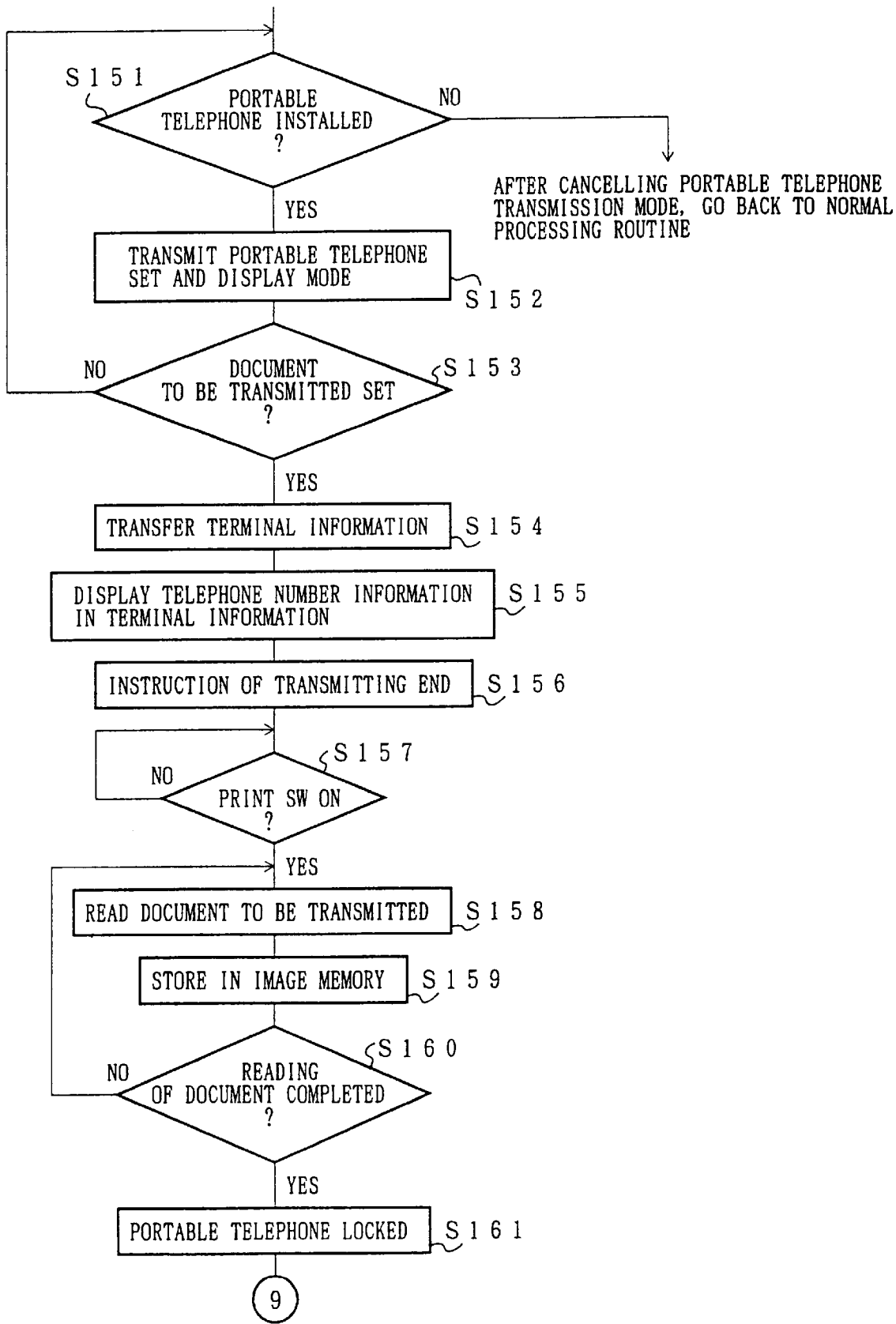
FIG. 21 is a flowchart showing an operation of the digital image forming system in accordance with yet still another embodiment of the present invention.
Figure 22:
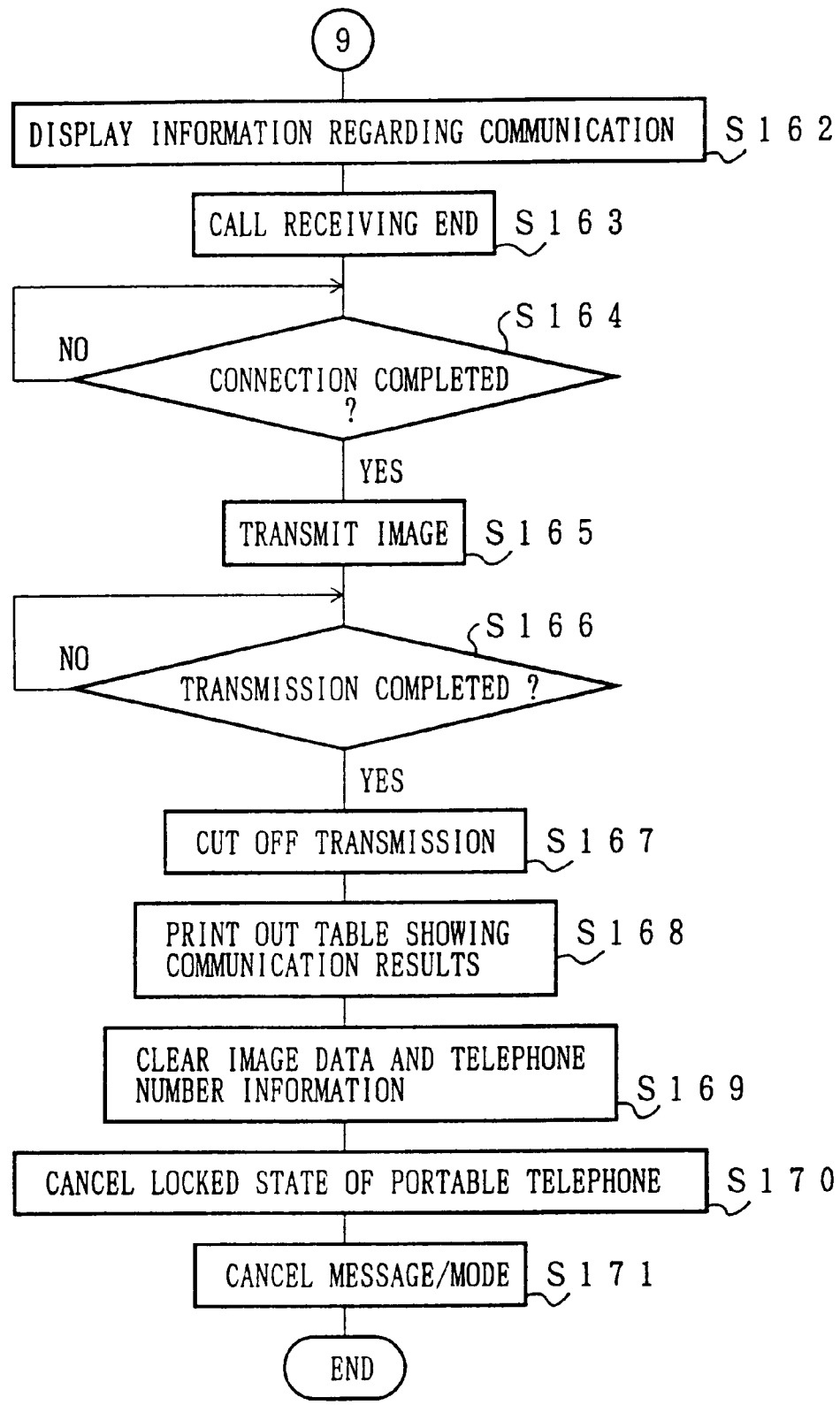
FIG. 22 is a flowchart showing an operation subsequent to the operation shown in FIG. 21.

The following descriptions will explain yet still another embodiment of the present invention in reference to FIG. 21 and FIG. 22.

In the digital image forming system of the present embodiment, information indicative of a telephone number that is particular information for the user to be stored in the memory 132 of the portable telephone 2 is temporarily sent to the digital copying machine 1, and the operator is allowed to set the receiving end of the image data based on the information indicative of the telephone number. The described operations will be explained in reference to the processes in the flowcharts of FIG. 21 and FIG. 22.

For example, in the stand-by state in the normal processing mode, when the portable telephone 2 is installed in the installing section 1a of the digital copying machine 1 by the operator (S151), the portable telephone transmission mode is set in the digital image forming system, and a message indicating that the portable telephone transmission mode is set is displayed in the liquid crystal display device 81 (S152). Here, in the liquid crystal display device 81, a message indicating that the document has been set in the RADF 22 is displayed.

Next, when the document to be transmitted is set, for example, in the RADF 22 (S153), the terminal information stored in the memory 132 of the portable telephone 2 is read in the digital copying machine 1 via the image data communication unit 72 to be stored in the image memory 64 (S154). The terminal information is the information for use in the portable telephone 2 which mainly consists of the information indicative of the telephone number of the receiving end.

Next, the main CPU 65 of the digital copying machine 1 reads out the information indicative of the telephone number from the terminal information, and displays the information as read in the liquid crystal display device 81 (S155). Based on the displayed information, the receiving end is specified by the operator, and the receiving end of the image data is set (S156). For example, the information indicative of the telephone numbers are designated by numbers in the order of display, and the operator can specify the receiving end by inputting a number designated in the order of display by operating the number selecting key 93.

Next, when the print switch 95 is switched ON by the operator (S157), the information on the document is read by the scanner section 11 (S158). Here, the number of documents are counted by the counter, and the document size is detected by the document size sensor. These counter and the document size sensor are generally used in copying machines. The image data as read from the document is stored in the image memory 64 (S159). Thereafter, upon completing the reading of all the document (S160), the lock mechanism 111 sets the portable telephone 2 in a locked state (S161).

Next, the main CPU 65 displays the information regarding the communication by the liquid crystal display device 81 (S162). The information contains the number and size of the document to be transmitted resulting from the counter and the document size sensor, the telephone number of the receiving end, name of the receiving end, and communication state. By the described display, the operator can recognize the communication state with ease.

Next, the receiving end is called from the portable telephone 2 to be connected thereto (S163), and if the portable telephone 2 can be connected to the receiving end (S164), the image data stored in the image memory 64 is transferred to the portable telephone 2. The portable telephone 2 sequentially transmits the image data as transferred from the digital copying machine 1 to the receiving end (S165).

Next, upon completing the transmission of the image data (S166), the portable telephone 2 is disconnected from the receiving end (S167). In the digital copying machine 1, the main CPU 65 prints out the information as transmitted such as the number and the size of the document to be transmitted, the receiving end, the transmission time, the time required for transmission and a part of the transmitted image data which have been stored in the image memory 64. Alternately, the main CPU 65 transfers the information to be transmitted from the image memory 64 to the portable telephone 2 (S168). In the portable telephone 2, upon receiving the information from the digital copying machine 1, the information as received is stored in the memory 132.

Furthermore, the information temporarily stored in the image memory 64 of the digital copying machine 1, i.e., the terminal information, transmission information, and the image data of the document to be transmitted, etc., are erased (S169). The described operation is performed also when the portable telephone transmission mode is cancelled for some reason such as an occurrence of trouble on transmission, etc.

Next, when the lock mechanism 111 is set in the lock cancellation state (S170). Thereafter, in the liquid crystal display device 81, a message indicative of the completion of the transmission is displayed, and the portable telephone transmission mode is cancelled (S171) Based on the described display, the operator detaches the portable telephone 2 from the digital copying machine 1.

According to the operation in S156, the receiving end is set based in the information indicative of the telephone number received from the portable telephone 2. However, it may be arranged so as to set the receiving end by the fax mode processing section of the digital copying machine 1. In this case, the one-touch dial key 102 or the number selecting key 92 on the operation panel 73 is operated. By operating the number selecting key 93, numbers which constitute the telephone number are input. In this case, the information indicative of the telephone number according to the operation of the number selecting key 93 or the one-touch dial key 102 from the main CPU 65 of the digital copying machine 1 are transferred to the portable telephone 2, and the CPU 131 of the portable telephone 2 is connected to the receiving end based on the information indicative of the telephone number.

As described, in the digital image forming system of the present embodiment, not only based on the information indicative of the telephone number from the portable telephone 2 but also by the operation of the number selecting key 93 or the one-touch dial key 102 of the digital copying machine 1, the portable telephone 2 can be connected to the receiving end. Therefore, even an operator who is not used to the operation can operate desirably without confusion, and thus the digital image forming system offers a desirable operability.

Additionally, as shown in the operation in S168, upon completing the transmission of the image data to the receiving end, in the digital copying machine 1, as the transmission information indicating the number and the size of the document to be transmitted, the receiving end, the transmission time, the time required for transmission and the part of the transmitted image data are printed out, even in the case of transmitting the image data using the digital copying machine 1 installed in the one's destination, the operator can obtain the transmission record based on the transmission information at hand. Therefore, the transmission record can be controlled, for example, after the operator has returned to his office with ease.

Additionally, in the digital copying machine 1, the information as transmitted using the fax mode processing section is controlled separately from the information as transmitted using the portable telephone 2 for the following reasons.

In order to recognize the transmission/receiving state, the fax mode processing section of the digital copying machine 1 generally has a control function for storing the information regarding transmission and receiving, and printing out the information when need arises. In the case where the information as transmitted using the portable telephone 2 is stored, this information is mixed with the information as transmitted using the fax mode processing section, and it becomes difficult to confirm both of the information as transmitted. Therefore, these information are controlled separately to eliminate the described problems.

The information as transmitted using the portable telephone 2 is printed out from the digital copying machine 1, or erased from the image memory 64 of the digital copying machine 1 after being transferred to the portable telephone 2. Therefore, such problem that the personal information of the operator remains in the external device, i.e., a digital copying machine 1 which may be used for bad purposes.

In the image forming system of the present embodiment, as shown in S168, when a transmission is carried out using the portable telephone 2, the information to be transmitted that has been stored in the digital copying machine 1 can be transferred to the portable telephone 2. Therefore, in the portable telephone 2, by storing the information to be transmitted in the memory 132, the information can be displayed in the display section 133 when need arises. As a result, the transmission record can be confirmed and controlled with ease.

SEVENTH EMBODIMENT

Yet still another embodiment of the present embodiment will be explained in reference to FIG. 23 through FIG. 26.

The digital copying machine 1 can transmit and receive the image data with respect to the external device through the image data communication unit 72 shown in FIG. 1. When the portable telephone 2 is connected as the external device to the image data communication unit 72, the image data transferred from the portable telephone 2 is read in the image memory 64 via the process in the image processing section 13. The image data is read out by the main CPU 65 to be supplied to the laser printer section 12. As a result, the image data can be printed out on a printing sheet. Here, while the portable telephone 2 is communicating with the digital copying machine 1, the lock mechanism 111 is set in the locked state, and the portable telephone 2 is fixed in the digital copying machine 1 as explained earlier.

Figure 23:
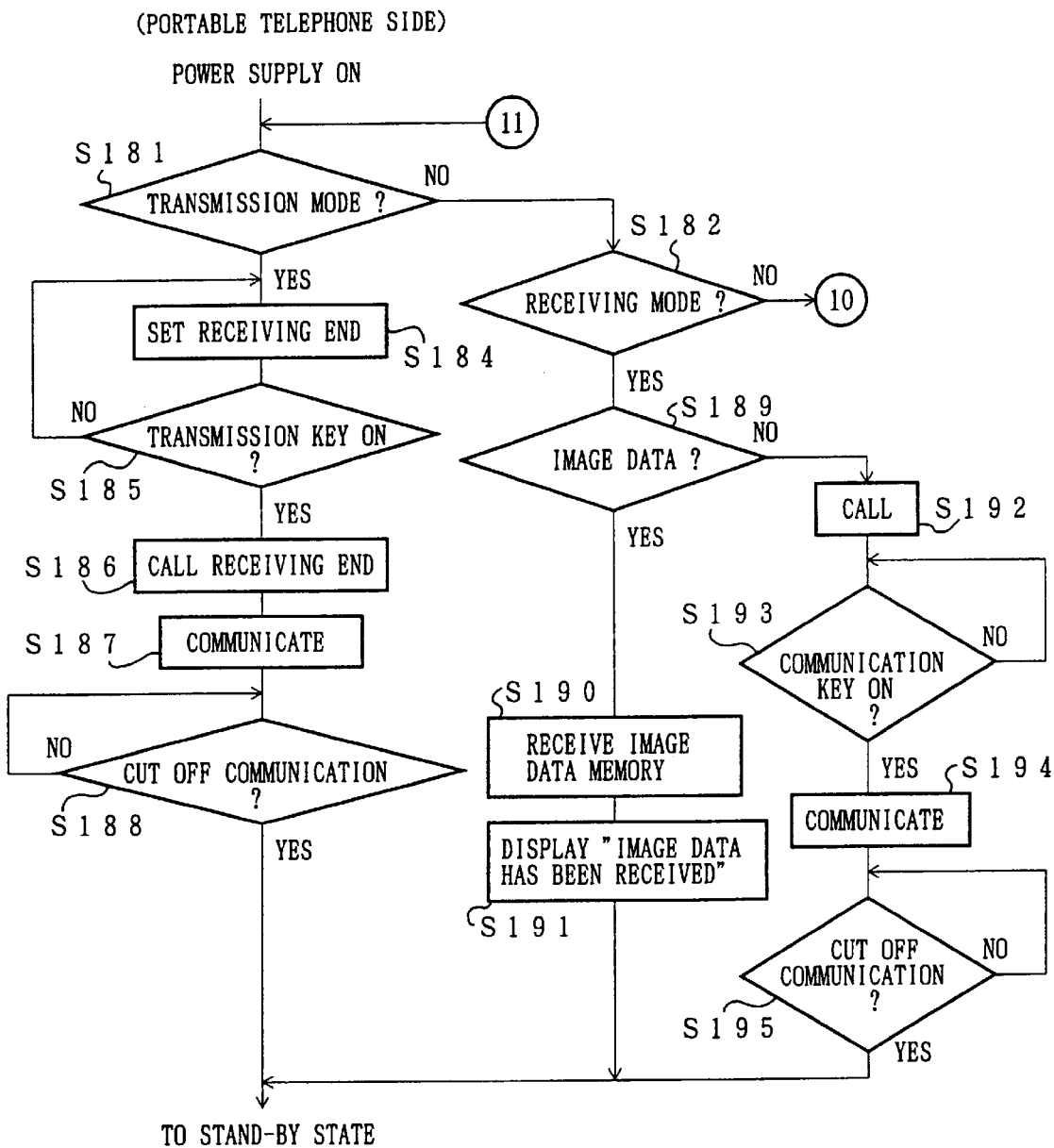
FIG. 23 is a flowchart showing an operation on the side of a portable telephone of a digital image forming system in accordance with yet still another embodiment of the present invention.
Figure 24:
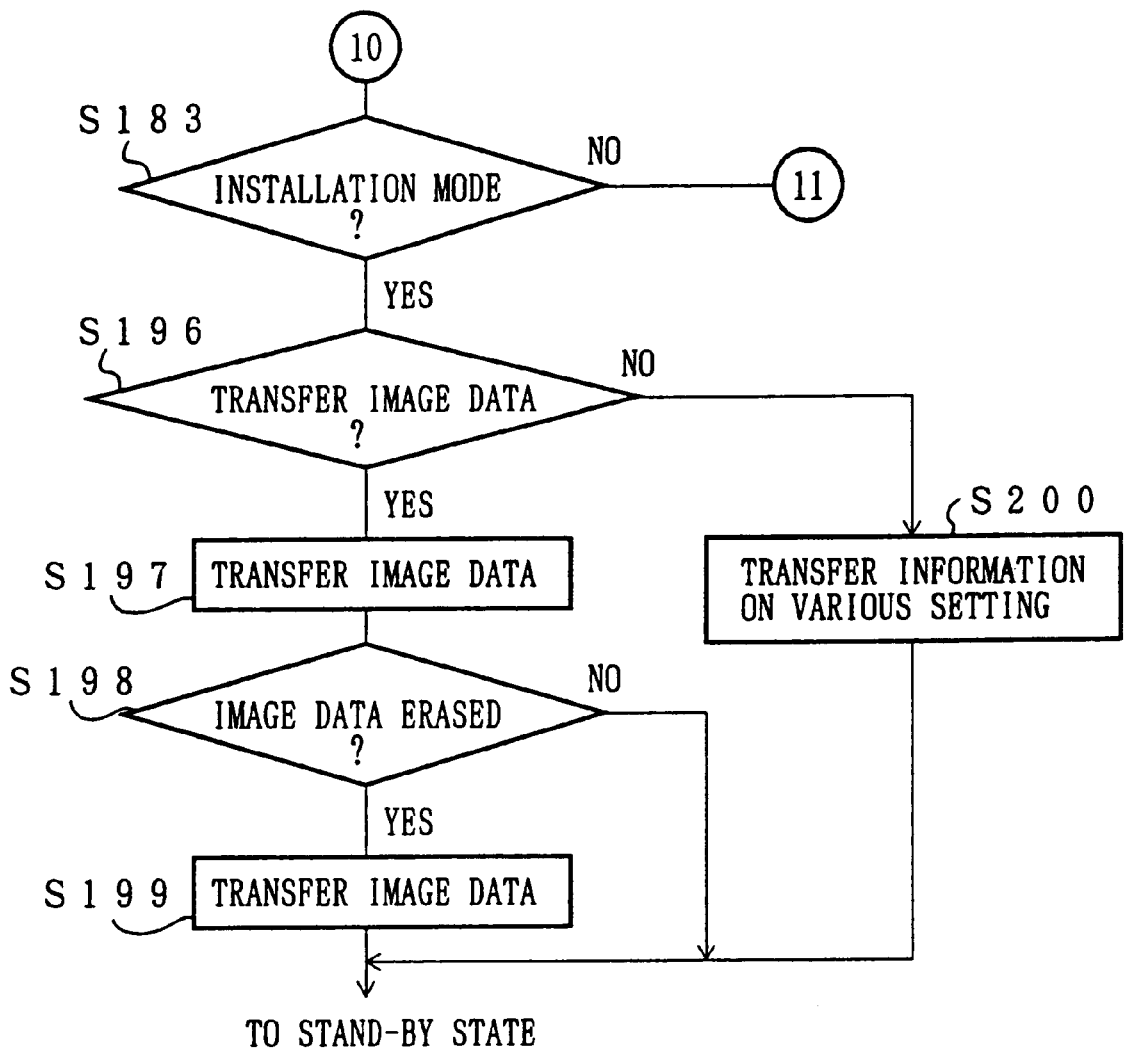
FIG. 24 is a flowchart showing an operation subsequent to the operation shown in FIG. 23.
Figure 25:
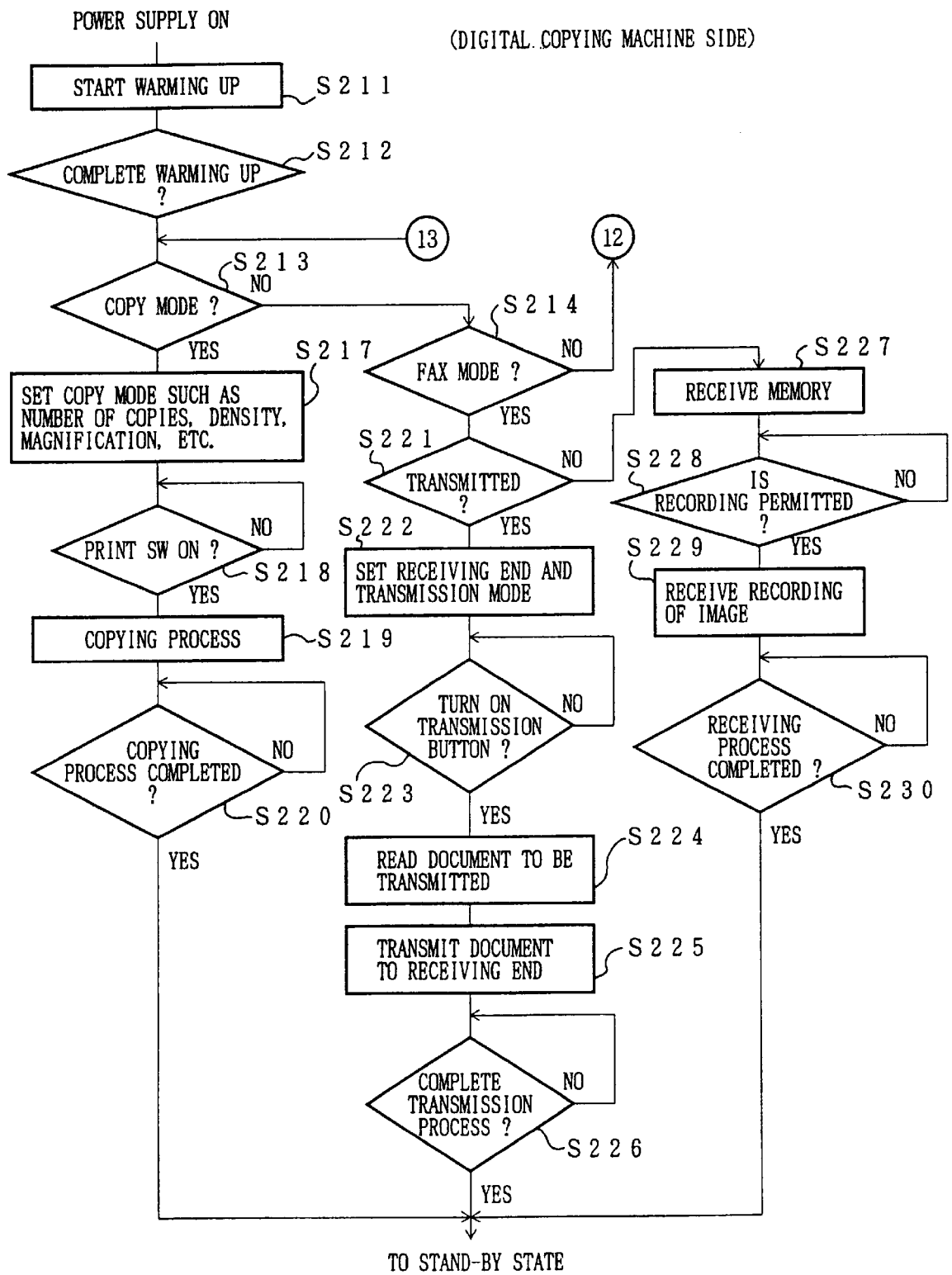
FIG. 25 is a flowchart showing an operation on the side of a digital copying machine of a digital image forming system in accordance with yet still another embodiment of the present invention.
Figure 26:
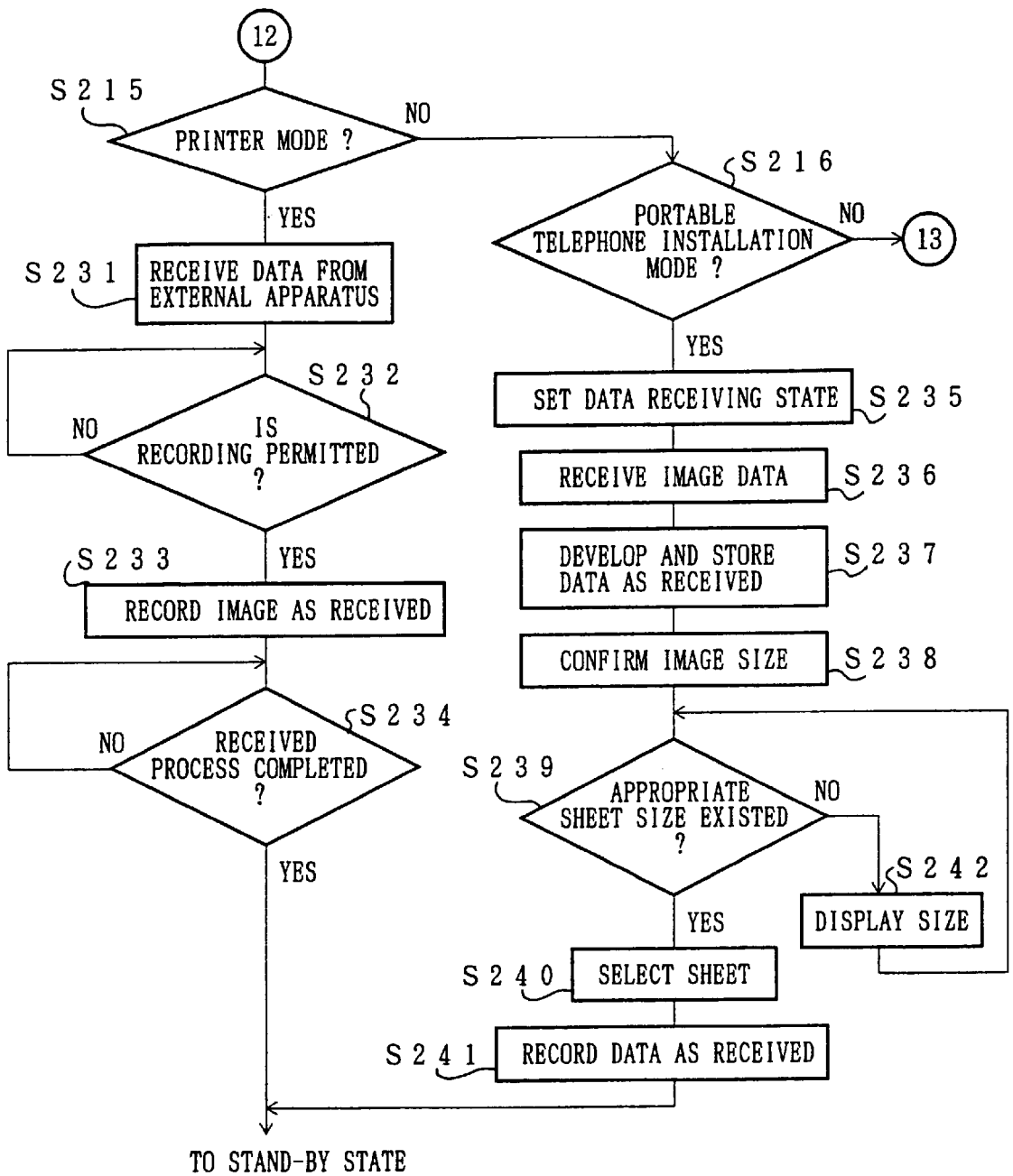
FIG. 26 is a flowchart showing an operation subsequent to the operation shown in FIG. 25.

Next, operations of transferring the image data received by the portable telephone 2 to the digital copying machine 1, and printing out the image data as received by the digital copying machine 1 will be explained following the steps shown in the flowcharts of FIG. 23 through FIG. 26. Here, FIG. 23 and FIG. 24 show operations of the portable telephone 2, and FIG. 25 and FIG. 26 show an operation of the digital copying machine 1.

First, operations on the side of the portable telephone 2 will be explained. In FIG. 23 and FIG. 24, when switching ON the power supply, the portable telephone 2 is set in the communication permitting state. Here, the CPU 131 of the portable telephone 2 always observes if an instruction for transmission is given by the operator to a specific receiving end (S181), if any information has been received (S182), or if the portable telephone 2 has been installed in the digital copying machine 1 (S183).

When an instruction for specific transmission is given by an operator for calling a specific receiving end (S181), the portable telephone 2 is set in the transmission mode. Next, when the information indicative of the telephone number of the specific receiving end is set (S184), and a transmission key is operated (S185), the portable telephone 2 calls the receiving end as specified (S186), and can communicate with the receiving end (S187). Thereafter, when the completion key is operated, the communication state is cut off (S188), and the portable telephone 2 is set in the stand-by state.

Upon receiving an instruction for calling from the receiving end, it is set in a receiving mode (S182), and it is confirmed whether a call is made by voice, or the image data is received (S189). If the call is made by voice, an operator is called by a calling sound (S192), and upon operating the communication key by the operator (S193), a communication is permitted (S194). Thereafter, when operating the completion key, the communication state is cut off (S195), and the portable telephone 2 is set in the stand-by state.

On the other hand, if the image data is received in S189, the CPU 131 receives the image data to be stored in the memory 132 (S190). Furthermore, a message indicative of the receipt of the image data is displayed in the display section 133 (S191) to inform the operator. Thereafter, the portable telephone 2 is set in the stand-by state. The method of informing the receipt of the image data is not limited to the above, and, for example, the method of informing by generating an alarm sound may be adopted.

Additionally, in the portable telephone 2, upon receiving the image data, a message indicative of a receipt of the image data is displayed by the display section 133. Upon confirming the receipt of the image data by observing the display, the operator who carries the portable telephone 2 physically goes to the place where the digital copying machine 1 is installed to mount the portable telephone 2 in the installing section 1a of the digital copying machine 1. As a result, the portable telephone 2 is set in the installation mode (S183). A transition to the installation mode is carried out, for example, by detecting the installation of the portable telephone 2 into the digital coping machine 1 by the portable telephone installing sensors 116, and transmitting the information indicative of the installation of the portable telephone 2 from the main CPU 65 to the CPU 131.

After the installation mode has been set, upon transferring the image data from the portable telephone 2 to the digital copying machine 1 by the operator (S196), the CPU 131 transfers the image data recorded in the memory 132 to the digital copying machine 1 (S197). The image data is read in the digital copying machine 1 via the image data communication unit 72 to be stored in the image memory 64. Thereafter, in the digital copying machine 1, upon receiving an instruction for erasing the image data (S198), the image data is erased (S199). Then, the portable telephone 2 is set in the stand-by state.

On the other hand, in S196, upon receiving a request for transferring various setting information, information may be transferred according to the request (S200). Then, the portable telephone 2 is set in the stand-by state.

Next, an operation on the side of the digital copying machine 1 will be explained. In FIG. 25 and FIG. 26, when switching ON the power supply, the digital copying machine 1 stats warming up (S211) When the digital copying machine 1 has warned up, it is set in the stand-by state (S212). Here, the main CPU 65 of the digital copying machine 1 observes if it is operated in the copy mode (S213), a fax mode (S214), a printer mode for outputting the data to be transferred from the external apparatus (S215), or in a portable telephone installation mode (S216). A mode is selected among the described operation modes based on various input conditions applied to the digital copying machine 1.

After the copy mode has been set by operating the operation panel 73 (S213), the operator sets the number of copies, copy magnification and copy thickness by operating the operation panel 73 (S217). Next, after setting the document, for example, in the RADF 22, the print switch 95 is set ON to start a copying operation (S219). Then, upon completing the copying operation (S220), the digital copying machine 1 is set in the stand-by state.

Next, after the fax mode is set (S214), and the transmission via facsimile is set (S221), a telephone number of the receiving end is subsequently input by the operator, for example, using the number setting key 93, and the transmission mode for specifying the brightness of the image is set (S222).

Next, for example, when the document is set in the RADF 22, and the transmission button is set ON (S223), the document data is read by the scanner section 11 (S224), and the image data of the document is transmitted to the receiving end (S225). Thereafter, upon completing the transmission (S226), the digital copying machine 1 is set in the stand-by state.

On the other hand, if the receiving via facsimile is set in S221, the main CPU 65 stores the image data as received in the image memory 64 (S227). Then, when a recording, i.e., printing out of the image data is permitted in the laser printer section 12 (S228), the image data is printed out (S229). As described, upon completing the receiving of the information via facsimile (S230), the digital copying machine 1 is set in the stand-by state.

In the digital copying machine 1, upon inputting a specific control signal to the external interface (not shown), it is set in the printer mode (S215). The, upon receiving the image data as transmitted from an external apparatus, such as a word processor (S231), the main CPU 65 stores the image data as received in the image memory 64. Thereafter, when a printing out of the image data is permitted in the laser printer section 12 (S232) the image data is printed out (S233). Upon completing the processing of the image data as received (S234), the digital copying machine 1 is set in the stand-by state.

When the portable telephone 2 is installed in the installing section 1a, and the portable telephone installing sensors 116 detect this state, the digital copying machine 1 is set in the portable telephone installation mode (S216).

When the portable telephone installation mode is set, the digital copying machine 1 is set in the receiving state of the image data from the portable telephone 2 (S235). Then, upon receiving the image data from the portable telephone 2 (S236), the image data is processed by the image processing section 13 as need arises, and is stored in the image memory 64 (S237). Additionally, the process in the image processing section 13 may be applied when storing the image data in the image memory 64, or when reading out the image data for printing out from the image memory 64.

Thereafter, the main CPU 65 confirms the image size of the image data, and a printing sheet of an appropriate size for the size of the image, i.e., the existence of the sheet is confirmed (S238). Then, if there exists a sheet of an appropriate size (S239), the sheet is selected (S240), and the image data as received is printed out (S241). In this case, the main CPU 65 transfers the image data stored in the image memory 64 to the laser printer section 12 in sync with an operation by the laser printer section 12. In S239, if a sheet of an appropriate size does not exist, an appropriate size is displayed in the liquid crystal display device 81 (S242). Then, after the sheet is set by the operator, operations in and after S240 are carried out.

As described, in the digital image forming system of the present embodiment, even when the operator is at his destination, by transmitting the image data to the portable telephone 2 which the operator possesses, the operator is informed of the receipt of the image data, and further by installing the portable telephone 2 to the digital copying machine 1 at his destination, the image data can be printed out from the digital copying machine 1. As a result, the operator can confirm the information as received.

Therefore, even in the case where it is required to send the information that cannot be sent by telephone when the operator is at his destination, the information can be transmitted desirably. Needless to mention, it is not required to always carry the device for printing out the image data.

Additionally, in the image processing section 13, the form of the image data being transferred from the portable telephone 2 is different from the form of the data that can be handled in the laser printer section 12, the image data as received is converted to be in conformity with the data form for the laser printer section 12. As a result, in the laser printer section 12, the image data can be appropriately printed out, and a desirable image can be obtained.

Additionally, a selection of the sheet of an appropriate size in S239 is performed by developing the image data in the image memory 64 in S237, and based on the size of the image data thus developed, the image size is confirmed in S238. Therefore, a sheet of an appropriate size can be selected.

Various forms are possible for the image data to be transferred from the portable telephone 2. Therefore, an image of an appropriate size can be confirmed only after surely carrying out the development of compressed image data, character code data, etc. For this reason, when simply selecting the sheet based on the information indicative of the sheet size thus specified, and the image data is printed thereon, the missing of the image may occur.

Additionally, in the digital copying machine 1, upon completing the printing out of the image data, the image data stored in the image memory 64 may be erased. Similarly, even in the portable telephone 2, it may be arranged so as to erase from the memory 132 the image data as transferred to the digital copying machine 1 to be printed out. The described operation is effective for effectively utilizing the limited memory capacity when carrying out the portable telephone 2 having a very limited memory capacity. Additionally, it is not necessarily to erase the image data all at once, and the image data may be stored without erasing when necessary. In the case of storing the image data in the digital copying machine 1 or the portable telephone 2 without erasing, it is permitted to use the image data, for example, after being processed.

According to the digital image forming system of the present embodiment, utilizing the function of printing out the image data as transferred from the portable telephone 2, information indicative of various settings stored in the portable telephone 2, and information indicative of the telephone number registered in the portable telephone 2 are transferred to and printed out in the digital copying machine 1. The described information is normally stored in a form of the code information in the portable telephone 2. Therefore, in the digital copying machine 1, when printing out the code information, the code information is printed out using the function of converting the code information into the dot information for characters in the printer mode.

Additionally, the portable telephone 2 has an arrangement for specifying information to be printed out in the digital copying machine 1. Specifically, for example, when the input key 137 of the portable telephone 2 is operated, the information to be set or registered in the portable telephone 2 is displayed in the display section 133 as read out from the memory 132 by the CPU 131, and further when operating another selection key, the information as set or registered is transferred to the digital copying machine 1.

EIGHTH EMBODIMENT

The following descriptions will explain yet still another embodiment of the present invention in reference to FIG. 27 through FIG. 30.

Figure 27:
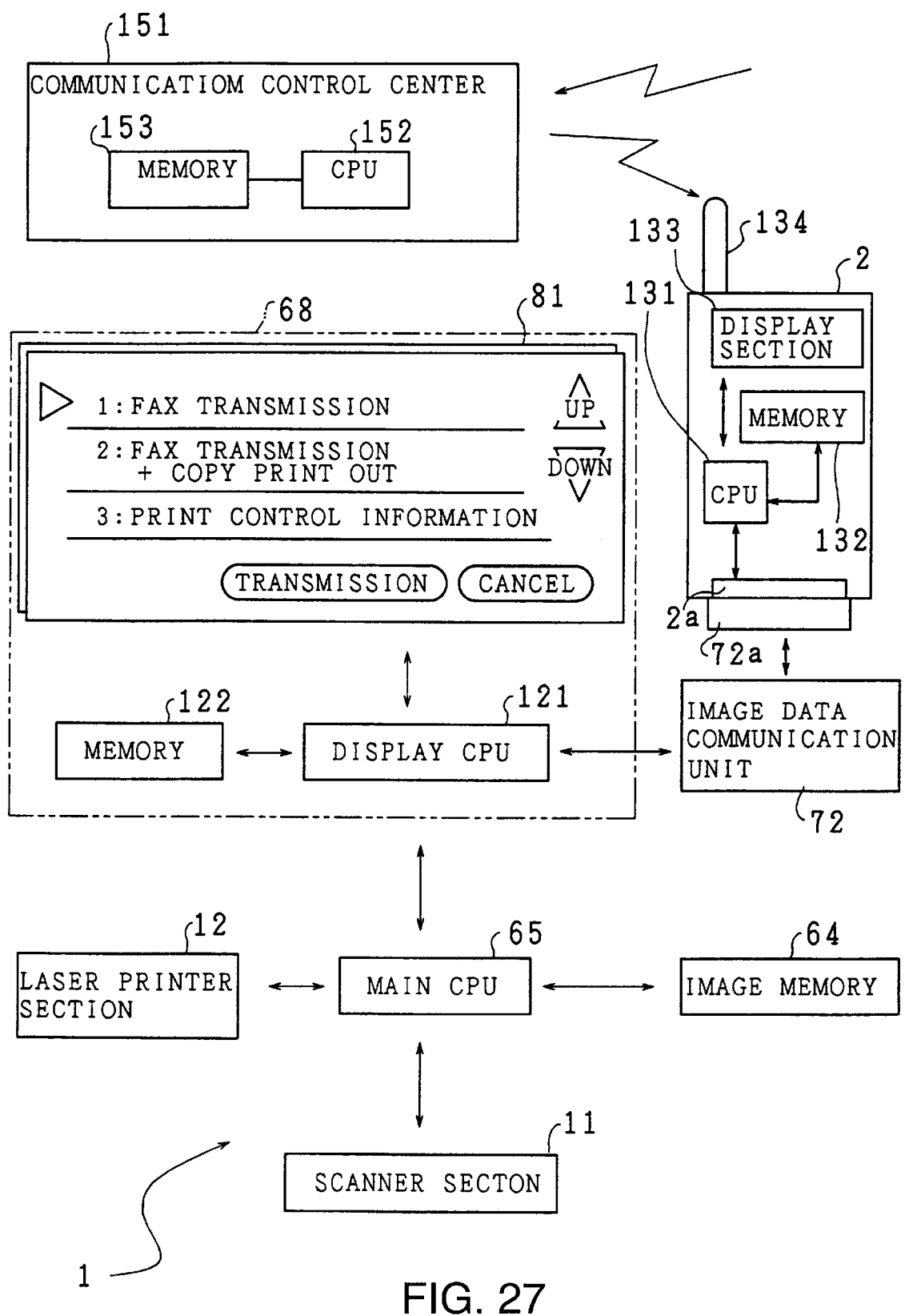
FIG. 27 is a block diagram schematically showing a structure of the digital image forming system in accordance with still another embodiment of the present invention.

The digital image forming system, for example, has an arrangement shown in FIG. 27. Namely, in the communication control center 151 as a transit device for controlling communication with the portable telephone 2, etc., upon receiving the image data to be transmitted to a specific portable telephone 2, the CPU 152 stores the image data in the memory 153, and with respect to the portable telephone 2 of the receiving end, a message indicating that the image data to be transmitted exits is sent. Based on this message, the operator sets the portable telephone 2 in the closest digital copying machine 1, and thereafter, the image data to be transmitted from the communication control sensor 151 is received by the portable telephone 2, and the image data as received is printed out by the digital copying machine 1.

Figure 29:
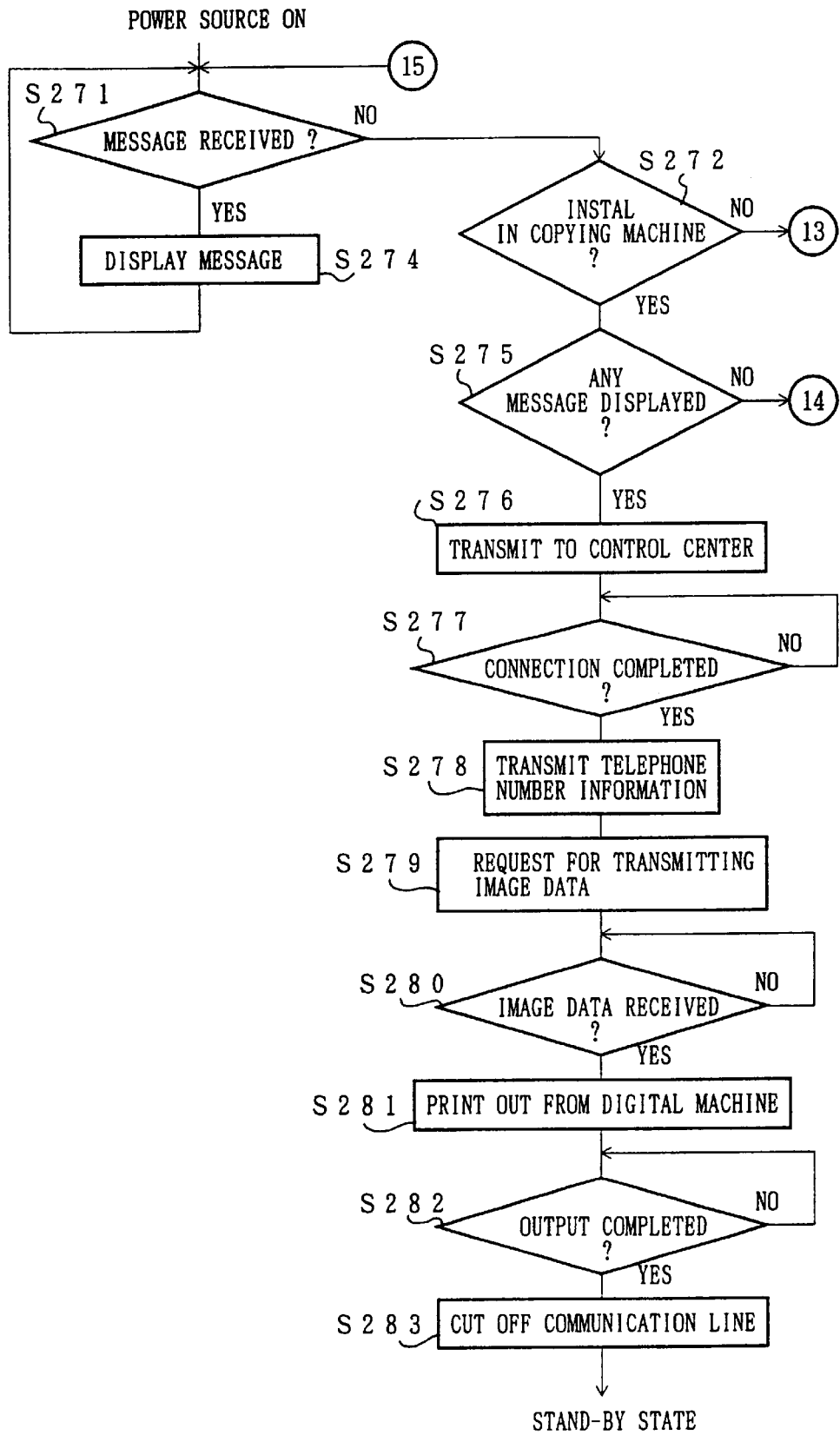
FIG. 29 is a flowchart explaining respective operations of the portable telephone and the digital copying machine shown in FIG. 27.
Figure 30:
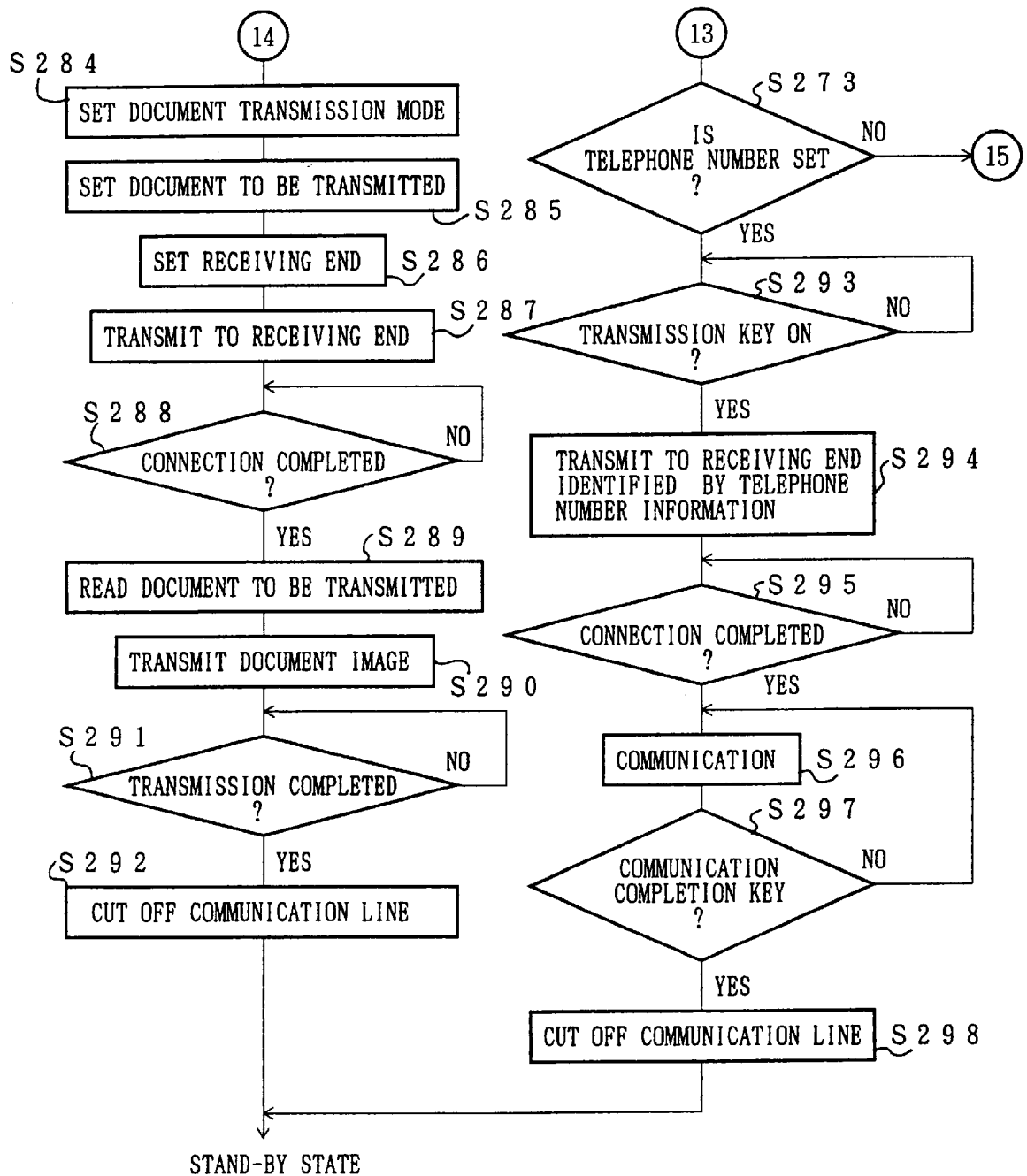
FIG. 30 is a flowchart showing an operation subsequent to the operation shown in FIG. 29.

Next, the described operation will be explained in reference to the flowcharts of FIG. 28 through FIG. 30. Additionally, FIG. 28 indicates operations on the side of the communication control sensor 151, and FIG. 29 and FIG. 30 explain the operations on the side of the portable telephone 2 and the digital copying machine 1.

Figure 28:
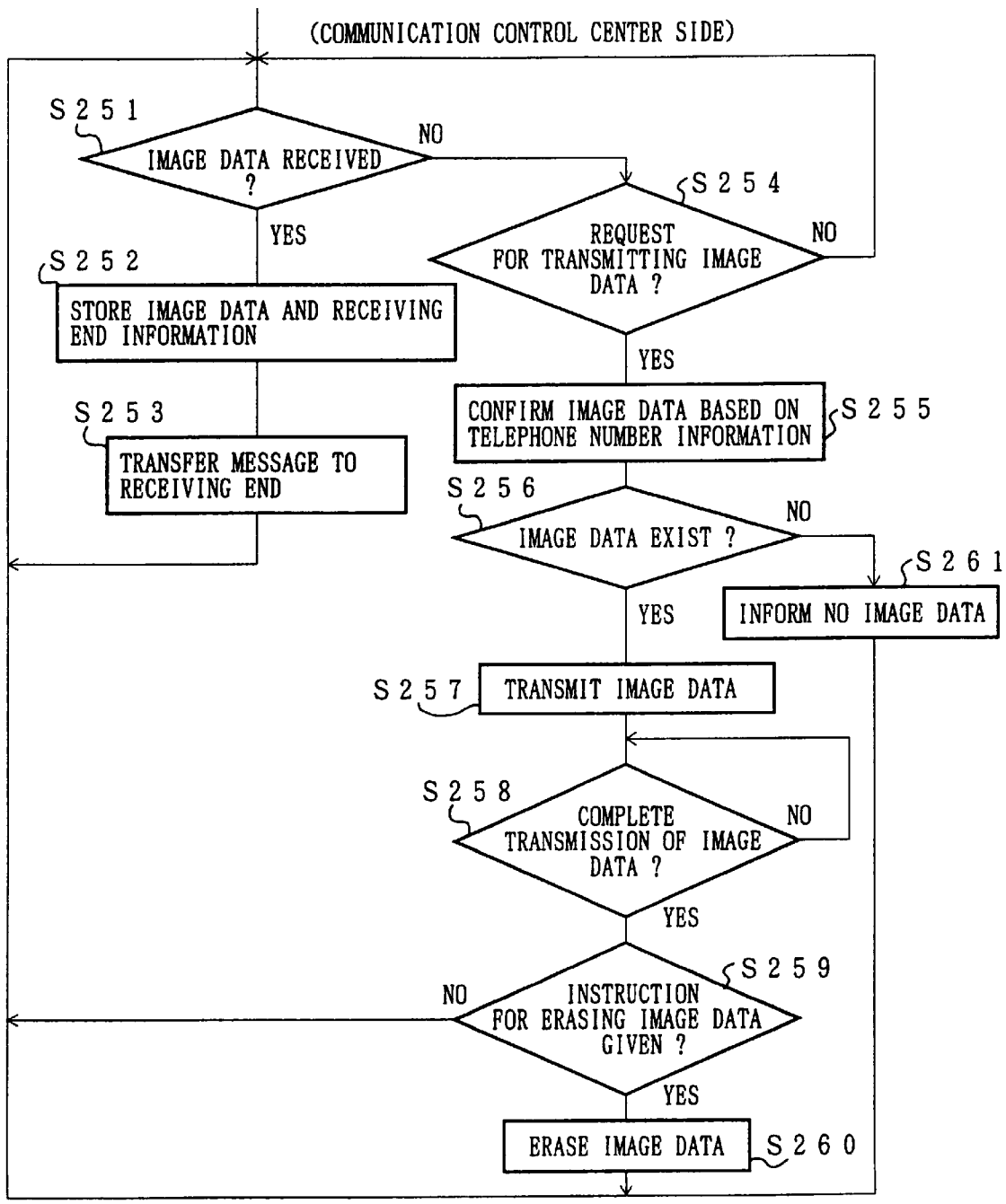
FIG. 28 is a flowchart showing an operation of a communication control center shown in FIG. 27.

In the communication control sensor 151 shown in FIG. 28, upon receiving the image data to be transmitted to a specific portable telephone 2 (S251), the image data and the information indicative of the receiving end are stored in the memory 153 (S252). Thereafter, a message indicative of an existence of the image data to be transmitted is transmitted to the portable telephone 2 of the receiving end (S253).

Thereafter, upon receiving a request for transmitting the image data from the portable telephone 2 in accordance with the message (S254) in the communication control center 151, based on the telephone number of the portable telephone 2 and the information indicative of the receiving end which has been stored beforehand, the image data to be transmitted is confirmed (S255).

As a result of this confirmation, if these exists the image data to be transmitted (S256), the image data is transmitted to the portable telephone 2 (S257). Thereafter, upon completing the transmission of the image data (S258), it is confirmed if an instruction for erasing the image data exists (S259). If so, the image data as transmitted is erased from the memory 153 (S260) Such instruction for erasing the image data may be set beforehand, or set according to a request from the portable telephone 2.

On the other hand, in S256, if the image data to be transmitted does not exist, a message indicative of no image data to be transmitted is transmitted to the portable telephone 2 (S261), thereby terminating the operation.

Next, the respective operations of the portable telephone 2 and the digital copying machine 1 will be explained. In FIG. 29 and FIG. 30, the portable telephone 2 is set in the stand-by state when turning ON the power supply. Here, the CPU 131 of the portable telephone 2 always observes if a message is received from the communication control center 151 (S271) if the portable telephone 2 is installed in the digital copying machine 1 (S272), or if the telephone number for communication is set (S273).

Upon receiving a message indicative of the existence of the image data to be transmitted from the communication control sensor 151 (S271), the message is displayed in the display section 133 (S274). Or a message indicative of the existence of the image data to be transmitted by a specific alarm sound.

Thereafter, upon installing the portable telephone 2 by the operator who confirms the message in the closest digital copying machine 1, the portable telephone 2 sends a request for transmitting the image data to the communication control sensor 151.

In this case, in the case where the portable telephone 2 is installed in the digital copying machine 1 (S272), and a message is displayed in the display section 133 (S275), a transmission for connection is carried out with respect to the communication control center 151 (S276). Then, upon completing the connection of the communication control center 151 (S277), the CPU 131 transmits the information indicative of the telephone number of the portable telephone 2 (S278), and further a request for transmission of the image data is performed (S279).

Thereafter, upon transmitting the image data from the communication control center 151 in response to a request for transmission, the portable telephone 2 receives the image data (S280), and is transferred to the digital copying machine 1. The digital copying machine 1 which receives the image data from the portable telephone 2 prints out the image data by the laser printer section 12 (S281). Thereafter, upon completing the printing out of the image data (S282), the portable telephone 2 cuts off the communication from the communication control center 151 (S283), and is set in the standby state.

On the other hand, in the S275, although the portable telephone 2 is installed in the digital copying machine 1, when the message is not displayed in the display section 133, the portable telephone 2 and the digital copying machine 1 are set in the document transmission mode (S284). In this case, the document to be transmitted is set in the digital copying machine 1 (S285), the receiving end is specified (S286), and a communication for connecting the receiving end is performed (S287). Thereafter, upon completing the connection between the portable telephone 2 with the receiving end (S288), the document to be transmitted is read out by the scanner section 11 of the digital copying machine 1 (S289), and a transmission of the image data is performed (S290). Thereafter, upon completing the transmission (S291), the portable telephone 2 cuts off a communication with the receiving end (S292), and it is set in the stand-by state.

In the portable telephone 2, when the telephone number for communication is set (S273), and the transmission key is set ON (S293), a transmission to the telephone number is performed (S294). Upon completing the connection with the portable telephone number (S295), a communication is performed (S296). Thereafter, when operating the communication end key (S297), the portable telephone 2 cuts off the communication (S298).

As described, in the digital image forming system of the present embodiment, the image data to be transmitted from other communication device is stored in the communication control center 151, and the portable telephone 2 can give a request for transmission of the image data when necessary. Therefore, it is not necessarily to always ensure a large memory capacity for storing the image data in the memory 132 of the portable telephone 2. As a result, the capacity of the memory 132 can be effectively used for other purposes.

Additionally, the transmission of the image data from the communication control center 151 to the portable telephone 2 is carried out based on the installing section 1*a* of the portable telephone 2 to the digital copying machine 1 by the operator, i.e., when it is determined that the image data is accepted by the portable telephone 2, a communication trouble due to an insufficient preparation on the side of the portable telephone 2 is less likely to occur. In this case, the input means is formed by the portable telephone installing sensors 116.

NINTH EMBODIMENT

Another embodiment of the present invention will be explained in reference to FIG. 31 and FIG. 32.

The digital image forming system of the present invention has a structure shown in FIG. 27 wherein image data transmitted from the communication control center 151 is received by the portable telephone 2 and is temporarily stored in the memory 132, and thereafter, upon installing the portable telephone 2 in the digital copying machine 1, the image data is printed out by the digital copying machine 1.

Next, the described operation will be explained in reference to the flowcharts shown in FIG. 31 and FIG. 32. Here, FIG. 31 and FIG. 32 indicate operations on the side of the portable telephone 2 and the digital copying machine 1, and an operation on the side of the communication control center 151 is the same as that shown in FIG. 28.

Figure 31:
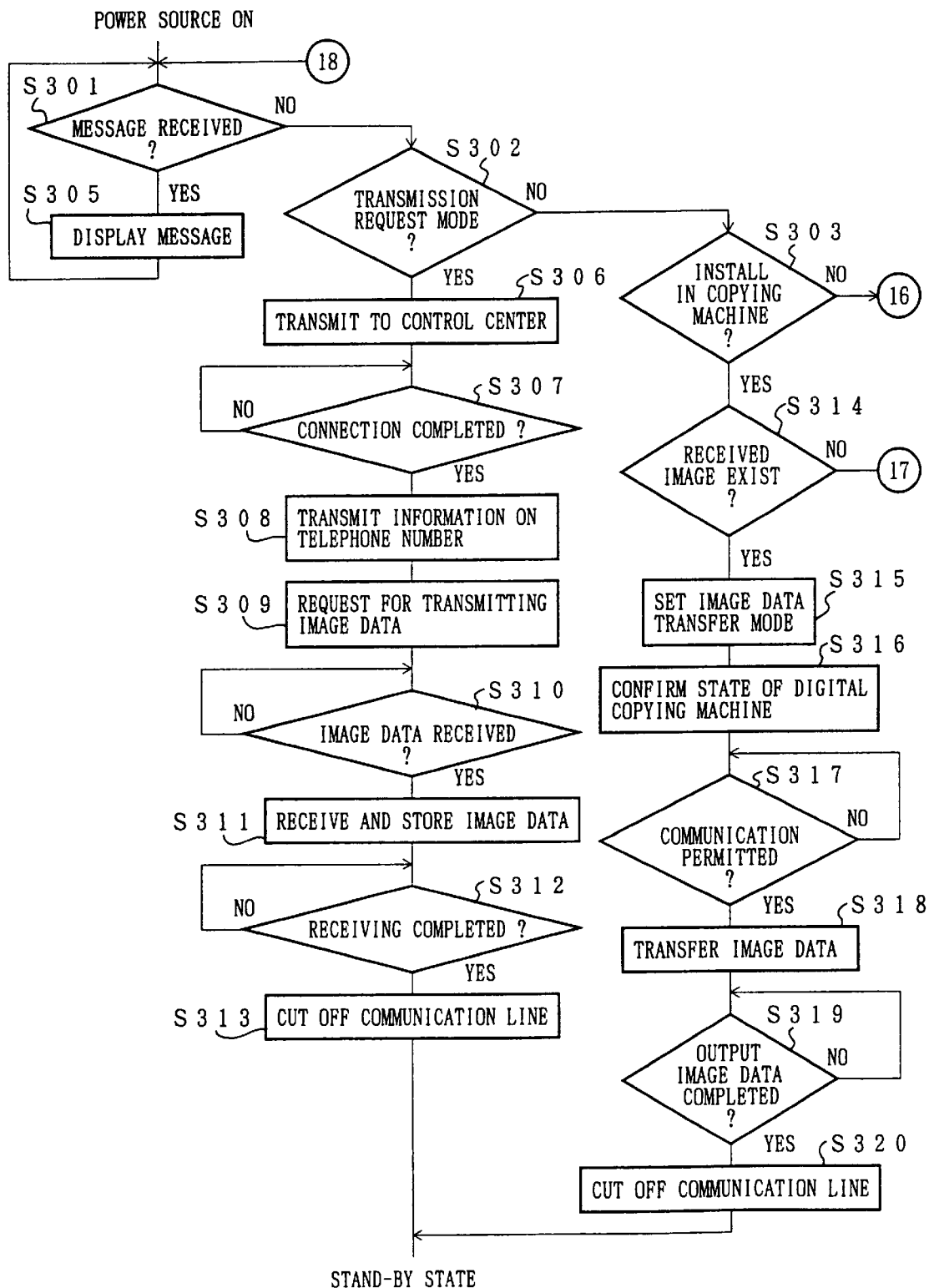
FIG. 31 is a flowchart showing an operation on the side of the portable telephone of the digital image forming system in accordance with yet still another embodiment of the present invention.
Figure 32:
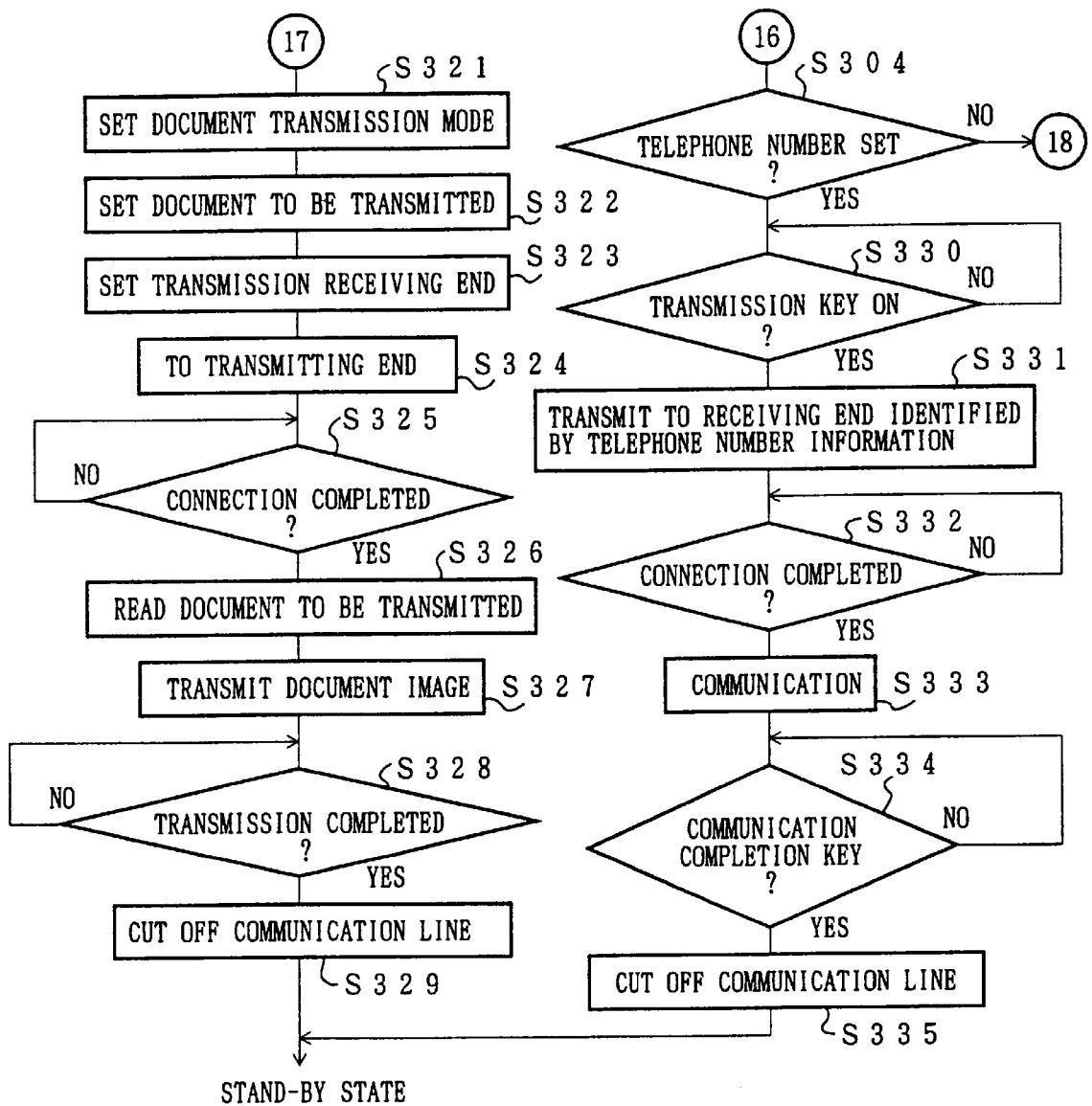
FIG. 32 is a flowchart showing an operation subsequent to the operation shown in FIG. 31.

In FIG. 31 and FIG. 32, the portable telephone 2 is set in the stand-by state upon turning ON the power supply. Here, the CPU 131 of the portable telephone 2 always observes if the message from the communication control center 151 is received (S301), if a transmission request mode for requesting the communication control center 151 for the transmission of the image data is set (S302), if the portable telephone 2 is installed in the digital copying machine 1 (S303), or if the telephone number is set for communication (S304).

Here, upon receiving a message indicative of an existence of the image data to be transmitted from the communication control center 151 (S301), the message is displayed in the display section 133 (S305). Or, the existence of the image data to be transmitted may be informed to the operator by a specific alarm sound.

Thereafter, upon setting the transmission request mode by the operator which confirms the message in the portable telephone 2 (S302), the CPU 131 of the portable telephone 2 performs a transmission for communication with the communication control center 151 (S306). The transmission request mode is set, for example, by an operation of the input key 137. Then, upon completing the connection with the communication control center 151 (S307), the CPU 131 transmits the information indicative of the telephone number of the portable telephone 2 (S308), and gives a request for a transmission of additional image data (S309).

Thereafter, upon receiving the image data from the communication control center 151 according to a request for transmission, the portable telephone 2 receives the image data (S310), and the CPU 131 stores the image data in the memory 132 (S311). Thereafter, upon completing the receiving of the image data (S312), the portable telephone 2 cuts off the communication with the communication control center 151 (S313), and is set in the stand-by state.

Thereafter, if the portable telephone 2 is installed in the digital copying machine 1, and the image data is stored in the memory 132 of the portable telephone 2 (S314), the portable telephone 2 is set in the image data transfer mode, and the image data to be stored in the memory 132 is set in the digital copying machine 1 so as to allow communication (S315).

Next, by communication between the CPU 131 of the portable telephone 2 and the main CPU 65 of the digital copying machine 1, the state of the digital copying machine 1 is confirmed (S316). If the digital copying machine 1 is set in a state where a communication is permitted with the portable telephone 2 (S317), the CPU 131 of the portable telephone 2 transfers the image data to the digital copying machine 1 (S318). Thereafter, upon completing the transfer of the image data (S319), the portable telephone 2 cuts off the communication with the digital copying machine 1 (S320), and is set in the stand-by state.

Thereafter, the image data transferred to the digital copying machine 1 is printed out by the laser printer section 12 of the digital copying machine 1. The respective operations in S321 through S335 shown in FIG. 32 are the same as the operations shown in S284 through S298 shown in FIG. 30.

As described, according to the digital image forming system of the present embodiment, the image data to be transmitted from other communication device is stored in the communication control center 151, and the image data is transferred to the portable telephone 2 when need arises. Therefore, it is not necessarily to always ensure a large memory capacity for storing the image data in the memory 132 of the portable telephone 2. As a result, the memory capacity of the memory 132 can be effectively used for other purposes.

As the image data transferred to the portable telephone 2 from the communication control center 151 is temporarily stored in the memory 132, the operator can set the portable telephone 2 in a communication permitting state, i.e., an installed state, with the digital copying machine 1 in an appropriate time, and a visualized image of the image data can be obtained.

Additionally, since the image data is transmitted from the communication control center 151 to the portable telephone 2 based on an operation of, for example, an input key 137 by the operator, i.e., when it is determined that the image data can be accepted by the portable telephone 2 by an operator, a communication trouble due to an insufficient preparation on the side of the portable telephone 2 is less likely to occur.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A digital image forming system, comprising:
    a digital image forming apparatus; and
    a portable image communication device which can be carried independently of said digital image forming apparatus and can communicate with said digital image forming apparatus and other communication device,
    wherein said digital image forming apparatus includes:
        image data forming means for reading a document image and converting the document image as read into image data,
        first memory means for storing the image data, and
        first control means for storing the image data obtained from said image data forming means in said first memory means, and transferring the image data as read from said first memory means to said portable image communication device, and
    said portable image communication includes:
        second memory means for storing the image data, and
        second control means for controlling the image data as transmitted from said digital image forming apparatus to be stored in said second memory means and the image data as read from said second memory means to be transmitted to said other communication device.

2. The digital image forming system, as set forth in claim 1, wherein:
    said digital image forming apparatus further includes image transmission means for permitting the image data to be transmitted to said other communication device via a communication line, and
    when said image transmission means is not permitted to transmit the image data to said other communication device, and a communication is permitted between said digital image forming apparatus and said portable image communication device, said first control means reads out the image data from said first memory means and transmits the image data as read to said portable image communication device.

3. The digital image forming system as set forth in claim 2, wherein:
    said first control means transmits information on a receiving end as well as the image data to said portable image communication device.

4. The digital image forming system as set forth in claim 2, wherein:
    said digital image forming apparatus further includes display means which displays a message indicative of an unable transmission when said image transmission means is not permitted to transmit the image data to said other communication device, and thereafter, said first control means transmits the image data to said portable image communication device.

5. The digital image forming system as set forth in claim 1, wherein:
    said digital image forming apparatus further includes an installing section for installing therein said portable image communication device, and
    when said portable image communication device is installed in said installing section, said portable image communication device electrically communicates with said digital image forming apparatus via a connector.

6. The digital image forming system as set forth in claim 5, wherein:
    said digital image forming apparatus further includes an image processing section for converting the image data to be transferred into a form which can be accepted by said portable image communication device, and
    said first control means confirms the form of the image data which can be accepted by said portable image communication device and converts the form of the image data to be transferred to said image processing section when necessary before transferring the image data to said portable image communication device.

7. The digital image forming system as set forth in claim 5, wherein:
said first control means confirms a memory capacity of said second memory means of said portable image communication device before transferring the image data to said portable image communication device, and interrupts a transferring operation when it is determined that said second memory means does not have a sufficient memory capacity for storing all the image data to be transferred.

8. The digital image forming system as set forth in claim 5, wherein:
said portable image communication device further includes input means, and
in an detached state from said installing section, said portable image communication device transmits the image data from said second memory means to said other communication device upon receiving an instruction for transmitting the image data from an operator via said input means.

9. The digital image forming system as set forth in claim 5, wherein:
said portable image communication device further includes an antenna for transmitting the image data to said other communication device, and said antenna is supported substantially vertically in an installed state in said installing section.

10. The digital image forming system as set forth in claim 5, wherein:
said digital image forming apparatus further includes power supply means for supplying a power to said portable image communication device installed in said installing section.

11. The digital image forming system as set forth in claim 5, wherein:
said digital image forming apparatus further includes stopper means for preventing said portable image communication device from being detached from said installing section while the image data is being transmitted to said portable image communication device.

12. The digital image forming system as set forth in claim 1, wherein:
said portable image communication device communicates with said digital image forming apparatus using infrared rays.

13. A digital image forming system, comprising:
a digital image forming apparatus; and
a portable image communication device which can be carried independently of said digital image forming apparatus and can communicate with said digital image forming apparatus and other communication device,
wherein said digital image forming apparatus includes:
image data forming means for reading a document image and converting the document image as read into image data,
first memory means for storing therein the image data,
first control means for storing therein the image data obtained from said image data forming means in said first memory means, and transferring the image data as read from first memory means to said portable image communication device, and
visualizing means for visualizing the image data stored in said first memory means, and
said portable image communication device includes:
second memory means for storing the image data, and
second control means for transmitting the image data as transmitted from said digital image forming apparatus to said other communication device.

14. The digital image forming system as set forth in claim 13, wherein:
said first control means sequentially reads out the image data from said first memory means and transmits the image data as read to said portable image communication device at least when a communication is permitted between said digital image forming apparatus and said portable image communication device, and
said second control means sequentially transmits the image data as transferred from said digital image forming apparatus to said other communication device when a communication is permitted between said digital image forming apparatus and said portable image communication device and between said portable image communication device and said other communication device, and stores the image data as transmitted from said digital image forming apparatus in said second memory means when a communication is permitted between said digital image forming apparatus and said portable image communication device, and a communication is not permitted between said portable image communication device and said other communication device.

15. The digital image forming apparatus as set forth in claim 13, wherein:
said digital image forming apparatus further includes display means for displaying information and input means for allowing an operator to perform an input operation,
said second control means transfers information indicative of a telephone number of a receiving end that has been registered in said portable image communication device to said digital image forming apparatus, and
said first control means displays in said display means the information indicative of the telephone number as transferred from said portable image communication device, and transmits specifying information for specifying the information indicative of the telephone number as specified by operating said input means to said portable image communication device, and
said second control means transmits the image data as transferred from said digital image forming apparatus to the receiving end as specified by the specifying information.

16. The digital image forming apparatus as set forth in claim 13, wherein:
said first control means erases information regarding the image data as transmitted via said portable image communication device from said first memory means after a communication permitting state between said digital image forming apparatus and said portable image communication device has been cancelled.

17. The digital image forming apparatus as set forth in claim 13, wherein:
said first control means transfers information regarding the image data as transmitted via said portable image communication device to said portable image communication device, and
said second control means stores information regarding the image data as transferred from said digital image forming apparatus in said second memory means.

18. A digital image forming system, comprising:

a digital image forming apparatus; and a portable image communication device which can be carried independently of said digital image forming apparatus and can communicate with said digital image forming apparatus and other communication device, wherein said portable image communication device includes:
- memory means for storing image data, and
- control means for storing the image data as transmitted from said other communication device in said memory means, and reading the image data from said memory means and transferring the image data as read to said digital image forming apparatus, and for storing the image data as transmitted from said digital image forming apparatus in said memory means, and reading the image data from said memory means and transferring the image data as read to said other communication device, and said digital image forming apparatus includes:
- visualizing means for visualizing the image data; and
- control means for sending the image data as transmitted from said portable image communication device to said visualizing means.

19. The digital image forming system as set forth in claim 18, wherein:

said portable image communication device includes informing means for informing that the image data has been stored in said memory means.

20. A digital image forming system, comprising:

a digital image forming apparatus, a transit device which serves as a transit for communication, and a portable image communication device which can be carried independently of said digital image forming apparatus, and can communicate with said digital image forming apparatus and other communication device, wherein said transit means includes:
- memory means for storing the image data as transmitted to said portable image communication device from said other communication device, and
- control means for transmitting informing information indicating that the image data has been stored in said memory means upon storing the image data in said memory means, and reading the image data from said memory means and transferring the image data as read to said portable image communication device upon receiving a request for transferring the image data from said portable image communication device, said portable image communication device includes:
- informing means for informing a receipt of the informing information upon receiving the informing information from said transit device,
- input means for inputting a request for transferring the image data, and
- control means for giving said transit device based on an input from said input means a request for transferring the image data to said portable image communication device, and transferring the image data as transferred from said transit device to said digital image forming apparatus, and said digital image forming apparatus includes:
- visualizing means for visualizing the image data, and
- control means for sending the image data as transferred from said portable image communication device to said visualizing means.

21. A digital image forming system, comprising:

a digital image forming apparatus, a transit device which serves as a transit for communication, and a portable image communication device which can be carried independently of said digital image forming apparatus, and can communicate with said digital image forming apparatus and other communication device via said transit device, wherein said transit means includes:
- memory means for storing the image data as transmitted to said portable image communication device from said other communication device, and
- control means for giving said transit device based on an input from said input means a request for transferring the image data to said portable image communication device, storing the image data as transferred from said transit device in said second memory means and transferring the image data as read from said memory means to said digital image forming apparatus, and said portable image communication device includes:
- said second memory means for storing the image data,
- informing means for informing a receipt of the informing information upon receiving the informing information from said transit means, and
- input means for inputting a request for transferring the image data, and
- control means for giving said transit device based on an input from said input means a request for transferring the image data to said portable image communication device, storing the image data as transferred from said transit device in said second memory means and transferring the image data as read from said memory means to said digital image forming apparatus, and said digital image forming apparatus includes:
- visualizing means for visualizing the image data, and
- control means for sending the image data as transferred from said portable image communication device to said visualizing means.

* * * * *